(12) United States Patent
Liang et al.

(10) Patent No.: US 11,573,612 B2
(45) Date of Patent: Feb. 7, 2023

(54) UNIVERSAL PORTABLE COMPUTERS

(71) Applicants: Zhonghong Liang, Fredericton (CA); Benjamin Liang, Fredericton (CA)

(72) Inventors: Zhonghong Liang, Fredericton (CA); Benjamin Liang, Fredericton (CA)

( * ) Notice: Subject to any disclaimer, the term of this patent is extended or adjusted under 35 U.S.C. 154(b) by 0 days.

(21) Appl. No.: 17/134,236

(22) Filed: Dec. 25, 2020

(65) Prior Publication Data

US 2022/0011829 A1 Jan. 13, 2022

(30) Foreign Application Priority Data

Jul. 12, 2020 (CA) .................................. CA 3086309

(51) Int. Cl.
*G06F 1/16* (2006.01)

(52) U.S. Cl.
CPC .......... *G06F 1/1684* (2013.01); *G06F 1/1616* (2013.01); *G06F 1/1635* (2013.01); *G06F 1/1658* (2013.01); *G06F 1/1662* (2013.01)

(58) Field of Classification Search
CPC .... G06F 1/1684; G06F 1/1616; G06F 1/1656; G06F 1/1613; G06F 1/1658; G06F 1/184; G06F 1/169; G06F 1/188; G06F 1/1635; G06F 1/1662; H05K 7/142; G11B 33/127
USPC .......... 361/679.55, 748, 752, 753, 754, 755, 361/756, 760
See application file for complete search history.

(56) References Cited

U.S. PATENT DOCUMENTS

| | | | | |
|---|---|---|---|---|
| 6,741,477 | B2 * | 5/2004 | Sivertsen | H05K 7/142 361/752 |
| 2002/0095533 | A1 * | 7/2002 | Esterberg | G06F 1/1632 710/8 |
| 2006/0023406 | A1 * | 2/2006 | Shih | G06F 1/1616 361/679.55 |
| 2006/0176659 | A1 * | 8/2006 | Sun | G06F 1/1656 361/679.55 |
| 2006/0268499 | A1 * | 11/2006 | Chan | G06F 1/1656 361/679.4 |
| 2006/0271701 | A1 * | 11/2006 | Sutardja | G06F 1/1635 709/238 |
| 2007/0025071 | A1 * | 2/2007 | Yokote | G06F 1/1662 361/679.08 |
| 2007/0076364 | A1 * | 4/2007 | Liu | G06F 1/1656 361/679.55 |

(Continued)

*Primary Examiner* — Adrian S Wilson
*Assistant Examiner* — Gage Crum

(57) ABSTRACT

A type of portable computer with interchangeable components is provided. The chassis of the portable computer includes an upper part, a lower part, and an edge part. The edge part can be equipped with removable input and output (I/O) plates. The motherboards and batteries of this type of portable computer are standardized with or without optional components such as optical drives and/or 2.5 inch hard drives. Motherboards, batteries and other components can be mounted in the chassis of the portable computer through fixed mounting stands and/or removable mounting standoffs. The portable computer allows the I/O plates and/or the edge part to be replaced. Therefore, a motherboard with different I/Os, a motherboard and other components with different heights, and an auxiliary cooling system can be installed in the chassis. In the portable computer, mounting stands and standoffs can be shared by multiple components.

20 Claims, 54 Drawing Sheets

(56) References Cited

U.S. PATENT DOCUMENTS

| | | | |
|---|---|---|---|
| 2010/0067206 A1* | 3/2010 | Tanaka | G06F 1/186 |
| | | | 361/752 |
| 2011/0085292 A1* | 4/2011 | Chien | G06F 1/1616 |
| | | | 361/679.33 |
| 2013/0088829 A1* | 4/2013 | Co | G06F 1/185 |
| | | | 361/679.31 |
| 2014/0192468 A1* | 7/2014 | Kotaka | H05K 5/0004 |
| | | | 361/679.08 |

* cited by examiner

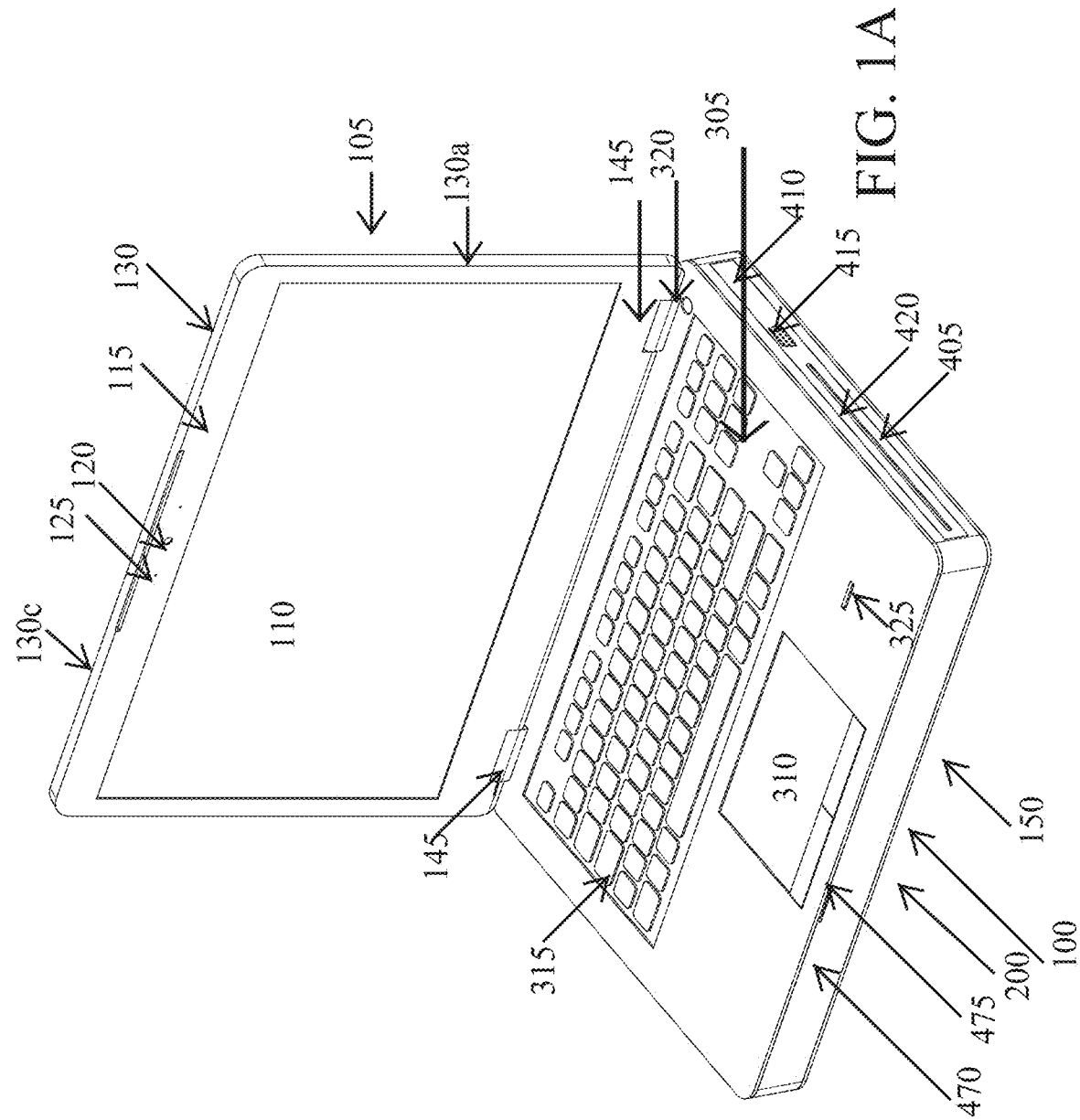

270

270

UNIVERSAL PORTABLE COMPUTERS

FIELD OF THE INVENTION

The present invention relates to a type of portable computer and more specifically it relates to a type of universal portable computer. A universal portable computer is so named that the motherboard and other components are designed to be universally interchangeable. Portable computers can refer to laptops, tablets, smartphones, etc.

BACKGROUND OF THE INVENTION

The term portable computer encompasses laptops, as well as other computing devices that are easy to carry and move. Examples of these other computing devices include tablets, smartphones, other handheld devices, etc. Some portable computers, such as laptops, contain a top and base portion. The top portion includes a display screen. The base portion includes a chassis and most components of the portable computer. Other portable computers, such as tablets and smartphones, only contain a base portion with a built-in display.

Currently, the base portion of portable computers may include interchangeable components such as processors, graphics cards, wireless cards, memory, optical drives, 2.5 inch hard drives, etc. For portable computers with interchangeable components, component standardization is important and useful. This type of standardization is helpful for users because they can easily upgrade or repair their portable computers by replacing standard components. For example, a laptop can be upgraded to a faster processor and higher memory capacity. However, motherboards in current portable computers do not have this type of standardization, and can only be used for a specific model of portable computer. If a motherboard in a portable computer is faulty, it can only be replaced with a motherboard of the same model, which places significant restrictions on repairs and upgrades. Without a suitable motherboard, even if the portable computer contains all other components, it can only be discarded. The same problem occurs if the chassis is damaged or unusable. If the motherboard or chassis of a portable computer needs to be replaced, it is often necessary to replace the entire portable computer. Currently, there is no solution that allows the motherboard or chassis of a portable computer to be interchangeable.

It would be beneficial to provide a type of portable computer with standardized motherboards, chassis, and other components. All components in these portable computers are ideally interchangeable. This makes it easy to repair or upgrade a portable computer. In addition, since all these portable computers have a similar structure and interchangeable components, it makes it easier for users to assemble or disassemble them.

SUMMARY OF THE INVENTION

The present invention seeks to provide solutions for standardized portable computers. One object of the present invention is to standardize the motherboard, chassis and other components of the portable computer. Another object of the present invention is to be able to install various motherboards with different input and output (I/O) ports into the same portable computer chassis. Another object of the present invention is to efficiently and safely mount all components of the portable computer into the chassis. Yet another object of the present invention is to provide a solution for mounting motherboards and other components of different heights into the chassis.

Before further describing the invention, attention being called to the fact that the terminology and examples used are for illustration purposes only, no boundaries and restrictions should be imposed, and the scope of the invention will be indicated in the further description and claims.

As previously described, most components of the portable computer are in the base portion. These components can be divided into two types depending on whether they are mounted on the motherboard. The first type of component is connected to the motherboard through connectors or cables. The second type of component is plugged, fixed, or soldered onto the motherboard. The first type of component is not mounted on the motherboard, and the second type of component is mounted on the motherboard. For example, in laptops, the first type of component includes batteries, optical drives, 2.5 inch hard drives, speakers, etc., and the second type of component includes processors, graphics cards, memory, wireless cards, solid-state drives, heatsinks, cooling fans, etc. A solid-state drive, or SSD for short, uses integrated circuit components as memory to store data. Although an SSD can be a 2.5 inch type, the SSD mentioned in the present invention only refers to the type that can be plugged into an SSD slot on a motherboard.

When considering installation and layout, the second type of component and the motherboard can be considered as a unit, hereafter referred to as motherboard U. The situation regarding the first type of component is more complicated. When installed in a chassis, the components interact with the motherboard U. Sometimes, in a portable computer, certain components can be omitted without affecting the main functions of the portable computer. For instance, in a laptop, the optical drive and 2.5 inch hard drive can be optional components. Optional components create additional possibilities for the layout of the components in the chassis. Therefore, when arranging and mounting components in a chassis, all situations with or without these optional components should be considered. Moreover, for these situations, the mounting arrangement of the components in the chassis needs to be adjusted accordingly.

The standardization of components makes them replaceable and upgradeable. However, motherboard standardization is difficult to achieve. The motherboard is the component on which most functions of a portable computer are based. Therefore, the motherboard may vary depending on the performance and purpose of the portable computer. For example, a gaming laptop must have a gaming graphics card on the motherboard. The motherboard for a gaming laptop may also contain larger or more heat sinks and cooling fans, a faster processor, faster bus speeds, and more memory. As a result, motherboards for gaming laptops are generally larger and more complex. A chassis of a universal portable computer should be able to mount a gaming or regular motherboard, despite their different sizes. In some of the following embodiments, the optical drive and/or 2.5 inch hard drive are omitted to accommodate a larger motherboard.

Being able to mount a motherboard's various I/O ports to the side walls of a chassis is a prerequisite for installing the motherboard in the chassis. These ports connect the portable computer to other computing devices, peripherals, and/or networks. Depending on the functions and features of the portable computer, its motherboard can have different I/O ports. In the present invention, removable I/O plates are proposed to be mounted on the sides of the chassis. The advantage of removable I/O plates becomes apparent when motherboards with different I/Os can be easily installed in the same chassis by replacing the I/O plates.

In order to be installed in a chassis, the height of the motherboard U and other components in the chassis must be less than the height of the chassis. In the invention, a special three-part chassis structure is proposed. The chassis of the proposed portable computer includes an upper part, a lower part, and an edge part. The edge part is the structure surrounding most components in the chassis and is equipped with removable I/O plates. The upper part, lower part and edge part are fastened together to form the chassis. Described in further detail later, the unique three-part chassis is essential for implementing the universal portable computer concept. If a taller motherboard U is to be installed, the chassis may require a taller edge part. On the contrary, if a shorter motherboard U is to be installed, a shorter edge part may be installed to increase the portability of the portable computer. Through the innovation of the replaceable edge part, the chassis of the present invention is suitable for motherboards and components with different heights.

To install components in a chassis, all possible situations must be considered. In some cases, special consideration should be given when installing optional components. Examples of these components are optical drives and 2.5 inch hard drives. In the following embodiments, by properly arranging the mounting stands and removable standoffs, all the components can be installed efficiently in all situations. Since a motherboard is full of circuits and components, it is best to place the mounting holes on the edge of the motherboard. Removable standoffs can be added when more support is needed. To reduce component count and increase portability, a mounting stand or standoff can be used to mount multiple components. In the following embodiments, shared mounting stands and standoffs are used for the battery, 2.5 inch hard drive, optical drive and motherboard.

Overheating can be a problem for portable computers due to their compact size. In an embodiment, an auxiliary cooling system at the bottom of the chassis provides more cooling for the portable computer. By replacing the edge part with a taller one, the interior of the chassis will have more space to accommodate additional cooling devices, whereas prior art designs can only utilize a cooling pad outside of the portable computer.

Before describing the invention in more detail, attention being called to the fact that the chassis and some components are only suitable for portable computers of a specific size. Identification should be put on components to clarify their usage. For example, a motherboard can be identified as suitable for portable computers with a 15.6 inch display and a chassis with a minimum height of 1 inch.

Note that the size of the portable computer restricts the size of the components and decides whether or not the components are practicable. For example, an optical drive or a 2.5 inch hard drive may never be a component of a tablet. Even so, the concepts and methods in the present invention can still be applied to these situations.

This invention has many advantages. Since the components are interchangeable and compatible with each other, it is always easy to source replacement components. Portable computers with interchangeable components are easy to be repaired and upgraded. They are technically easy to maintain because they usually have similar structures. Users can also choose components to build the portable computer they want. In addition, an auxiliary cooling system allows the use of more powerful components and/or provides large enough cooling capacity to increase the life of the portable computer and its components.

The invention has many advantages of the innovations mentioned heretofore and many novel features that result in a new type of portable computer with interchangeable components, which have not been anticipated, suggested, or even implied by any of the prior art, either alone or in any combination thereof.

BRIEF DESCRIPTION OF THE DRAWINGS

To the accomplishment of the above and related objects, this invention may be embodied in the form illustrated in the accompanying drawings. Attention being called to the fact that, although the drawings only show arrangements for certain structures, the drawings are for illustrative purposes only and do not limit the scope of the present invention. Please also note that changes may be made in the specific structure illustrated and the descriptions do not limit the scope of the present invention.

For a more complete understanding of the invention, reference is made to the following descriptions and accompanying drawings, in which:

FIG. 1A is a front facing view of a portable computer in an open cover position according to an embodiment.

FIG. 20E is a front view of the motherboard U according to the embodiment of

FIG. 19.

FIG. 29C is a left side view of the motherboard U according to the embodiment of

FIG. 28.

DETAILED DESCRIPTION

Figure 1B:
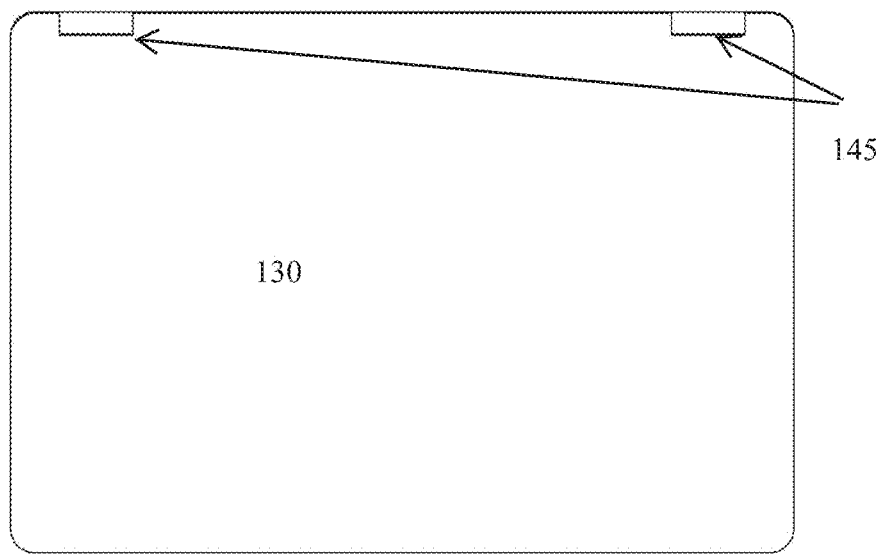
FIG. 1B is a top view of the portable computer according to the embodiment of FIG. 1A in a close cover position.

All embodiments of the invention below are for explanatory purposes. Some well-known configurations or functions are ruled out in order not to obscure the subject matter of the present disclosure. It is to be understood that the invention is not limited in its application to the details of construction, and to the arrangements of the components outlined in the following description or illustrated in the drawings. The invention is capable of other embodiments and of being practiced and carried out in various ways. Also, it is to be understood that the phraseology and terminology employed herein are for the purpose of the description and should not be regarded as a limit.

The invention relates to portable computers. More specifically, the invention deals with innovations related to making portable computer chassis, motherboards and other components interchangeable. There are many aspects of the invention. The main achievement is to standardize portable computer chassis, motherboards, and other components in order to replace, upgrade and reuse them efficiently. Some components in portable computers are already interchangeable because the industry has standards for their dimensions and connection types. These components include processors, graphics cards, memory, 2.5 inch hard drives, SSDs, and optical drives. There are many other components in current portable computers that are not universally interchangeable. These components include motherboards, batteries, speakers, keyboards, touchpads, etc. Among these components, standards for keyboards, speakers, and touchpads are relatively easy to establish. These components are not complex; therefore it will not be difficult to standardize their connection methods and dimensions. In portable computers, keyboards and touchpads are all on the exterior of the upper part of the chassis. The speakers are located inside the chassis. In the embodiments of the following drawings, the dimensions of the keyboards and touchpads are standardized. In addition, space is allocated to fit the speakers. Therefore, speakers of various dimensions can be installed as long as their dimensions are less than or equal to the allocated space.

As for motherboards and batteries, these components are important devices that affect the performance and functionality of portable computers. The battery determines how long a portable computer can operate without an external power source, therefore a high-capacity battery is a very important feature of a portable computer. The motherboard is the main component of a portable computer. All other components are connected, fixed, plugged, or soldered to the motherboard. The ideal portable computer is compact and powerful. Therefore, if some components are removed from the portable computer, the space from their vacancy should be occupied by other components, such as the battery and/or the motherboard. The main challenge in standardizing motherboards and batteries is standardizing them in a variety of situations with or without optional components. In the following embodiments, standardized options with or without an optical drive and/or a 2.5 inch hard drive are detailed. Without these optional components, a larger motherboard and/or battery can be installed in the chassis. A larger motherboard and battery will require more mounting points than a smaller motherboard and battery. Some portable computers, such as tablets, smartphones or small-sized laptops, do not have enough space for an optical drive or 2.5 inch hard drive. For them, only the options without these components need to be considered. The motherboard can be bordered by other components, including the optical drive, battery, 2.5 inch hard drive, etc. To achieve a compact concept, adjacent components can share mounting stands or standoffs. In the embodiments, methods for mounting the motherboard and other components to the chassis are proposed. The motherboard and other components can be mounted onto the interior of the upper part of the chassis. As described below, when optional components are omitted, removable standoffs can be used to install a larger motherboard or battery. In the following embodiments, all the components can be successfully mounted in the chassis with or without an optical drive and/or a 2.5 inch hard drive.

There are many other features, aspects and advantages of this invention. The disclosure will become better understood with regard to the following description, claims and drawings.

Turning now to FIG. 1A, an embodiment of the portable computer 100 includes a top portion 105 and a base portion 200. The top portion 105 includes a display 110, a bezel 115, a web camera 120, a microphone 125, a display back cover 130 (shows clearly in FIG. 1B), and a display mounting set 135 (not shown in the figure). Suffixes from a to d are added to denote the right, left, top, and bottom sides of the display back cover 130, respectively. The bezel 115 surrounds the edges of the display 110. The display mounting set 135 is in the interior of the top portion 105, and underneath the bezel 115 on the left and right sides of the display 110. The display 110 can be any available screen type, with or without touch function. For example, the display 110 may be TN (Twisted Nematic), IPS (In-Plane Switching) or OLED (Organic Light Emitting Diode), which is not limited herein. The base portion 200 includes a chassis 150 (shows clearly in FIG. 2B) and other components. The chassis 150 includes an upper part 300, an edge part 400 and a lower part 500, which will be shown in detail in FIGS. 2-5. The hinges 140 (not shown in the figure) connect the top portion 105 and base portion 200 together. The hinges 140 are located inside the two hinge covers 145 on the left and right of the portable computer 100. The upper part 300 of the base portion 200 can accommodate pointing input devices such as a keyboard 305 and a touchpad 310. The keyboard 305 includes various keycaps 315 imprinted or engraved with specific symbols. The keyboard 305 can be used as a typewriter and can also be used to give commands to the operating system of the portable computer 100. The touchpad 310 can translate the motion and position of a user's finger to a relative position on the display 110 output by the operating system. There is also a power button 320 on the upper part 300. When the power button 320 is pressed, it activates the external power adapter or battery to turn on the portable computer 100. There can be other input devices on the upper part 300, such as a fingerprint reader 325. The fingerprint reader 325 is used to identify a user's fingerprint for security purposes. After obtaining the sample, if the user's fingerprint matches the stored sample, access to the portable computer 100 is granted.

FIG. 1A also shows the front side wall 470 and the right side wall 405 of the base portion 200. On the front side wall 470, there are openings for LEDs 475. There are a total of four LEDs 475a through 475d, which will be shown clearly in FIG. 1E. On the right side wall 405, there is a right removable I/O plate 410. Through the openings in the right removable I/O plate 410, there is a VGA port 415 and an optical drive slot 420.

Figure 1C:
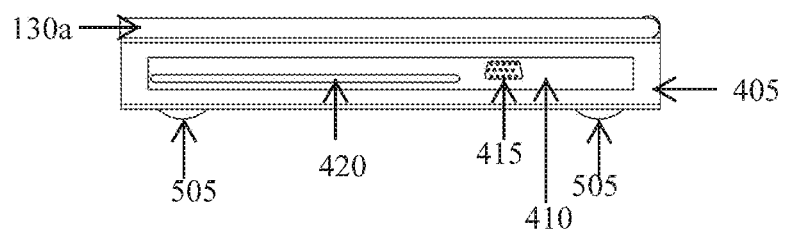
FIG. 1C is a right side view of the portable computer according to the embodiment of FIG. 1A in a close cover position.

FIG. 1B is a top view of the portable computer 100 according to the embodiment of FIG. 1A in a close cover position. The display back cover 130 provides support for the display 110. The hinge covers 145 are also shown in FIG. 1B. FIGS. 1C through 1F show side views of the portable computer 100 according to the embodiment of FIG. 1A in a close cover position. Each view includes the base portion 200 and the top portion 105. More specifically, the FIG. 1C shows a right side view of the portable computer 100. FIG. 1C shows the right side wall 405, the right side 130a of the display back cover 130 and the support feet 505. The right side wall 405 of the base portion 200 is equipped with a right removable I/O plate 410, which includes various openings for the inputs and outputs (I/Os) of the portable computer 100. These openings allow the portable computer 100 to communicate with external devices through the input and output ports (I/O ports). The portable computer 100 can have a variety of I/O ports, such as video output ports and data transporting ports, which are not limited herein.

In this embodiment, a VGA port 415 is shown in FIG. 1C. The VGA port 415 is a three-row 15-pin connector that allows the portable computer 100 to output analog video signals to an external monitor, a projector or a television via a VGA cable. An example of a data transporting port is a USB port. The term USB stands for Universal Serial Bus, an industry standard for short-distance digital data communications. USB devices, such as external hard drives, printers, flash drives, USB controller devices, etc., can be connected to the portable computer 100 through USB ports. The right removable I/O plate 410 also includes an optical drive slot 420 for a slot-load optical drive. The slot-load optical drive is a type of disc drive without a tray. An optical disc can be inserted into a thin slot to perform read and write operations. The disc can be taken out by pressing the eject button or through the operating system. The optical drive can be a variety of types that can read and/or write CDs, DVDs, Blu-ray discs, etc. Another type of optical drive is the tray-load optical drive that allows a user to insert a disc by putting it on a motorized tray. The motorized tray can be moved in and out of the optical drive by pressing the button on the front faceplate. In this embodiment, a slot-load optical drive is installed. If a tray-load optical drive is installed instead, the faceplate can be accommodated by an opening in the right removable I/O plate 410. Please note that the right removable I/O plate 410 can be removed and replaced with another I/O plate that has different openings for different I/O ports.

The support feet 505 are fastened or glued to the lower part 500 of the portable computer 100. The support feet 505 provide support for the portable computer 100 while also providing space under the portable computer 100 to allow more air circulation. The support feet 505 can be made from a plastic or rubber material.

Figure 1D:
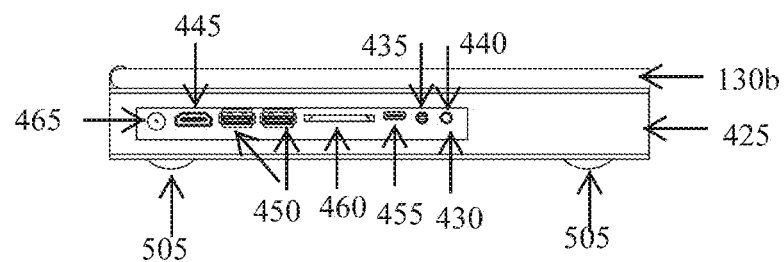
FIG. 1D is a left side view of the portable computer according to the embodiment of FIG. 1A in a close cover position.

FIG. 1D is a left side view of the portable computer 100 according to the embodiment of FIG. 1A in a close cover position. FIG. 1D shows the left side wall 425, the left side 130b of the display back cover 130 and the support feet 505. The left side wall 425 of the base portion 200 is equipped with the left removable I/O plate 430. The left removable I/O plate 430 includes various openings for the I/O ports of the portable computer 100.

These I/O ports include audio ports, such as a headphone jack 435 and a microphone jack 440, video output ports, such as an HDMI port 445, data transporting ports, such as two USB ports 450 and a USB C port 455, and a card reader 460, which are not limited herein. HDMI stands for High-Definition Multimedia Interface, which is an industry standard audio/video interface for transporting digital video and audio data from a source device to a display, such as a computer monitor, projector, digital television, etc. HDMI is a digital alternative to the analog video standard. The card reader 460 is used to read images or videos stored in digital cards from video capture devices such as digital cameras and camcorders. There are many types of digital cards, such as Compact Flash, Memory Stick, SD (Secure Digital), micro SD, and xD. In this embodiment, the card reader 460 is a multi-card reader that can read more than one type of digital card. The left removable I/O plate 430 also includes an opening to accommodate a power port 465, through which an external power adapter can power the portable computer 100 or charge the battery of the portable computer 100.

The other sides of the base portion 200 may also include removable I/O plates that have openings for I/O ports and other purposes. For example, the openings may be used for air circulation between the portable computer 100 and the external environment.

Figure 1E:
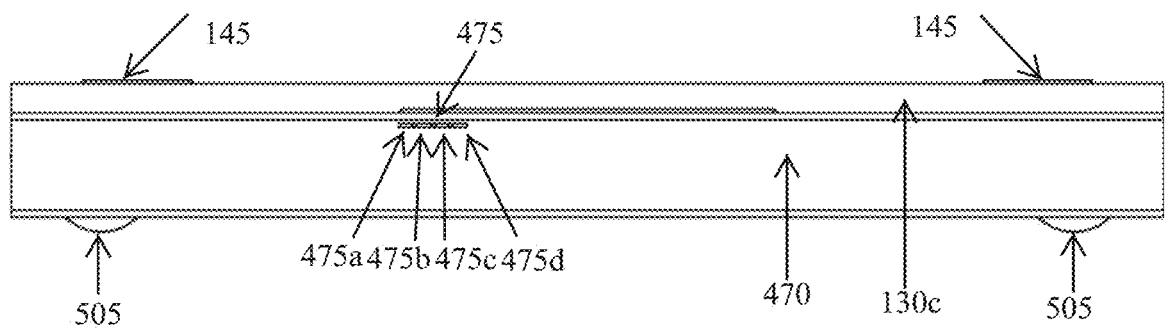
FIG. 1E is a front view of the portable computer according to the embodiment of FIG. 1A in a close cover position.

FIG. 1E is a front view of the portable computer 100 according to the embodiment of FIG. 1A in a close cover position. FIG. 1E shows the front side wall 470, the top side 130c of the display back cover 130, the hinge covers 145, and the support feet 505. The front side wall 470 of the base portion 200 includes openings for LEDs (Light Emitting Diodes) 475 to indicate the operating status of the portable computer 100. The LEDs 475 display different colors or patterns, indicating the operating status of certain components in the portable computer 100. These colors and patterns can also guide users to find potential problems before the problems damage the portable computer 100. In this embodiment, the LEDs 475 include a battery charging LED 475a, a power LED 475b, a hard drive LED 475c and a wireless operating status LED 475d, which are not limited herein.

Figure 1F:
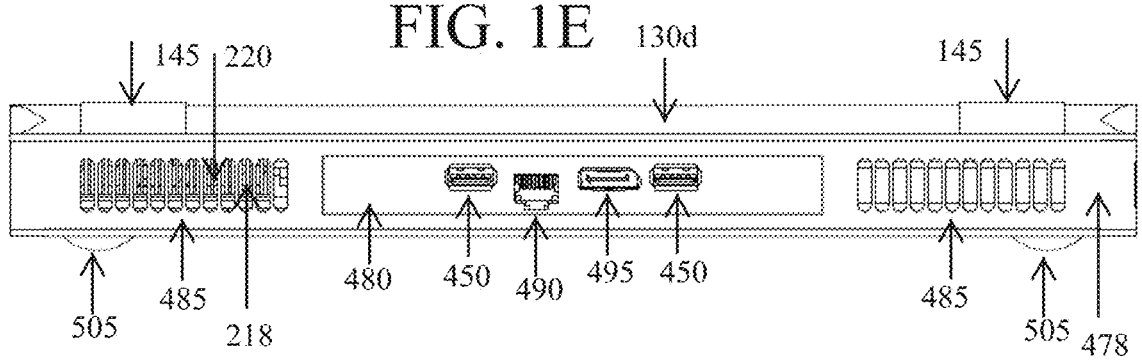
FIG. 1F is a rear view of the portable computer according to the embodiment of FIG. 1A in a close cover position.

FIG. 1F is a rear view of the portable computer 100 according to the embodiment of FIG. 1A in a close cover position. FIG. 1F shows the rear side wall 478, the bottom side 130d of the display back cover 130, the hinge covers 145 and the support feet 505. The rear side wall 478 is equipped with the rear removable I/O plate 480, which includes various openings for the I/O ports of the portable computer 100.

In this embodiment, these I/O ports include data transporting ports such as two USB ports 450, digital video output ports such as a DisplayPort 495 and a network port 490, which are not limited herein. The network port 490 is also called a RJ45 port. When a network cable is plugged into the network port 490, the portable computer 100 can communicate with other network devices, such as network drives, switches, routers, etc. In addition, the portable computer 100 can also be connected to the Internet, an intranet, or other personal computers through the network port 490. The DisplayPort 495 is an industry standard high definition digital video interface that can carry audio, video and other data information. Other video ports may also pass through the I/O plate via their respective openings. For example, these other I/O ports can include a mini HDMI port, a micro HDMI port, a Thunderbolt port, and a mini Displayport port, which are not limited herein. All of these ports are industry standard digital interfaces that provide smaller form factor alternatives.

In the rear side wall 478, there are also openings used as air duct holes 485. In this embodiment, the air duct holes 485 are located on the left and right ends of the rear side wall 478. In order to provide cooling for components such as the processor and the graphics card, the air duct holes 485 allow the cooling fans in the portable computer 100 to expel hot air and draw in cold air. FIG. 1F also shows a microfin heatsink 218 and cooling fan 220 that can be seen through the right side air duct holes 485.

Figure 1G:
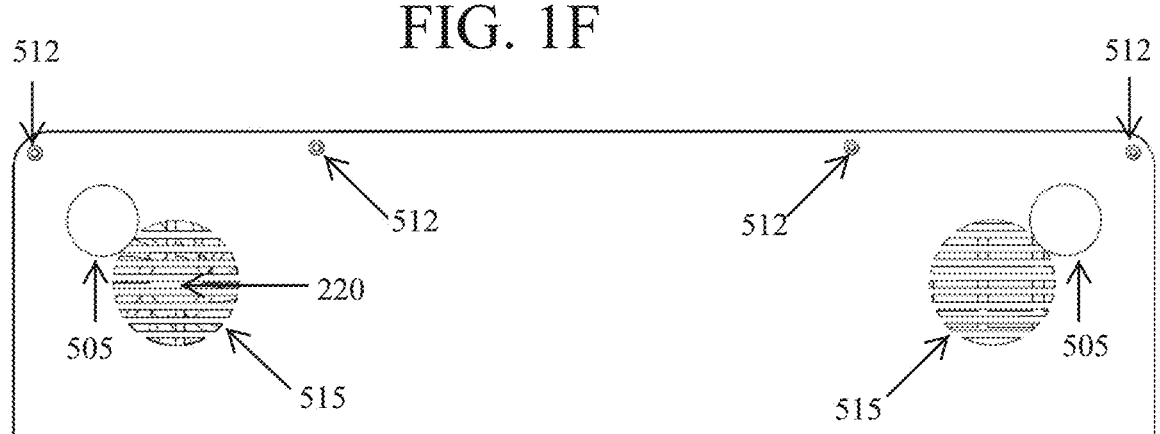
FIG. 1G is a bottom view of the portable computer according to the embodiment of FIG. 1A in a close cover position.
Figure 1G:
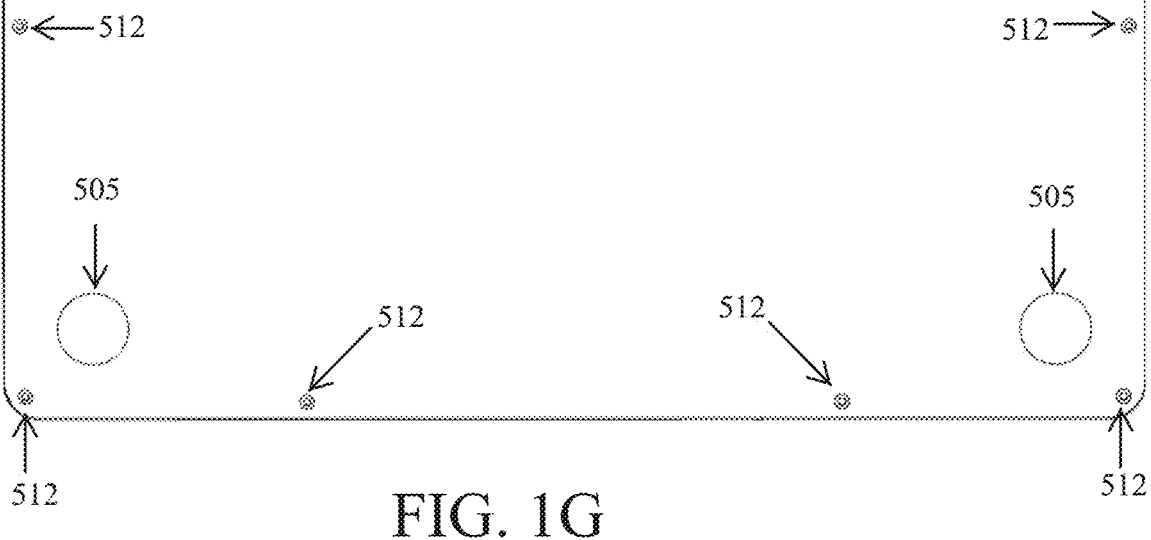

FIG. 1G is a bottom view of the portable computer 100 according to the embodiment of FIG. 1A in a close cover position. The bottom of the portable computer 100 includes mounting holes 512, bottom air duct holes 515, and support feet 505. The mounting holes 512 are used to fasten the lower part 500 to the edge part 400 of the chassis 150. The bottom air duct holes 515 are directly below the positions of the cooling fans 220 inside the chassis. Depending on the orientation of the cooling fans 220, the bottom air duct holes 515 may be used to draw in cold air or expel hot air. In this embodiment, the right bottom air duct holes 515 are used to draw in cold air. FIG. 1G shows a cooling fan 220 that can be seen through the right bottom air duct holes 515. If the portable computer 100 requires additional cooling, there are also mounting holes 510 (covered by the support feet 505, and clearly shown in FIG. 5B) to install an auxiliary cooling system.

Figure 2A:
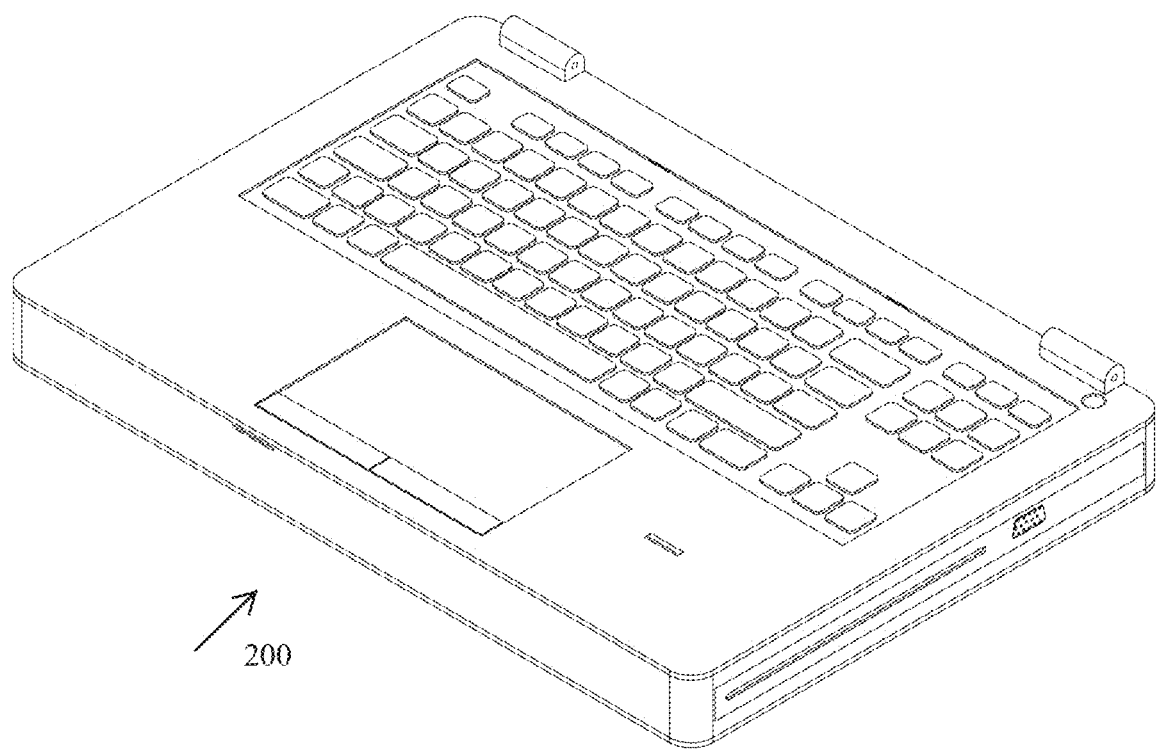
FIG. 2A is a view of the base portion of the portable computer according to the embodiment of FIG. 1A.
Figure 2B:
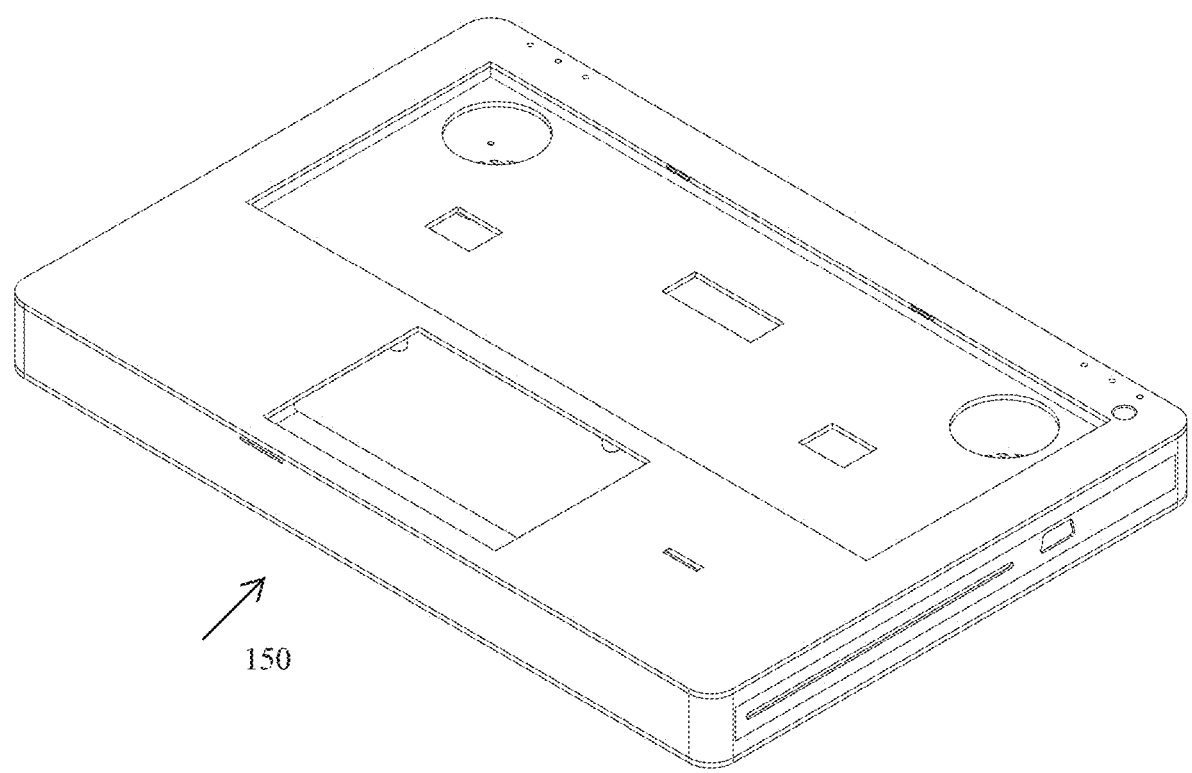
FIG. 2B is a view of the chassis of the portable computer according to the embodiment of FIG. 1A.
Figure 2C:
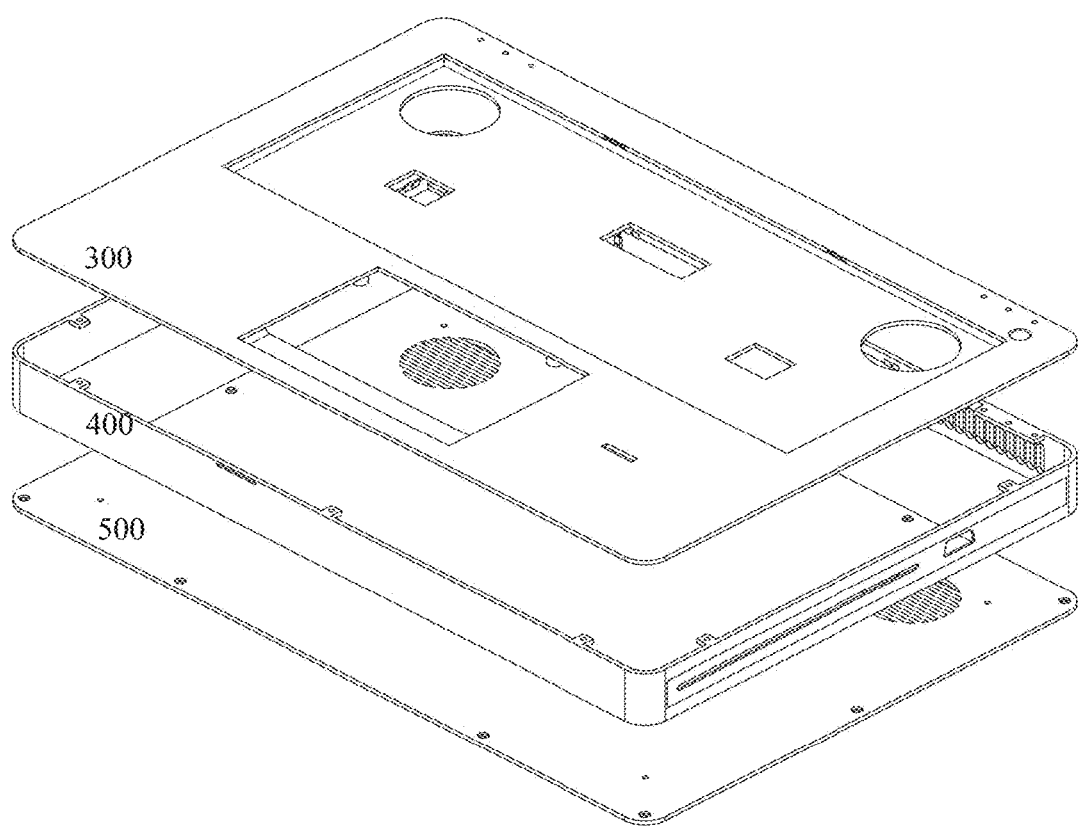
FIG. 2C is an exploded view of the chassis according to the embodiment of FIG. 1A.
Figure 2D:
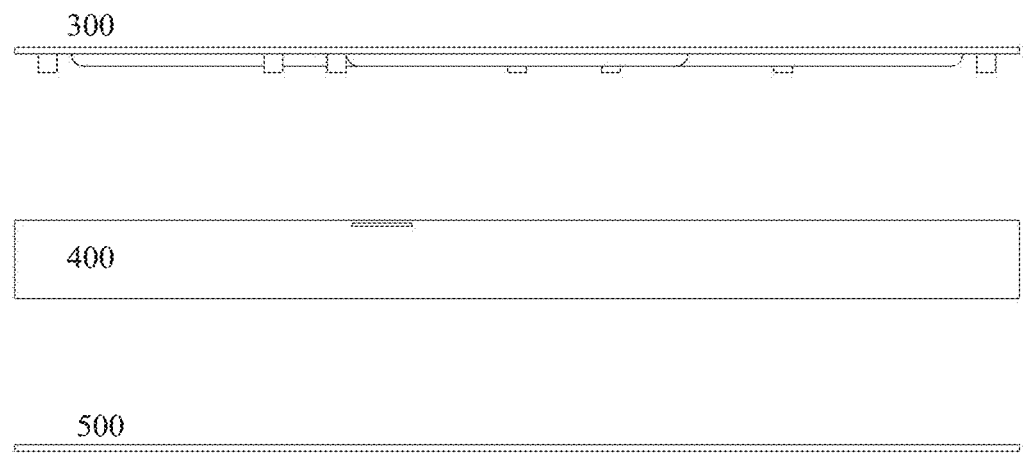
FIG. 2D is a front exploded view of the chassis according to the embodiment of FIG. 1A.

Turning now to FIGS. 2A through 2D, which show the base portion 200 of the portable computer 100 according to the embodiment of FIG. 1A. The base portion 200 of the portable computer 100 is pivotally attached with the top portion 105 of the portable computer 100. The base portion 200 includes the chassis 150 and components. FIG. 2B shows the chassis 150, which includes the upper part 300, edge part 400, and lower part 500. All these parts are shown in greater detail in the exploded view of FIG. 2C. FIG. 2D shows a front exploded view of the upper part 300, edge part 400 and lower part 500. Details of the upper part 300, edge part 400, and lower part 500 will be described in FIGS. 3-5.

As described above, the chassis 150 of the portable computer 100 includes the upper part 300, edge part 400, and lower part 500, all of which are removable. Therefore, the chassis 150 has the advantage that only one of its three parts needs to be replaced in the event of an upgrade or repair.

Figure 3A:
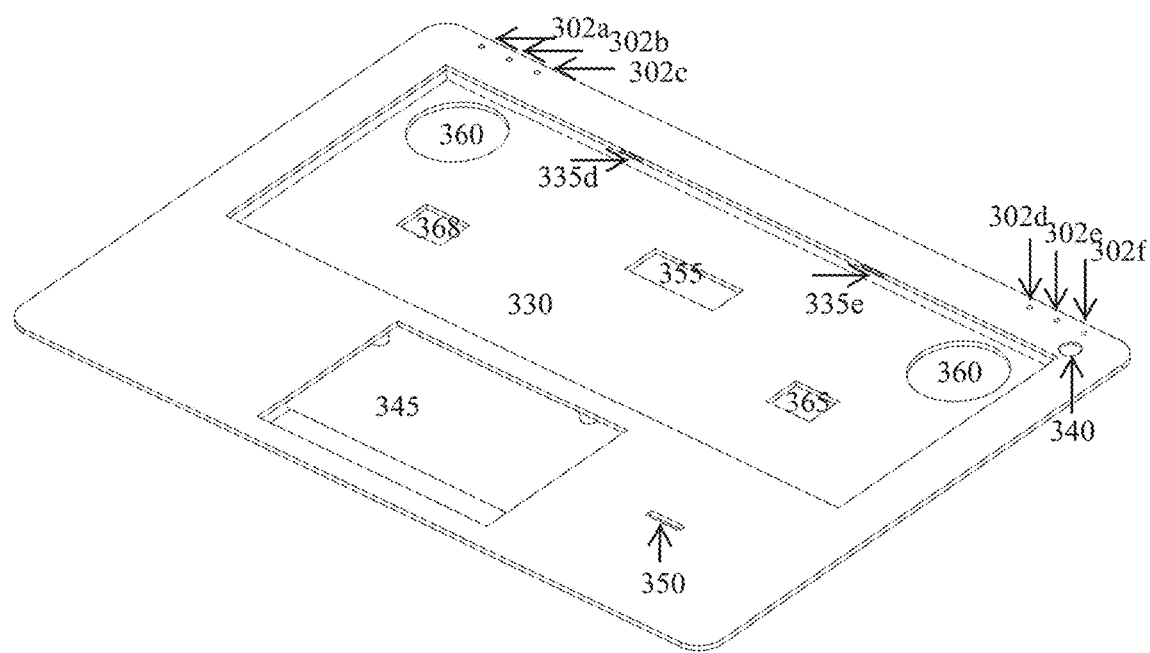
FIG. 3A is an exterior view of the upper part of the chassis according to the embodiment of FIG. 1A.
Figure 3B:
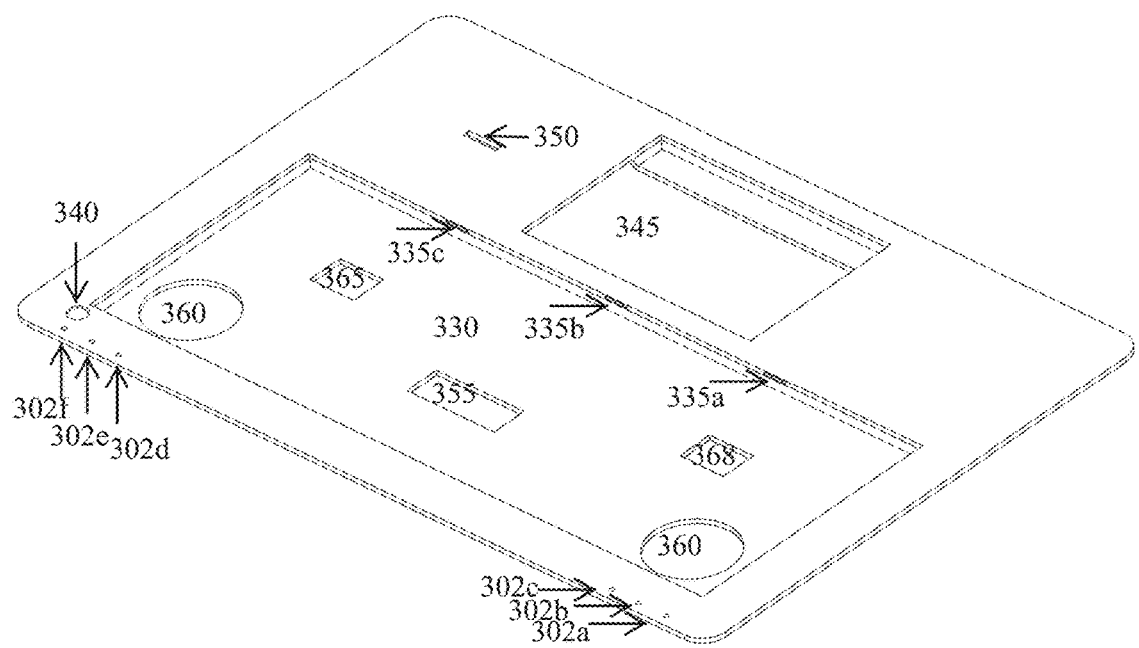
FIG. 3B is a 180 degree rotated view of FIG. 3A.

Turning now to FIGS. 3A through 3E, the upper part 300 of the chassis 150 according to the embodiment of FIG. 1A is shown. More specifically, FIGS. 3A and 3B show exterior views of the upper part 300. The upper part 300 of the chassis 150 has a variety of functions, which include accommodating pointing input devices. These pointing input devices include a keyboard 305 and a touchpad 310. The upper part 300 can also accommodate other components, such as a fingerprint reader 325 and a power button 320. The opening 340 is used to accommodate the power button 320. The power button 320 can also be integrated into the keyboard 305 to reduce the component count.

FIG. 3A shows a keyboard holder 330, a touchpad opening 345 and a fingerprint reader opening 350 to accommodate the keyboard 305, touchpad 310 and fingerprint reader 325. The portable computer 100 can have various types of keyboards, although it usually has a low profile keyboard 305 to save space and provide a comfortable typing experience for the user. The keyboard holder 330 can be made of metal and is lower than the rest of the upper part 300. On the front and rear sides of the keyboard holder 330, there are several keyboard slots 335. The keyboard slots 335 on the front side are labeled 335a-335c and the keyboard slots 335 on the rear side are labeled 335d and 335e. The keyboard 305 will be locked in securely by the keyboard slots 335 once it is installed in the keyboard holder 330. After installing the keyboard 305, the keyboard will be roughly the same level with the rest of the upper part 300. The opening 355 allows a keyboard cable to pass through to connect to a keyboard connector (shown in the later figures) on the motherboard.

There are more openings in the keyboard holder 330. The openings 360 are just above the cooling fans 220 on the motherboard, and allow air circulation between the interior and exterior of the portable computer 100. Depending on the orientation of the cooling fans 220, the openings 360 can be used to draw in cold air or expel hot air. In this embodiment, the openings 360 are used to expel hot air from the portable computer 100. The cooling fans 220 can expel heat from heat sources such as the processor and the graphics card to the outside of the portable computer 100 through the openings 360 and the keyboard 305. The opening 365 can be used for any additional connection that the keyboard may require. For example, a backlit keyboard, which is a keyboard equipped with lights, can be installed in the portable computer 100. In this case, a backlit cable can pass through the opening 365 to connect to a connector on the motherboard, so that the lights in the keyboard 305 can be powered. The lights provide illumination behind and around the keys so they are more visible in low light environments. The opening 368 can also help with the air circulation of the portable computer 100. Heat from the portable computer 100 may be transferred to the outside of the portable computer 100 through the opening 368 and the keyboard 305. Additional openings on the upper part 300 can be added to provide extra air circulation to remove heat from components inside the chassis 150.

There are also hinge mounting holes 302 on the left and right of the upper part 300. The screws can pass through the hinge holes, the hinge mounting holes 302 and be further fastened into the edge part 400. The suffixes a to f are added to indicate different hinge mounting holes. In the embodiments, the hinge mounting holes 302 and other mounting holes in the chassis 150 are female threaded and the fastening screws are male threaded.

The upper part 300 may have other openings for specialty buttons. For example, a portable computer 100 may be equipped with a one key restore button. One click of the button can restore the portable computer 100 to its factory state. The upper part 300 may also have a few logos and engraved banners of the make and/or model of the portable computer 100.

Figure 3C:
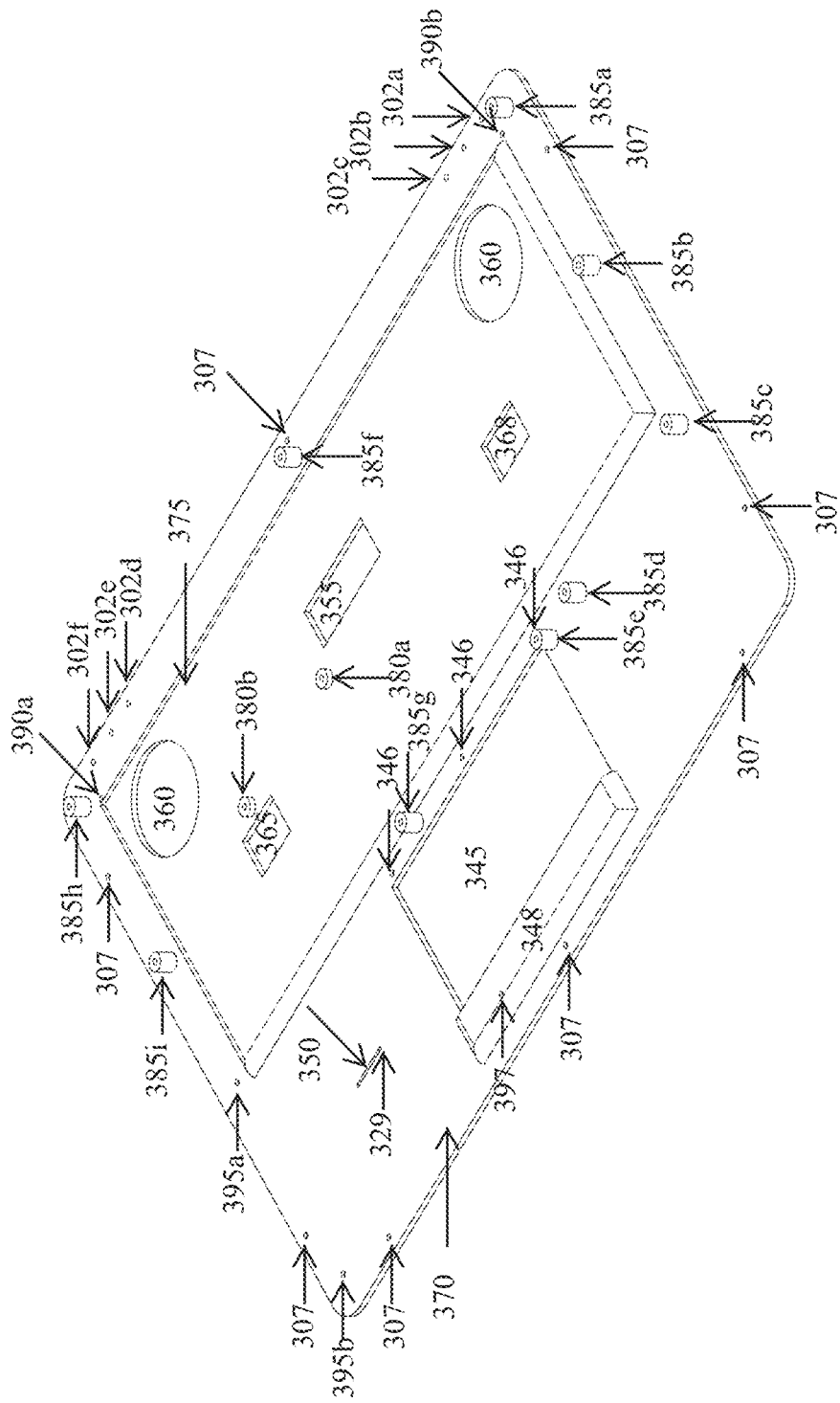
FIG. 3C is an interior view of the upper part of the chassis according to the embodiment of FIG. 1A.
Figure 3D:
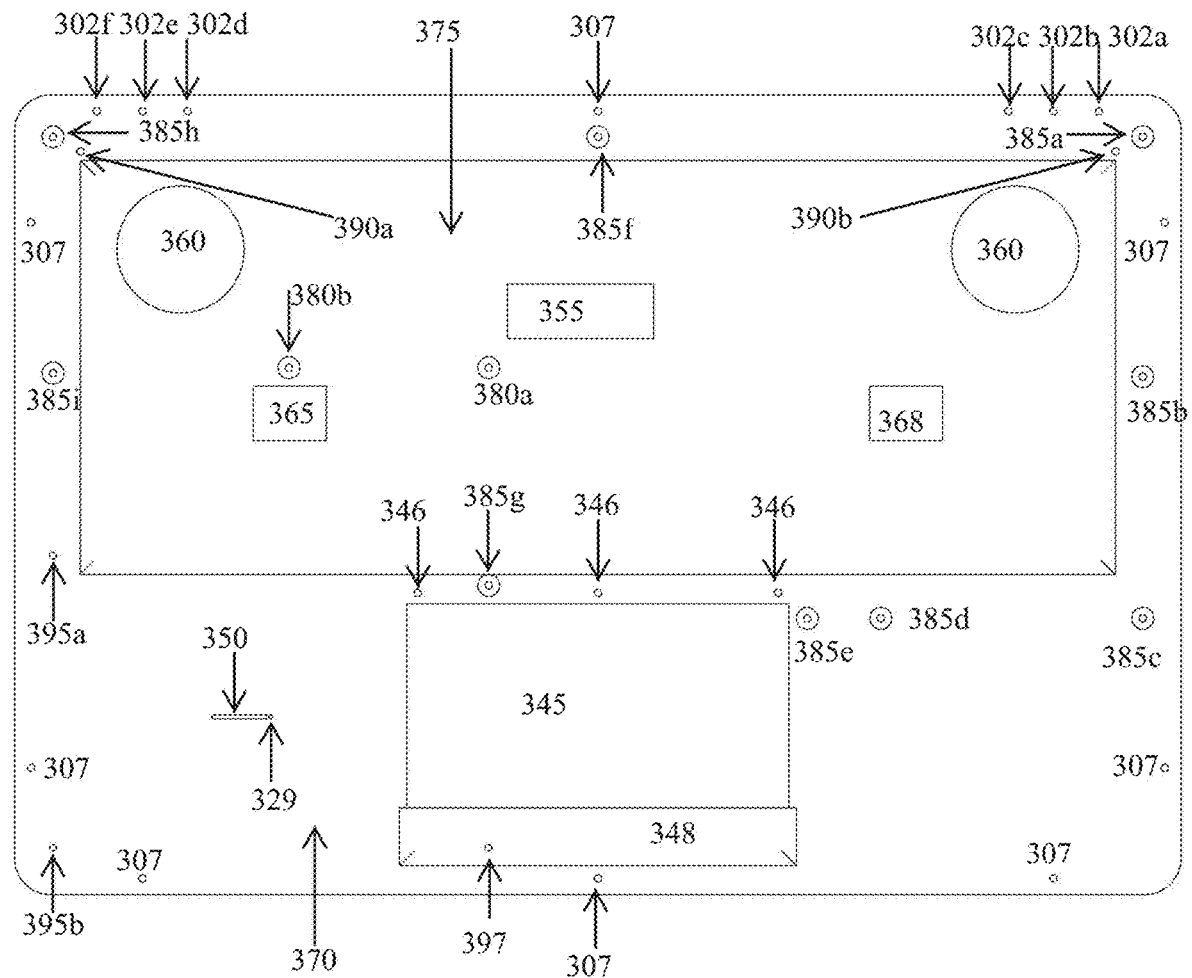
FIG. 3D is an interior top view of the upper part of the chassis according to the embodiment of FIG. 1A.
Figure 3E:
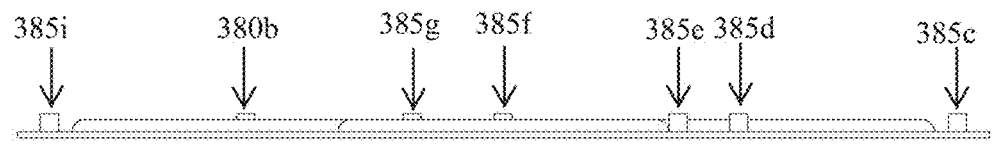
FIG. 3E is a front view of the upper part of the chassis according to the embodiment of FIG. 1A.

FIGS. 3C through 3E show interior and front views of the upper part 300. As shown in FIGS. 3C through 3E, the interior side 370 of the upper part 300 can provide supports and fixtures for the keyboard 305, touchpad 310 and fingerprint reader 325. FIG. 3D is an interior top view of the upper part 300 of the chassis 150 according to the embodiment of FIG. 1A. Around the touchpad opening 345 and fingerprint reader opening 350, there are mounting holes 346 and 329 for mounting the touchpad 310 and the fingerprint reader 325 to the upper part 300. There is also a touchpad mounting ridge 348 for fixing the touchpad 310 to the upper part 300. When the touchpad 310 is installed, its bottom end is supported by the touchpad mounting ridge 348, and its top end is fixed to the upper part 300 by mounting screws. The screws fix the touchpad 310 and the fingerprint reader 325 to the upper part 300 through the mounting holes 346 and 329. There are mounting holes along the edges of the upper part 300 to secure the upper part 300 to the edge part 400. Of these mounting holes, the hinge mounting holes 302 (also shown in FIGS. 3A and 3B) are used to mount the hinges 140, the upper part 300 and the edge part 400 together. The upper part mounting holes 307 are used to secure the upper part 300 and the edge part 400 together. Both types of mounting holes are female threaded, so the screws can be fixed in them securely.

As shown in FIGS. 3C and 3D, the central area 375 of the interior side 370 is the interior wall of the keyboard holder 330 and is higher than the rest of the interior side 370. FIGS. 3C and 3D also show two short mounting stands 380 on the central area 375, and nine tall mounting stands 385 on the rest of the interior side 370 of the upper part 300. As shown in FIGS. 3C through 3E, all stands 380 and 385 are marked with a suffix. The tops of the mounting stands 380 and 385 are level, because the short mounting stands 380 are located on the central area 375 with a higher horizontal base level. The short mounting stands 380 and the tall mounting stands 385 can be a variety of shapes, such as a cylindrical shape or a hexagonal shape. In this embodiment, all mounting stands 380 and 385 are a cylindrical shape. These stands have flat tops with female threaded holes in the center. Screws can be screwed into the mounting stands 380 and 385 to secure the motherboard and other components to the interior side 370 of the upper part 300. These stands are made of metal to ground the motherboard and components to the chassis 150. The contact points of these stands are elevated because the motherboard has components on both sides.

As said, in the embodiment, the motherboard and other components are fixed onto the upper part 300 by stands 380 and 385. Note that in the portable computer 100, some stands are shared by two or more components to reduce the total number of stands. For example, the stand 385g is shared by the 2.5 inch hard drive and the optical drive. The stand 380a is shared by the motherboard and the 2.5 inch hard drive. In some cases, one or both of the optical drive and the 2.5 inch hard drive can be omitted. Therefore, the motherboard and/or battery can be replaced with one of a larger size. In subsequent embodiments, standoffs are added to mount a larger motherboard on the same upper part 300 as this embodiment. The stands and standoffs can be used to mount different components in different situations. These will be discussed later in subsequent embodiments.

FIGS. 3C and 3D also show cooling fan mounting holes 390. These two female threaded holes, labeled 390a and 390b, are located directly below the positions of the mounting holes of the two possible cooling fans 220. To secure the cooling fans 220 to the upper part 300, screws can pass through the mounting holes around the edges of the cooling fans 220 into the mounting holes 390. If one of the cooling fans is omitted, the motherboard can be replaced by a larger one to take up the space formerly allocated to the cooling fan. In addition, a standoff, which can be used to install and ground the larger motherboard, can be installed in the corresponding threaded hole.

FIGS. 3C and 3D further show two female threaded mounting holes 395 along the left edge of the interior side 370 of the upper part 300. Furthermore, there is another female threaded mounting hole 397 located in the touchpad mounting ridge 348. In this embodiment, the mounting holes 395, which are labeled 395a and 395b, are covered by the optical drive. As described before, the optical drive can be omitted in some cases. The cooling fan mounting holes 390 and the mounting holes 395 and 397 can have standoffs screwed into them that can be used to mount a larger motherboard, a larger battery or other components. The standoffs are flat on both ends with a male threaded screw extending out of one end and a female threaded hole in the center of the other end. The standoffs can be screwed into female threaded mounting holes 390, 395 and 397 on the interior side 370. Once the standoffs are installed on the interior side 370, they are level with the stands and have the same supporting function. After aligning the component mounting holes with the stands or standoffs, the component can be secured by screwing screws through the mounting holes and into the female threaded holes of the stands or standoffs.

Please note that these standoffs can be installed and uninstalled if necessary. These standoffs can be a variety of shapes, such as a cylindrical shape or a hexagonal shape. In the embodiments, all the standoffs are a hexagonal shape. Hexagonal standoffs have the advantage of being easier to remove or install than cylindrical ones. These standoffs are made of metal to ground components to the chassis. These standoffs provide elevation because there are components on both sides of the motherboard. Details of the standoffs and their applications will be described in the following embodiments.

FIG. 3E shows a front view of the upper part 300 of the chassis 150. In FIG. 3E, stands 385c-385g, stand 385i and stand 380b are shown. Some stands are not shown because they are blocked by other stands. As shown, the tops of all the mounting stands 380 and 385 are at the same horizontal level. Please note that in this embodiment, optional components such as the 2.5 inch hard drive and optical drive are present, so standoffs are not required. Embodiments that require standoffs will be described in detail later.

Figure 4A:
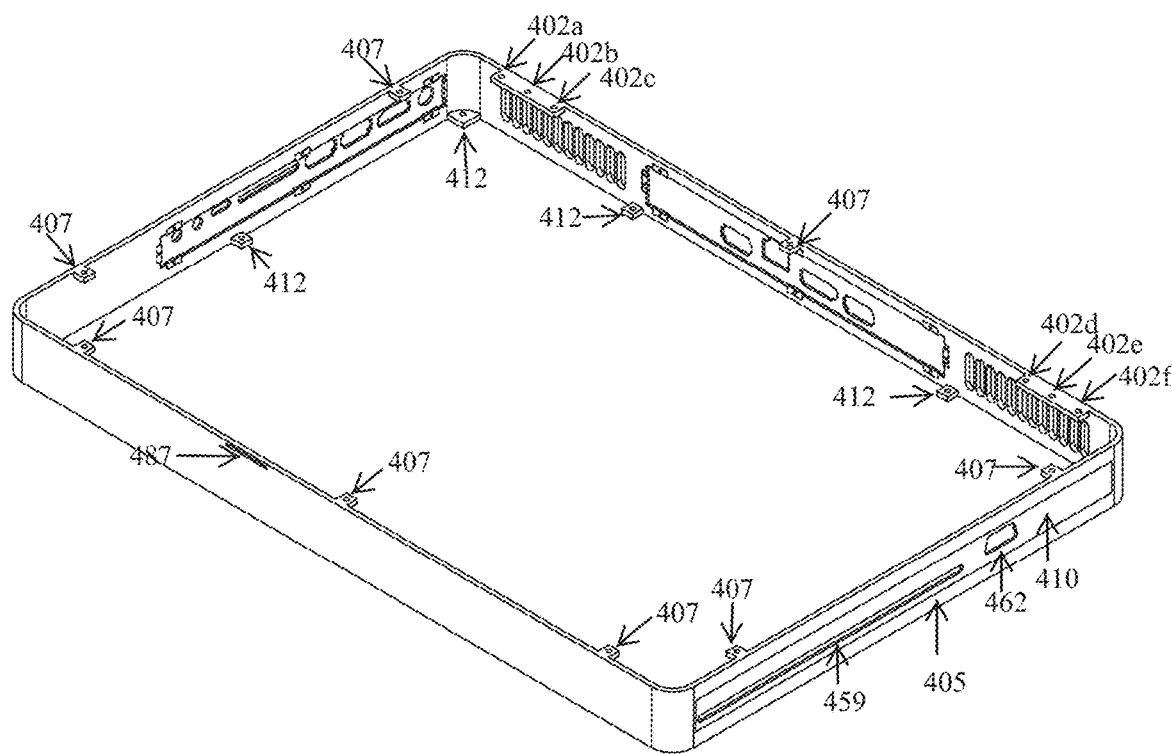
FIG. 4A is a front facing view of the edge part of the chassis equipped with removable I/O plates according to the embodiment of FIG. 1A.
Figure 4B:
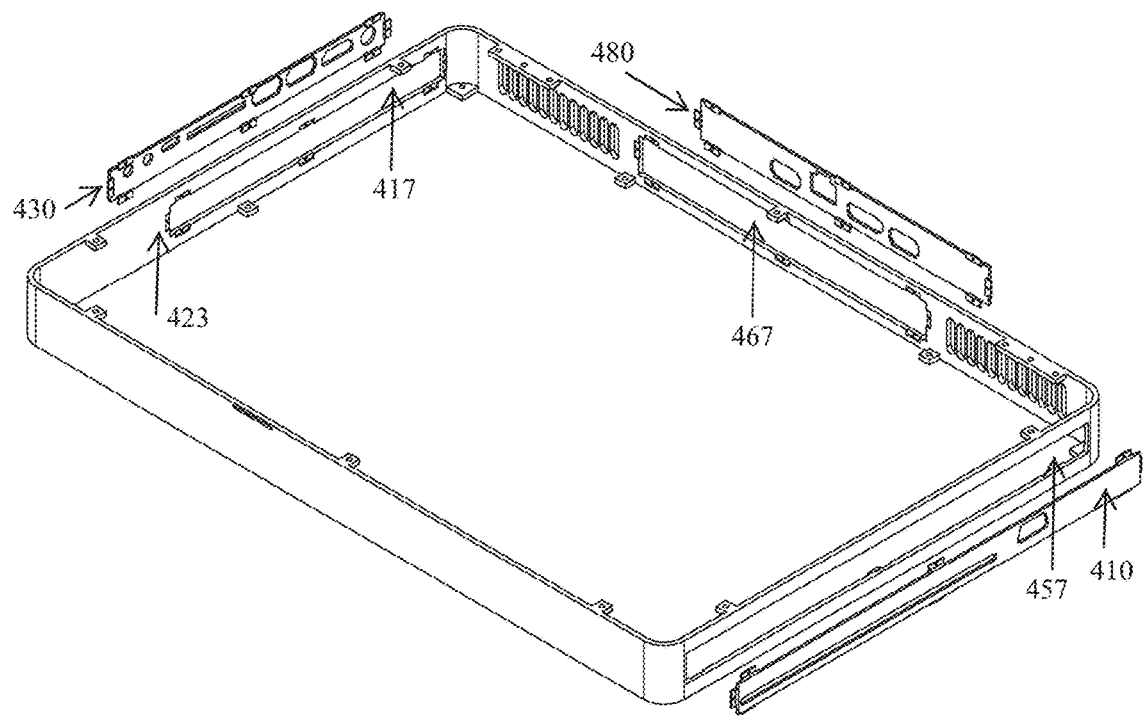
FIG. 4B is an exploded view of FIG. 4A.
Figure 4C:
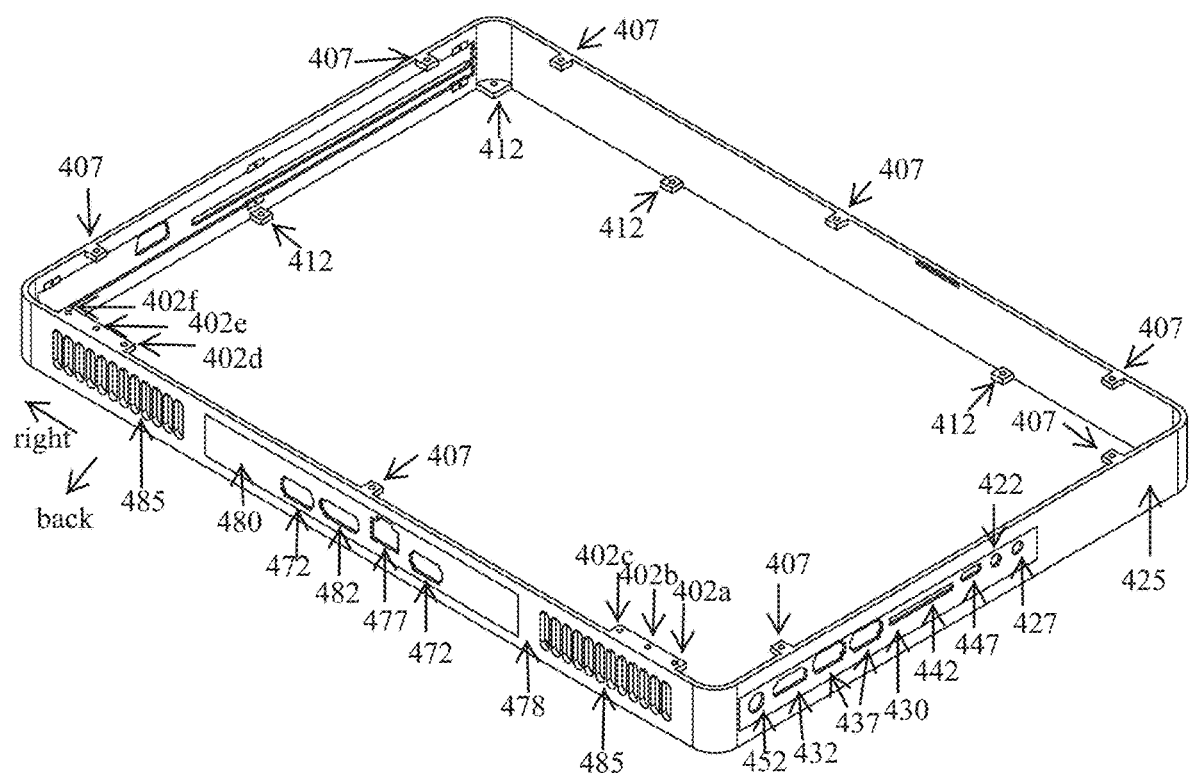
FIG. 4C is a rear facing view of the edge part of the chassis equipped with removable I/O plates according to the embodiment of FIG. 1A.
Figure 4D:
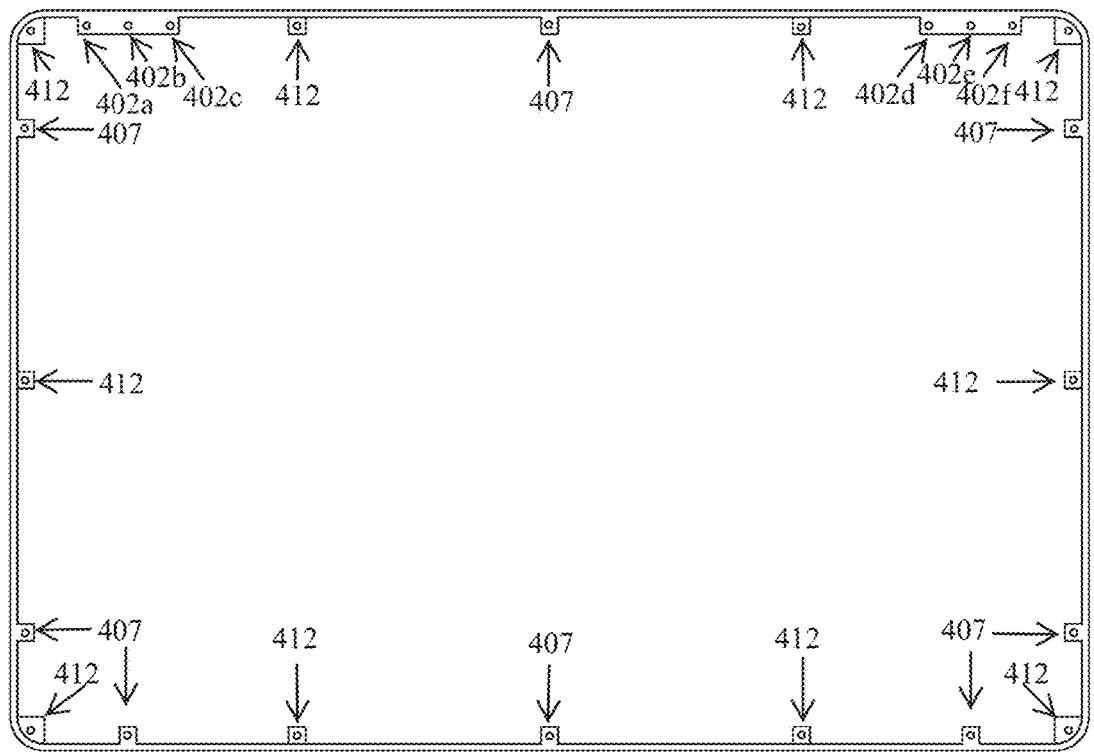
FIG. 4D is a top view of the edge part of the chassis according to the embodiment of FIG. 1A.
Figure 4E:
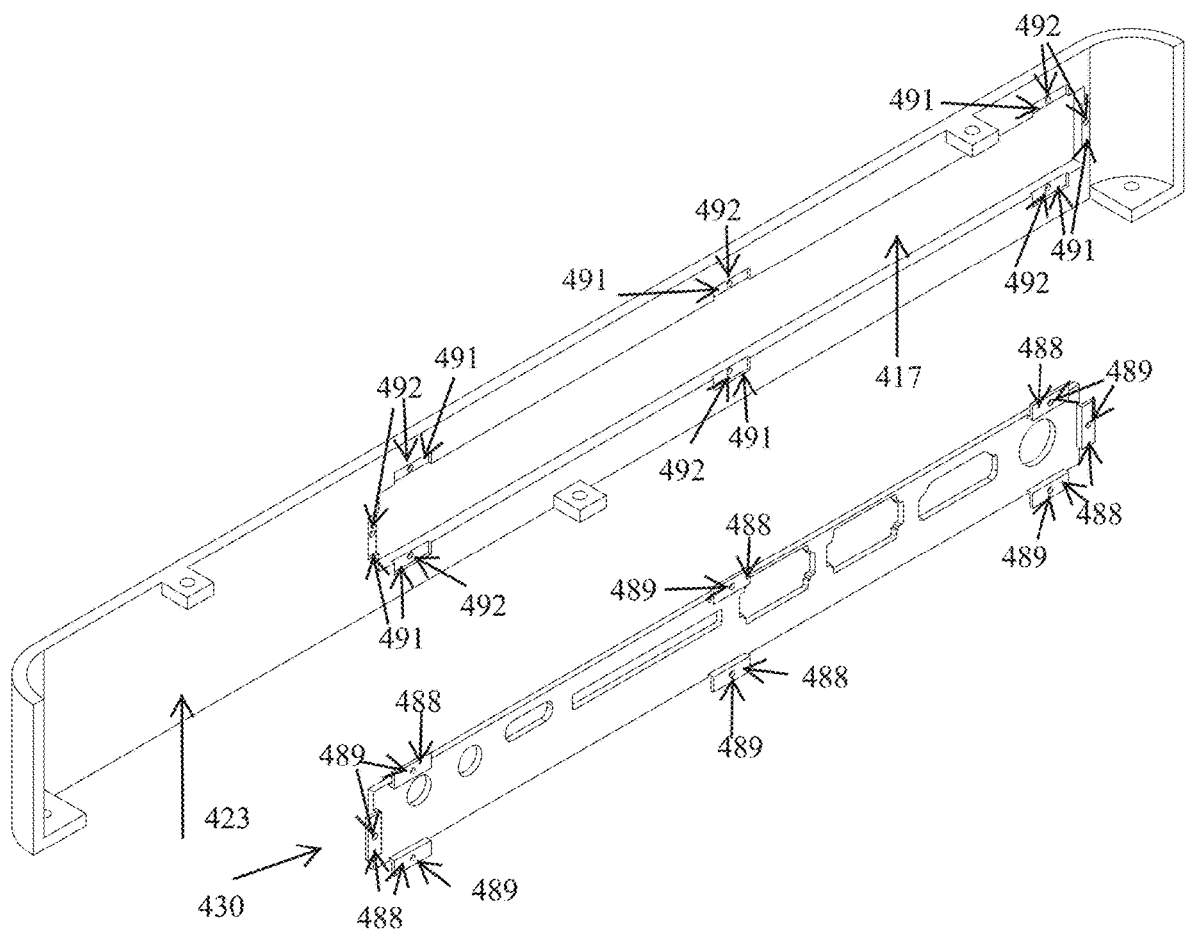
FIG. 4E is a magnified exploded view of the left side of the edge part equipped with removable I/O plates according to the embodiment of FIG. 1A.

Turning now to FIGS. 4A through 4C, views of the edge part 400 of the chassis 150 equipped with removable I/O plates are shown. Please note that the left and right side walls of the edge part 400 can be wedge-shaped instead of rectangular. The wedge shape has advantages in reducing the overall physical size and weight of the portable computer 100, so it can be used as an option for a more compact portable computer 100. More specifically, FIG. 4A is a front facing view of the edge part 400 of the chassis 150 equipped with removable I/O plates according to the embodiment of FIG. 1A. FIG. 4B is an exploded view of FIG. 4A. In FIG. 4B, in order to better understand the structure of the removable I/O plates, they have been moved to the outside of the edge part 400. FIG. 4C is a rear facing view of the edge part 400 of the chassis 150 equipped with removable I/O plates according to the embodiment of FIG. 1A. Note that in FIG. 4C, the right side of the edge part 400 is located on the left side of the figure. FIG. 4D shows a top view of the edge part 400. In FIG. 4E, a method to mount removable I/O plates on the side walls of the edge part 400 is proposed.

FIGS. 4A through 4D show mounting holes for fixing the edge part 400 to the upper part 300 and the lower part 500. The mounting holes 402a to 402f have two functions. Unlike the other mounting holes 407, the mounting holes 402 also mount the hinges 140 to the chassis 150. One arrangement is to use a screw with male threads to pass through the hinges 140, the hinge mounting holes 302 (shown in FIG. 3A) and the mounting holes 402 to secure the hinges 140, the upper part 300 and the edge part 400 together. As mentioned earlier, the screws are male threaded and the mounting holes are female threaded. In this embodiment, a suffix is added to group the mounting holes. All mounting holes with the same suffix are fixed with the same screw. For example, the mounting holes 302a, 402a and a hinge hole are fastened together by the same screw. On the top of the edge part 400, there are additional mounting holes 407. Screws can be screwed into the mounting holes 407 on the edge part 400 and the mounting holes 307 on the upper part 300 to fasten the two parts together.

As shown in FIGS. 4A through 4D, there are also mounting holes 412 on the bottom of the edge part 400. The mounting holes 412 are used to fasten the edge part 400 and the lower part 500 together. Screws can be screwed into the mounting holes 512 and 412 to secure the lower part 500 to the edge part 400. After that, the upper part 300, lower part 500 and edge part 400 will be combined to form the entire chassis 150. If there is a problem with the chassis 150, only the problematic part needs to be replaced. For example, if the chassis 150 is not tall enough, a taller edge part 400 can be installed. The replaced edge part 400 has the same horizontal dimensions as the original edge part 400, but a different height. The mounting holes 402, 407, and 412 of the replaced edge part are located in the same horizontal position as the mounting holes of the original edge part. A top view of the edge part 400 is shown in FIG. 4D. FIG. 4D shows the horizontal positions of all the mounting holes on the top and bottom of the edge part 400.

FIGS. 4A through 4C show side views of the edge part 400 of the chassis 150. In the left side wall 425, there is a big opening 417 that is used to accommodate the left removable I/O plate 430. In the left removable I/O plate 430, there are a number of openings that are used to accommodate various I/O ports. More specifically, openings 422 and 427 are used to accommodate a headphone jack 435 and a microphone jack 440, respectively. The opening 432 is used to accommodate an HDMI port 445. The openings 437 are used to accommodate USB ports 450. The openings 442, 447, and 452 are used to accommodate a card reader 460, USB C port 455, and power port 465, respectively. In the right side wall 405, there is a big opening 457 that is used to accommodate the right removable I/O plate 410. In the right removable I/O plate 410, there are two openings. The opening 459 is used to accommodate the optical drive slot 420. The opening 462 is used to accommodate the VGA port 415. In the middle of the rear side wall 478, there is a big opening 467 that is used to accommodate the rear removable I/O plate 480. In the rear removable I/O plate 480, there are a number of openings that are used to accommodate I/O ports. The openings 472 are used to accommodate USB ports 450. The openings 477 and 482 are used to accommodate a network port 490 and a DisplayPort 495, respectively. Multiple I/O plates provide many input and output options for the operation of the portable computer 100. In the rear side wall 478, there are air duct holes 485 on both sides of the opening 467. These air duct holes 485 allow the cooling fans 220 of the portable computer 100 to circulate air with the external environment. In the embodiment, in the front side wall 470, there are openings 487 that are used to accommodate LEDs 475, such as a battery charging LED 475a, power LED 475b, hard drive LED 475c and wireless operating status LED 475d.

There are many ways to mount removable I/O plates on the side walls. In this embodiment, a way to mount removable I/O plates on the side walls of the edge part 400 is proposed. In FIG. 4B, the left interior wall 423 of the edge part 400 is shown. In FIG. 4E, the left interior wall 423 and the left removable I/O plate 430 are shown. As shown in FIG. 4E, the left removable I/O plate 430 has extended areas 488 along its edges. In the center of the areas 488, there are mounting holes 489, which can be fixed to the left interior wall 423 with screws. On the left interior wall 423, along the edges of the opening 417, there are areas 491 that are lower than the rest of the wall. In the center of the areas 491, there are mounting holes 492. The mounting holes 489 and 492 are female threaded. Screws can fix the left removable I/O plate 430 to the left interior wall 423 through the mounting holes 489 and 492. Each of the areas 491 on the left interior wall 423 is slightly larger than each of the areas 488 on the left removable I/O plate 430. As mentioned above, the areas 491 are lower than the rest of the wall. After the areas 488 are superimposed into the areas 491, the resulting surface of the superimposed areas will become roughly level with the left interior wall 423. The right removable I/O plate 410 and the rear removable I/O plate 480 can be mounted the same way. Please note, there are other ways to mount the removable I/O plates, which are not limited herein.

A removable I/O plate can be a rectangle or a rectangle with rounded corners. If the left and right side walls of the edge part 400 are wedge-shaped, the left and right removable I/O plates can be triangle shaped. In this embodiment, all removable I/O plates are rectangular. However, they can be any other shape, which are not limited herein. Obviously, the shapes and dimensions of the removable I/O plates 410, 430 and 480 have to match their respective openings 457, 417 and 467.

When a motherboard with different I/O ports is installed, there is no need to replace the entire chassis, only the I/O plates need to be replaced. In the case where there are no I/O ports on one side of the motherboard, a dummy I/O plate or an air duct I/O plate can be installed on that side. A dummy I/O plate is a plain I/O plate without any openings, and an air duct I/O plate is an I/O plate with air duct holes for air circulation. A dummy I/O plate can also be used to provide more I/O options for a portable computer. For example, a dummy I/O plate can be installed on the front side wall 470 of the edge part 400. If there is a need to mount a removable I/O plate on the front side wall 470 of the edge part 400, the dummy I/O plate can be easily removed and replaced.

Figure 5A:
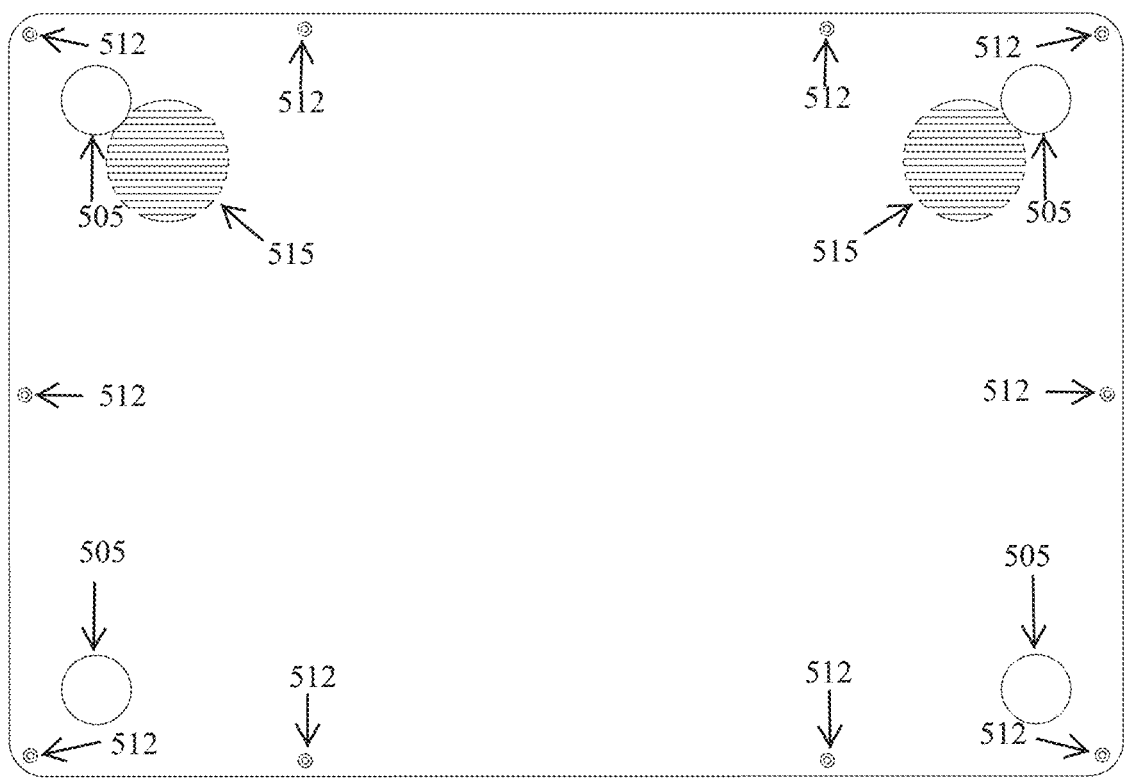
FIG. 5A is an exterior view of the lower part of the chassis according to the embodiment of FIG. 1A.
Figure 5B:
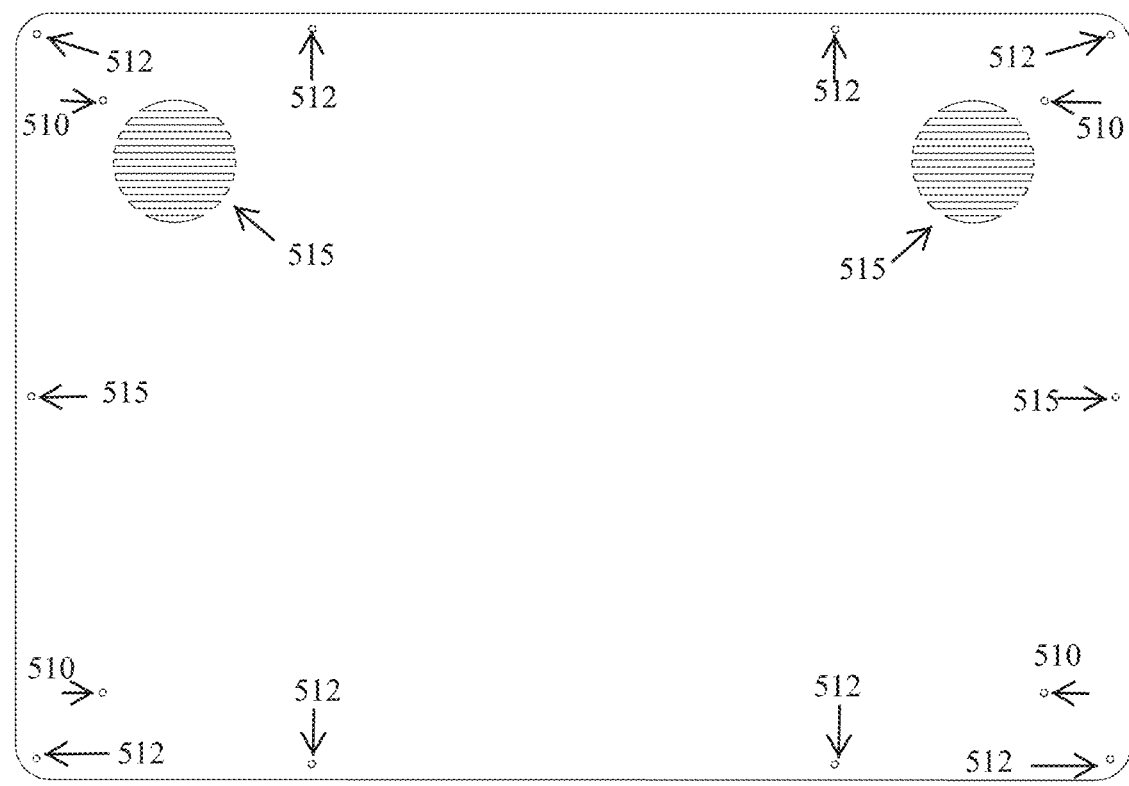
FIG. 5B is an interior view of the lower part of the chassis according to the embodiment of FIG. 1A.

Turning now to FIGS. 5A and 5B, views of the lower part 500 of the chassis 150 according to the embodiment of FIG. 1A are shown. The lower part 500 of the chassis 150 is also the bottom cover of the portable computer 100. FIG. 5A shows an exterior view of the lower part 500 of the chassis 150 according to the embodiment. On the exterior side of the lower part 500, there are support feet 505, mounting holes 512, and bottom air duct holes 515. The bottom air duct holes 515 allow the cooling fans 220 to increase air circulation. There are also mounting holes 510, which can be used to install an auxiliary cooling system if the portable computer 100 needs additional cooling. In this embodiment, the mounting holes 510 are covered by the support feet 505, which are glued or fastened to the lower part 500.

FIG. 5B is an interior view of the lower part 500 of the chassis 150 according to the embodiment of FIG. 1A. The mounting holes 512 are used to fasten the lower part 500 and the edge part 400 of the chassis 150 together. The bottom air duct holes 515 and the mounting holes 510 are also on the interior side of the lower part 500.

Figure 6:
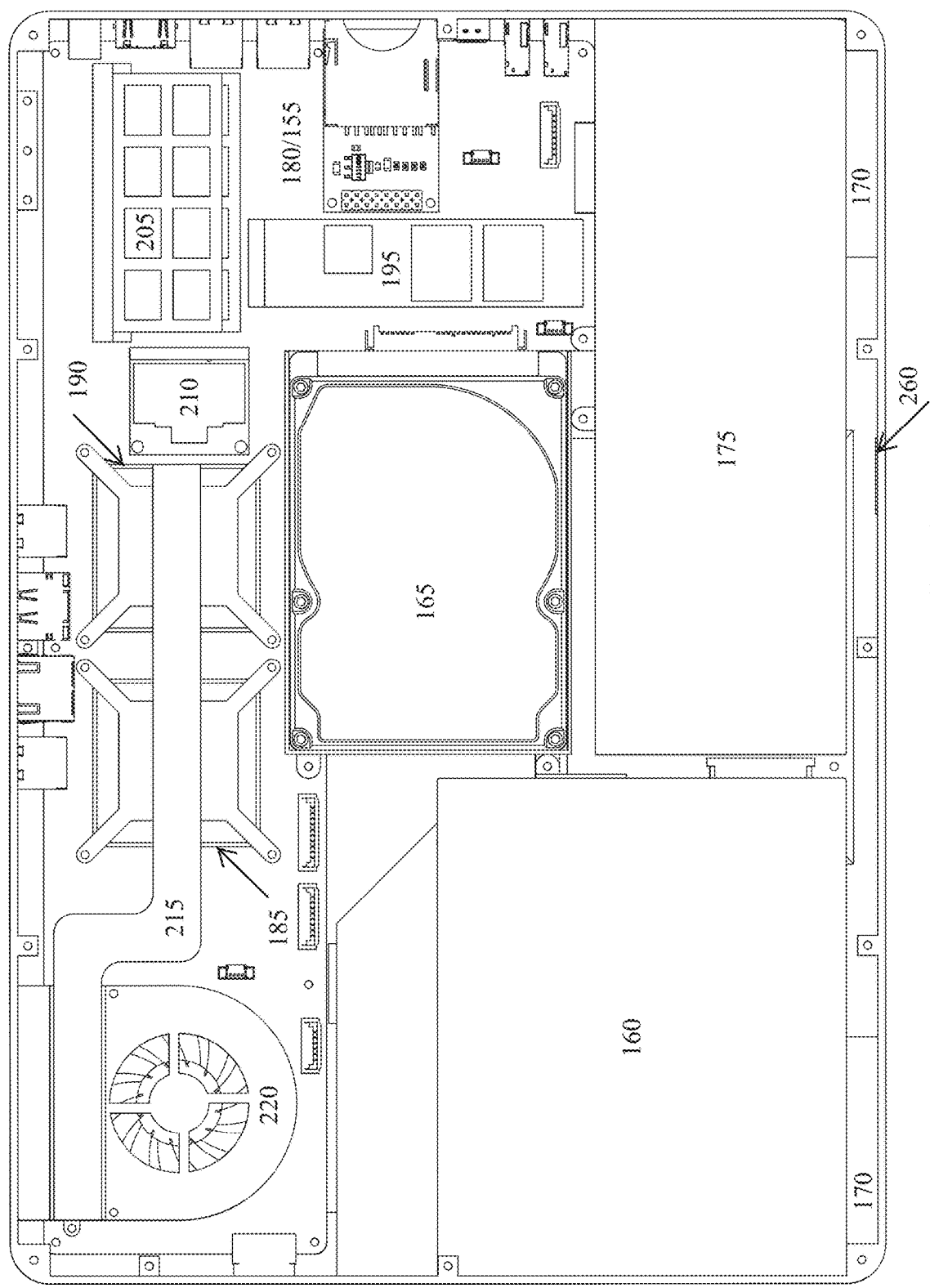
FIG. 6 is a view of the internal components and structures from the bottom of the portable computer with the lower part of the chassis removed according to embodiment of FIG. 1A.

Turning now to FIG. 6, a view of the internal components and structures from the bottom of the portable computer 100 with the lower part 500 of the chassis 150 removed according to embodiment of FIG. 1A is shown. As shown in FIG. 6, in this embodiment, the components include a motherboard 180, an optical drive 160, a 2.5 inch hard drive 165, speakers 170, a battery 175, a processor 185, a graphics card 190, a solid-state drive (SSD) 195, memory 205, a wireless card 210, a heatsink module 215, a cooling fan 220, an LED board 260, etc. There are also many connectors, I/O ports, mounting holes, etc., which will be explained in detail later. The processor 185 and graphics card 190 are located underneath the heatsink module 215.

When components are mounted in the chassis, their dimensions and mounting holes are all important. As shown in FIG. 6, many components and accessories are located on the motherboard 180. These components and accessories include a processor 185, a graphics card 190, an SSD 195, memory 205, a wireless card 210, a heatsink module 215 and a cooling fan 220. These components and accessories can be soldered, plugged or fixed onto the motherboard 180. Therefore, in terms of the dimensions, when considering the structures and layout of the components in the chassis, the motherboard and all the components (accessories) thereon can be regarded as a whole unit called the motherboard U. The motherboard U 155 is also shown in FIG. 6. Therefore, in this embodiment, the motherboard U 155, speakers 170, battery 175, 2.5 inch hard drive 165, and optical drive 160 need to be considered in the layout and installation of the portable computer 100. FIG. 6 shows an outline of the location of these components in the chassis 150.

Figure 7A:
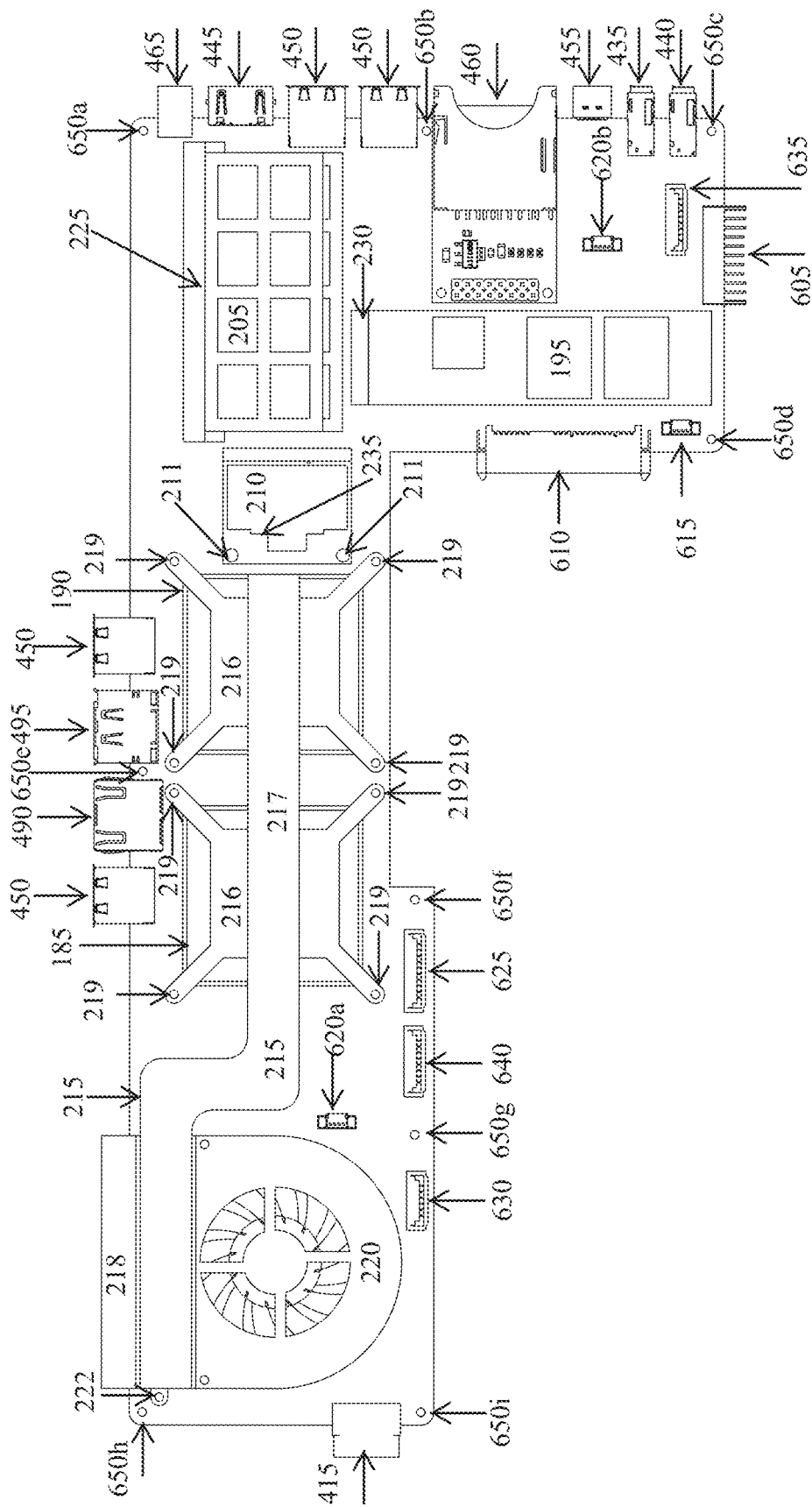
FIG. 7A is a view of the motherboard U according to the embodiment of FIG. 1A.

Turning now to FIGS. 7A through 7F, views of the motherboard U 155 according to the embodiment of FIG. 1A are shown. More specifically, FIG. 7A shows a top view of the motherboard U 155. On the motherboard U 155, there are slots and sockets for installing components. A slot contains a row of pins that can be used to install a component with the same number of pins. After a component is inserted into the slot, the pins of the component contact the pins of the slot. Memory slots 225 are used to install memory 205. There are two memory slots in this embodiment. Depending on the type of memory, the memory 205 and the memory slots 225 have one or two notches between the pins. Generally, these notches allow the memory 205 to fit into the memory slots 225 in only one direction, which prevents the memory 205 from being installed incorrectly. After the memory 205 is installed in the memory slots 225, the portable computer 100 can read information from or write information to the memory 205.

In this embodiment, the memory is a small outline dual in-line memory module, SODIMM for short. There are many types of SODIMMs, such as the DDR SODIMM, DDR2 SODIMM, DDR3 SODIMM, and DDR4 SODIMM. Memory is also called RAM, which stands for read access memory. When the computer is in operation, RAM can store short term information that needs to be processed. The information in the RAM will disappear, whenever the computer is turned off.

The SSD 195 can be one of several different types, such as an mSATA or M.2 type. SATA stands for Serial Advanced Technology Attachment, an industry standard storage interface. SATA technology can connect SATA devices such as optical drives and hard drives to the motherboard. mSATA is a product specification of a new mini-SATA interface controller. The new controller allows SATA technology to be integrated into small-sized devices. mSATA provides the same speed and reliability as the standard SATA interface and can be used to provide storage solutions for portable computing devices.

The M.2 interface is a new host interface solution that is compatible with multiple communication protocols, such as SATA, PCIe, USB, HSIC, UART, SMBus, etc. The M.2 interface is the current SSD interface standard for portable computers, replacing the mSATA interface. In terms of small size and high transmission performance, M.2 can be far superior to mSATA. In this embodiment, the SSD 195 is an M.2 type. In FIGS. 7A through 7F, the M.2 SSD is a PCIe SSD with a 22 mm width and 80 mm length.

Like the memory 205 and memory slots 225, the SSD 195 and SSD slot 230 have the same number of pins and notches. When the SSD 195 is installed in the SSD slot 230, it will be registered as a storage device by the motherboard 180. When the portable computer 100 is operating, information can be read from or written to the SSD 195. Compared to traditional hard drives, SSDs can run at faster read and write speeds.

A wireless card 210 is a terminal wireless network device. It connects to a wireless router or AP (access point) via RF (radio frequency). Through the wireless card 210, the portable computer 100 can connect to other networking devices, the Internet or an intranet. In this embodiment, the wireless card 210 is installed in the wireless card slot 235. Like memory and M.2 SSDs, wireless cards also comply with global standards. The wireless card 210 has one or two antenna connectors 211 that are connected to antennas located underneath the bezel 115. Generally, newer standardized memory, SSDs, and wireless cards are built using more advanced technology, so they perform better than their predecessors. Therefore, the best performance can be obtained by installing the latest standard components in the portable computer 100.

The motherboard 180 can have more slots for additional slot components such as a Bluetooth module. Bluetooth is a wireless technology standard for exchanging data between devices over short distances. The motherboard 180 can have a separate slot for a Bluetooth module. Alternatively, a combo module in which wireless and Bluetooth are integrated in one chip is installed in the wireless card slot 235.

The motherboard 180 has sockets that can be used to install more complex components, such as a processor 185 and graphics card 190. Unlike slots, sockets have multiple rows of holes, with pins at the bottom of each hole. Compared to slots, sockets are used to install components with more pins. The components have the same number of rows and pins as the socket, so each pin can be inserted into the corresponding hole of the socket. The components are designed to install into the socket in only one direction. A processor 185, also known as a central processing unit (CPU), is a large integrated circuit in a portable computer 100 that performs major computing functions and logical tasks. When a processor 185 is installed in the processor socket, its pins are connected to the pins at the bottom of the socket.

A graphics card 190, also known as a graphics processing unit (GPU), is a component designed to manipulate and accelerate image creation in terms of frame rates. In a computer, the GPU can be a dedicated graphics card or embedded graphics. A dedicated graphics card refers to a separate integrated circuit with its own memory. Embedded graphics, on the other hand, refers to a graphics system built in another integrated circuit. Some CPUs have embedded graphics. Embedded graphics typically uses a portion of the memory to process graphics information. A graphics card, like a processor, is a socket type component. Socket type components, like slot type components, are standardized and interchangeable.

As shown in FIG. 6 and FIG. 7A, the portable computer 100 can include one or more cooling mechanisms, such as a heatsink module 215, a cooling fan 220, and other cooling mechanisms apparent to one having ordinary skill in the art. In this embodiment, heat pipe technology is used in the cooling system. The heatsink module 215 and cooling fan 220 are used to cool the processor 185 and graphics card 190 together. The heatsink module 215 includes two stages 216, a heat pipe 217 and a microfin heatsink 218. The heatsink module 215 is fixed on the motherboard 180 by spring fasteners 219. In FIG. 7A, the stages 216 acquire heat from the processor 185 and the graphics card 190. The stages 216 are usually made of a metal with good heat transfer ability, such as copper. Between each of the stages 216 and the surface of the processor 185 and graphics card 190, there is a thin layer of thermal compound or thermal pad. When a stage 216 is installed, four spring fasteners 219 apply force to the thermal compound or the thermal pad. The force either spreads the thermal compound or changes the shape of the thermal pad and creates good thermal contact between the stage surface and the chip surface. The coolant liquid in the heat pipe 217 is in contact with the stage surface and turns into vapor by absorbing heat from the surface. The vapor is then transferred inside the heat pipe 217 to the end of the heat pipe 217, where a microfin heatsink 218 is located. The vapor releases the latent heat to the microfin heatsink 218 and condenses back into coolant again. The heat from the microfin heatsink 218 is discharged out of the portable computer 100 by a cooling fan 220. The coolant then returns to the stages 216 and continues the process again.

As shown in FIG. 7A, there are connectors to connect components to the motherboard 180. A battery connector 605 has a number of chip conductors. After installing the battery 175, these chip conductors are inserted into the slots of the female power connector 176 (shown in FIGS. 15A through 15C) on the battery 175, which connects the battery 175 to the motherboard 180. The female SATA connectors 610 (shown more clearly in FIG. 7C) are soldered to the motherboard 180, and include a female 7-pin data connector 612 and a female 15-pin power connector 614. After the 2.5 inch hard drive 165 is connected to the female SATA connectors 610, the motherboard 180 will recognize it and register it as a storage device of the portable computer 100.

The speaker connector 615 is a 4-pin plug for connecting speakers 170 to the motherboard 180. Fan connectors 620 are used to connect cooling fans. In this embodiment, the fan connector 620a is used to connect the cooling fan 220 to the motherboard 180. The fan connector 620b can serve as the backup for the fan connector 620a or it can be used to connect an auxiliary cooling system. Each fan connector 620 is a 4-pin connector. In addition to powering the cooling fan 220, the motherboard 180 can also detect and control the fan speed through fan connectors 620.

There are some flat ribbon connectors on the motherboard 180. These connectors include an optical drive connector 625, touchpad connector 630, LED connector 635, and fingerprint reader connector 640, which are used to connect the optical drive 160, touchpad 310, LED board 260, and fingerprint reader 325 to the motherboard 180. As shown in FIG. 7A, each of these connectors has a locking clip with slots underneath. Each slot has a built-in pin. After flipping the locking clip and inserting the flat ribbon cable (with the exposed side down) into the slots, the flat ribbon cable will contact the pins of the connector. After closing the locking clip to secure the flat ribbon cable, the component will be connected to the motherboard 180 through the flat ribbon cable.

FIG. 7A also shows input and output (I/O) ports. The I/O ports of the portable computer 100 are located on the sides of the motherboard U 155. On the left side of the motherboard U 155, there is a VGA port 415. On the right side of the motherboard U 155, there are a number of ports including a power port 465, an HDMI port 445, two USB ports 450, a USB C port 455, a card reader 460, a headphone jack 435, and a microphone jack 440. On the rear side of the motherboard U 155, there are two USB ports 450, a network port 490 and a Displayport 495. These I/O ports are also shown in FIGS. 1C, 1D and 1F. Note that since the motherboard U 155 is installed upside down on the upper part 300 of the portable computer 100, the I/O ports on the left side of the motherboard U 155 are actually on the right side of the portable computer 100, while the I/O ports on the right side of motherboard U 155 are actually on the left side of the portable computer 100.

Sensors are installed on the various components of the portable computer 100. The sensors obtain temperature, voltage and other information from the processor 185, graphics card 190, and other components. For example, the temperature of the processor can be monitored by reading the processor's core temperature sensor. The LEDs are used to show the operating status of the portable computer 100. The LEDs change according to the information received from the sensors. The LEDs alert the user if there is a problem, the problem can then be resolved before it worsens and damages the corresponding component.

FIG. 7A also shows nine mounting holes 650 along the edges of the motherboard U 155. The motherboard 180 is made of a multilayer printed circuit board (PCB) with circuits and components throughout. The functionality of the portable computer 100 depends heavily on the complexity of the motherboard 180, which often requires many components and circuits to be arranged in a small area. Therefore, if the mounting holes 650 are located along the edges of the motherboard 180, it will be easier to place components and print circuits on the motherboard 180.

In this embodiment, different mounting holes 650 are distinguished by suffixes a to h. As mentioned earlier, the motherboard 180 and other components are mounted on the stands 380 and 385. The mounting holes 650a to 650d are screwed to the stands 385a to 385d, respectively. The mounting hole 650e is screwed to the stand 385f. The mounting holes 650f and 650g are screwed to the stands 380a and 380b, respectively. The mounting holes 650h and 650i are screwed to the stands 385h and 385i, respectively. Each of the mounting holes 650 is screwed to a stand. FIG. 6 shows that some stands are shared by more than one component. On the motherboard U 155, there is a cooling fan 220 for cooling both the graphics card 190 and processor 185. The cooling fan 220 has a mounting hole 222 that can be screwed to the mounting hole 390a. In some of the subsequent embodiments, there are two cooling fans.

Figure 7B:
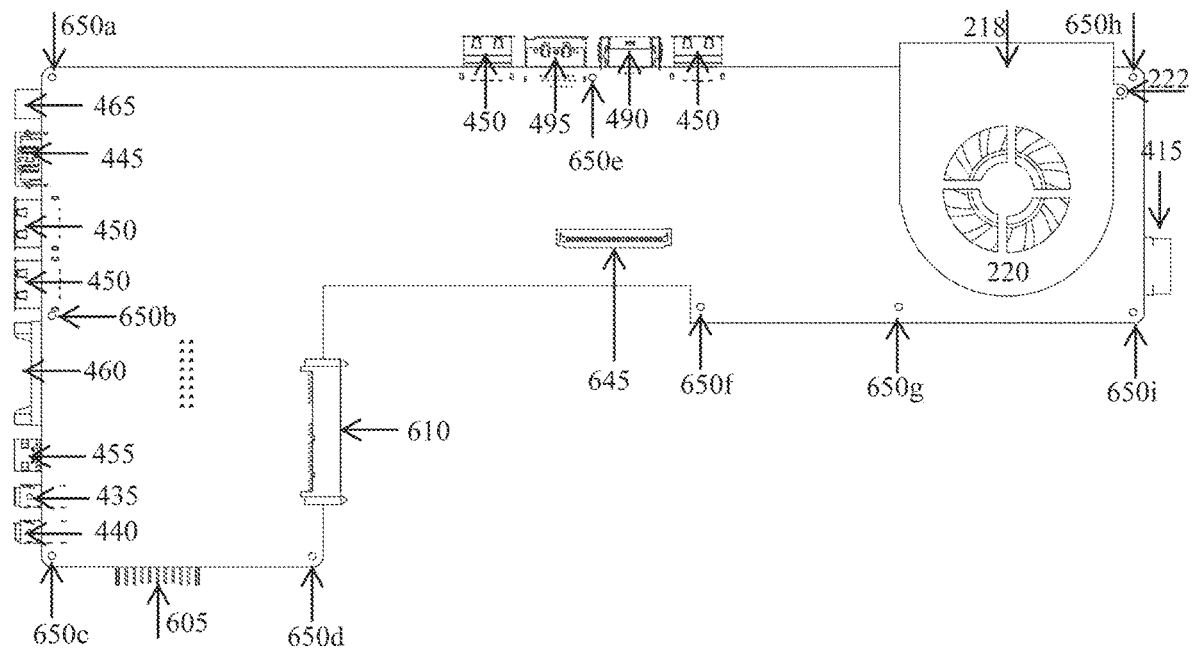
FIG. 7B is a bottom view of the motherboard U according to the embodiment of FIG. 1A.

FIG. 7B shows a bottom view of the motherboard U 155. There are connectors on the bottom side of the motherboard U 155, such as the keyboard connector 645, for connecting the keyboard 305 to the motherboard U 155. FIG. 7B also shows the I/O ports, female SATA connectors 610, battery connector 605, and mounting holes 650. The cooling fan 220, mounting hole 222 and microfin heatsink 218 are also shown in FIG. 7B. On the bottom side of the motherboard 155, there can be low height components such as memory, SSDs, diodes, resistors, capacitors, inductors and fuses. The maximum height of the components on the bottom side of the motherboard U 155, depending on their location, must be lower than the height of the stands 380 or 385.

Figure 7C:
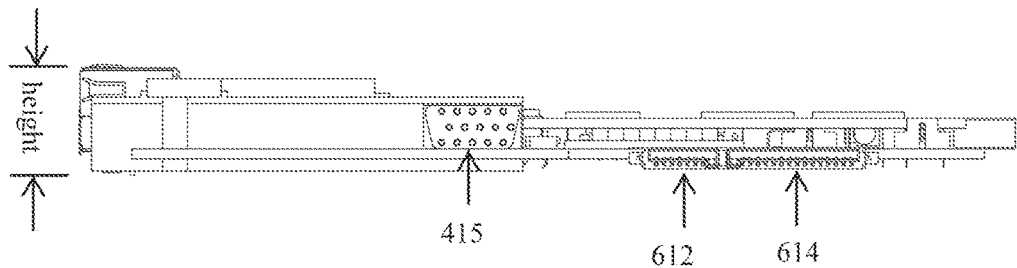
FIG. 7C is a left side view of the motherboard U according to the embodiment of FIG. 1A.

FIGS. 7C through 7F show left, right, front, and rear side views of the motherboard U 155. In FIG. 7C, the height of the motherboard U 155 is marked. The height of the motherboard U 155 is the vertical distance from the top of the tallest component on its bottom side to the top of the tallest component on its top side. A general definition of height applicable to all components in the portable computer 100 is proposed as follows. The height of a component is the vertical distance from its lowest point to its highest point when it is installed in the chassis. Obviously, this definition also applies to the motherboard U 155. The height of the motherboard U 155 is a very important specification for the portable computer 100. Usually, the height of the motherboard U 155 is greater than the height of other components such as the optical drive 160, 2.5 inch hard drive 165, speakers 170 and battery 175. Therefore, the height of the motherboard U 155 determines the minimum height of the chassis 150.

Figure 7D:
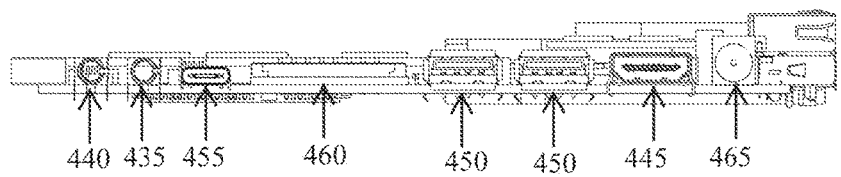
FIG. 7D is a right side view of the motherboard U according to the embodiment of FIG. 1A.
Figure 7E:
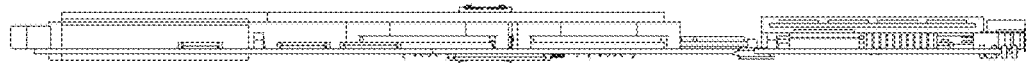
FIG. 7E is a front view of the motherboard U according to the embodiment of FIG. 1A.
Figure 7F:
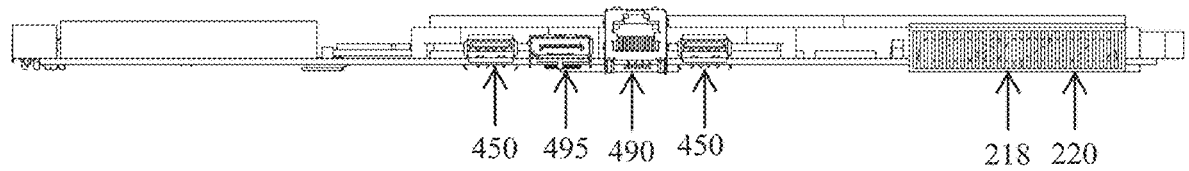
FIG. 7F is a rear view of the motherboard U according to the embodiment of FIG. 1A.

In FIG. 7C, female SATA connectors 610 are clearly shown in addition to the VGA port 415. The female SATA connectors 610 include a female 7-pin data connector 612 and a female 15-pin power connector 614. FIG. 7D shows I/O ports on the right side of the motherboard U 155. FIG. 7F shows some I/O ports, a microfin heatsink 218 and a cooling fan 220. All I/O ports have been described in the description of FIG. 7A.

Figure 8A:
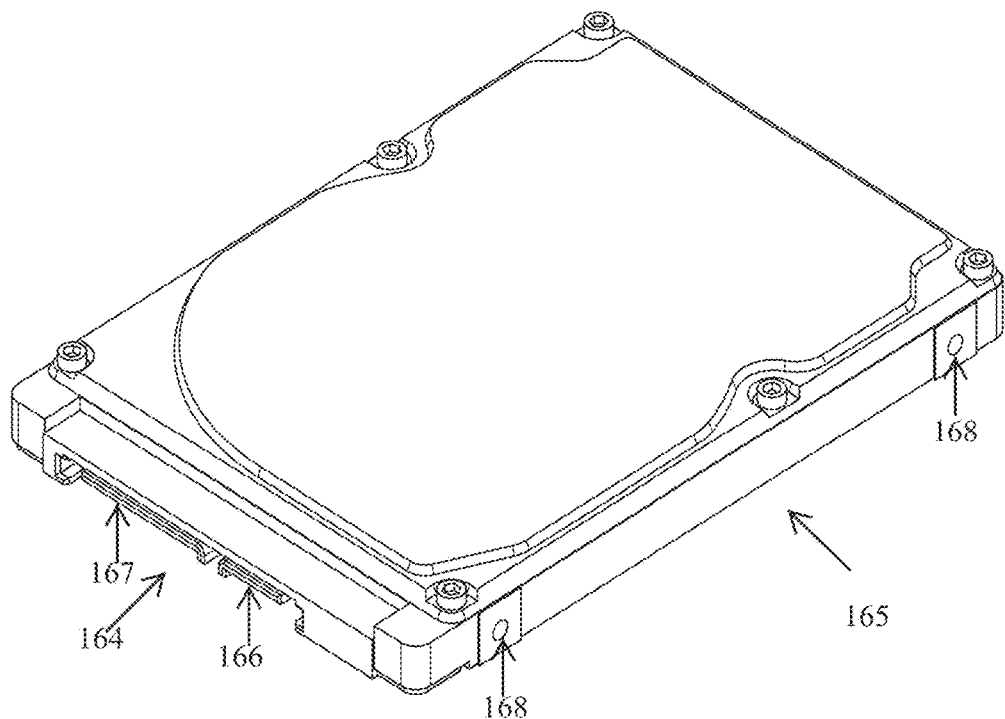
FIG. 8A is a front facing view of the 2.5 inch hard drive according to the embodiment of FIG. 1A.
Figure 8B:
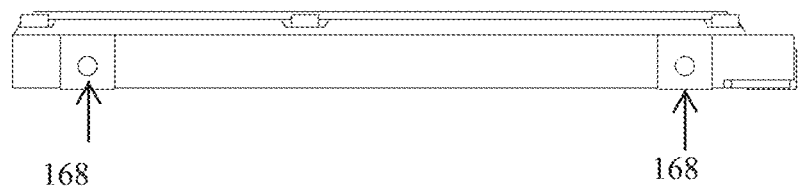
FIG. 8B is a left side view of the 2.5 inch hard drive according to the embodiment of FIG. 1A.
Figure 8C:
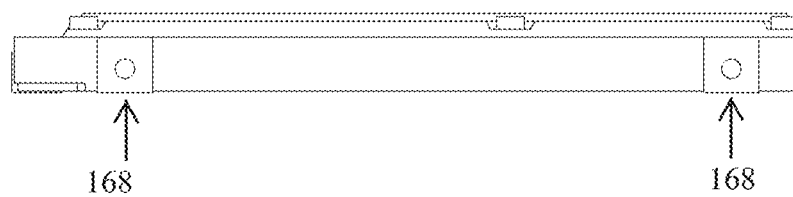
FIG. 8C is a right side view of the 2.5 inch hard drive according to the embodiment of FIG. 1A.
Figure 8D:
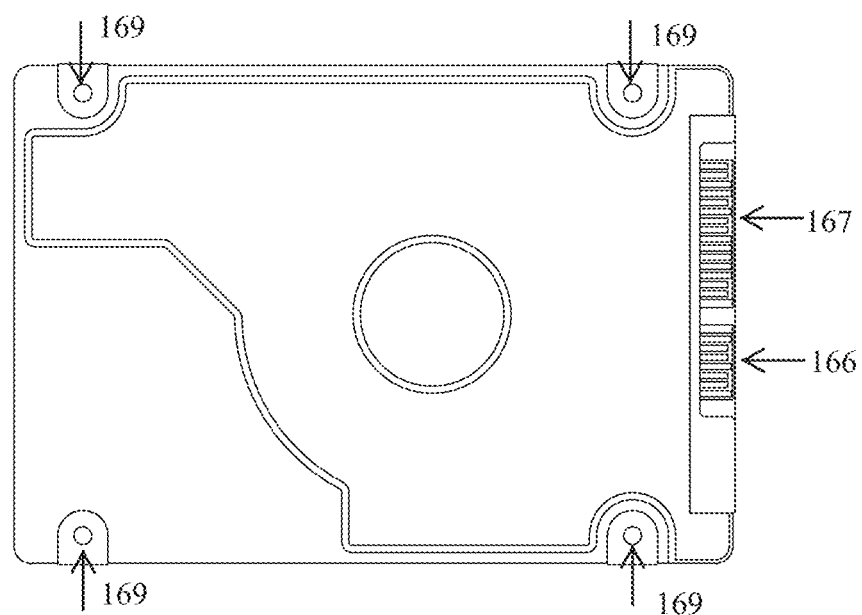
FIG. 8D is a bottom view of the 2.5 inch hard drive according to the embodiment of FIG. 1A.

As shown in FIG. 6, in addition to the motherboard U 155, there are many other components. Of all these components, the 2.5 inch hard drive 165 and optical drive 160 already have industry standards. FIGS. 8A through 8D show various views of the 2.5 inch hard drive 165. As shown in FIG. 8A, on the front of the 2.5 inch hard drive 165, there are male SATA connectors 164. The male SATA connectors 164 include a male 7-pin data connector 166 and a male 15-pin power connector 167. As previously stated, the female SATA connectors 610 soldered on the motherboard 180 are female type. The male SATA connectors 164 can be inserted into the female SATA connectors 610 to transfer data and power. Typically, 2.5 inch hard drives are 2.7 inches wide, 0.37 inches high, and 3.96 inches long. A slim 2.5 inch hard drive with a height of 0.27 inches can also be installed. FIGS. 8B through 8D show views of the 2.5 inch hard drive 165 from various sides. There are two threaded holes 168 on the left side and the right side of the 2.5 inch hard drive 165. There is a logic board and a total of four threaded holes 169 on the bottom surface of the 2.5 inch hard drive 165.

Figure 9A:
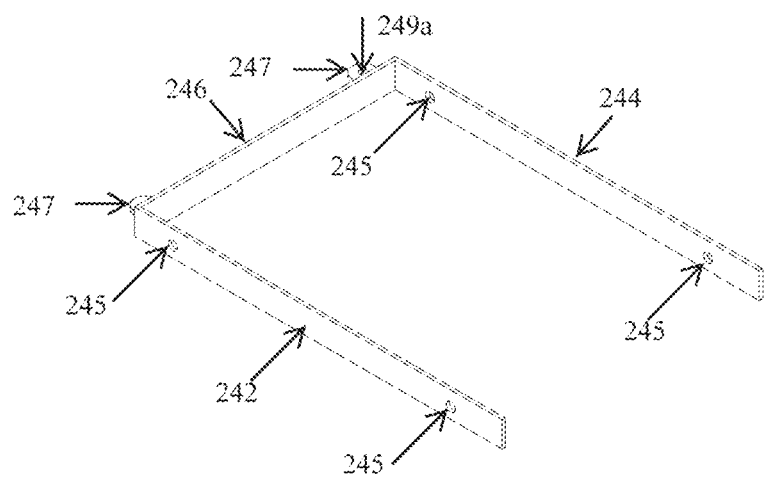
FIG. 9A is a front facing view of the hard drive bracket according to the embodiment of FIG. 1A.
Figure 9B:
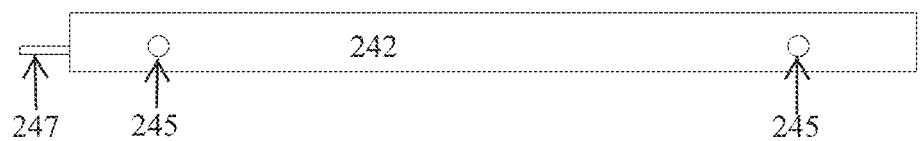
FIG. 9B is a left side view of the hard drive bracket according to the embodiment of FIG. 1A.
Figure 9C:
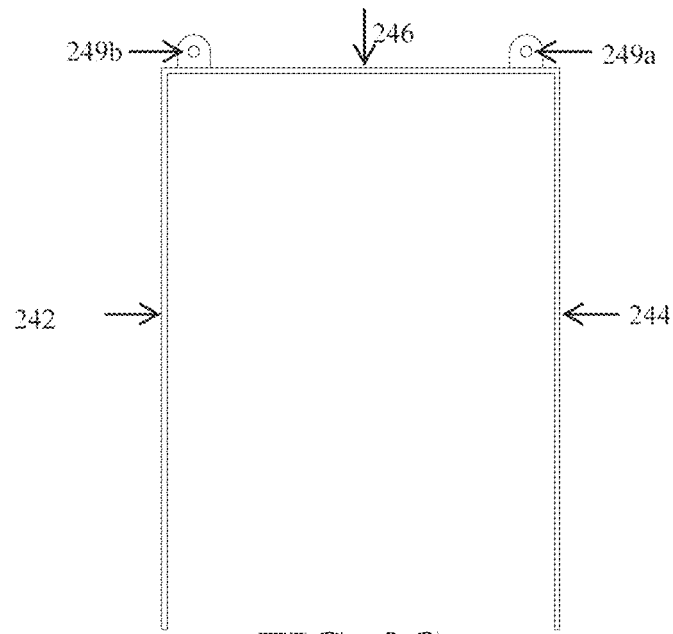
FIG. 9C is a top view of the hard drive bracket according to the embodiment of FIG. 1A.

FIGS. 9A through 9C show a hard drive bracket 240 for the 2.5 inch hard drive 165. The hard drive bracket 240 has a left side wall 242, a right side wall 244, and a rear wall 246. Each of the side walls 242 and 244 has two mounting holes 245 that coincide with the threaded holes 168 on the left and right sides of the 2.5 inch hard drive 165. As shown in FIGS. 9A through 9C, the rear wall 246 of the hard drive bracket 240 has two protruding extensions 247. In the center of each extension 247, there is a mounting hole 249, which is labeled as 249a or 249b.

Figure 10A:
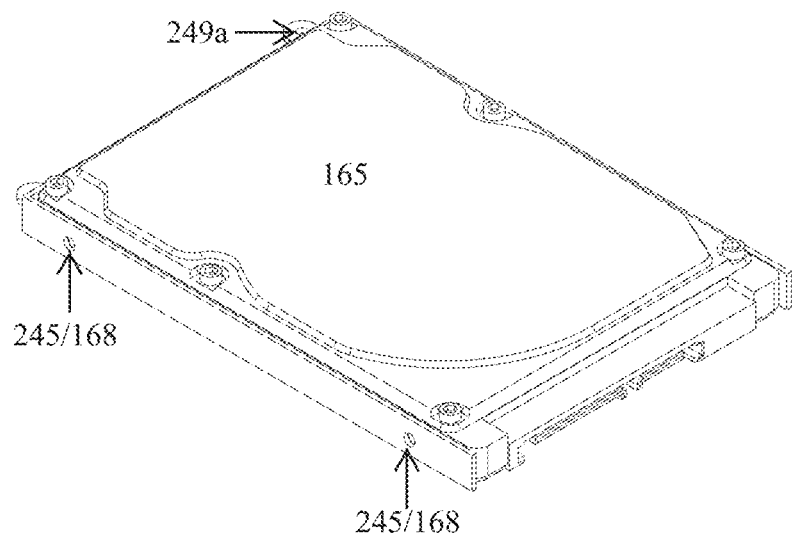
FIG. 10A is a front facing view of the 2.5 inch hard drive with the bracket according to the embodiment of FIG. 1A.
Figure 10B:
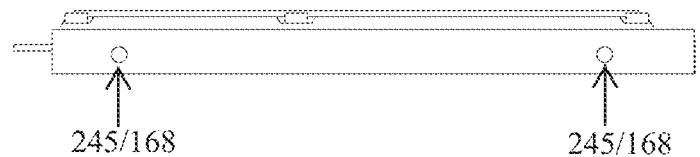
FIG. 10B is a left side view of the 2.5 inch hard drive with the bracket according to the embodiment of FIG. 1A.
Figure 10C:
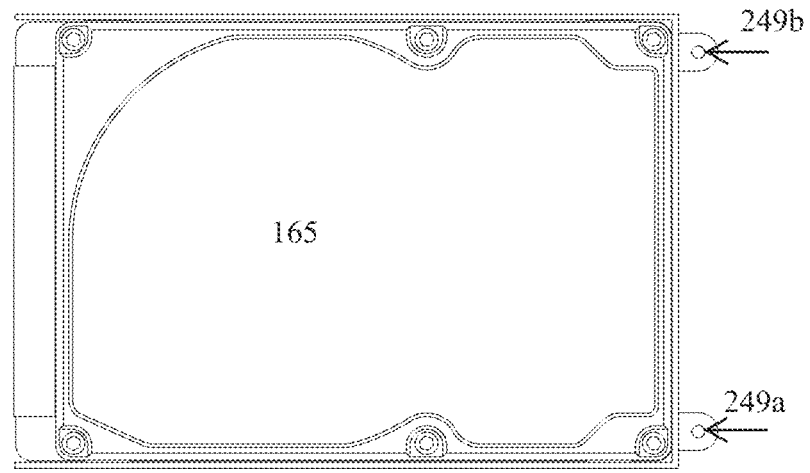
FIG. 10C is a top view of the 2.5 inch hard drive with the bracket according to the embodiment of FIG. 1A.

As shown in FIG. 10A, when the 2.5 inch hard drive 165 is placed in the hard drive bracket 240, its three walls are superimposed with the three walls of the hard drive bracket 240 and the threaded holes 168 are aligned with the mounting holes 245. FIGS. 10B and 10C show a left side view and a top view of the 2.5 inch hard drive 165 with the hard drive bracket 240. After screwing the screws into the mounting holes 245 and threaded holes 168, the 2.5 inch hard drive 165 will be mounted on the hard drive bracket 240. After inserting the 2.5 inch hard drive 165 with the hard drive bracket 240 into the female SATA connectors 610 on the motherboard 180, screws can then pass through the mounting holes 249a and 249b respectively and into the stands 380a and 385g to secure the 2.5 inch hard drive 165 to the upper part 300. Please note that the stands 380a and 385g are also used to mount the motherboard 180 and the optical drive 160, respectively. After the 2.5 inch hard drive 165 is inserted into the female SATA connectors 610, the motherboard 180 will recognize it and register it as a storage device of the portable computer 100.

Figure 11A:
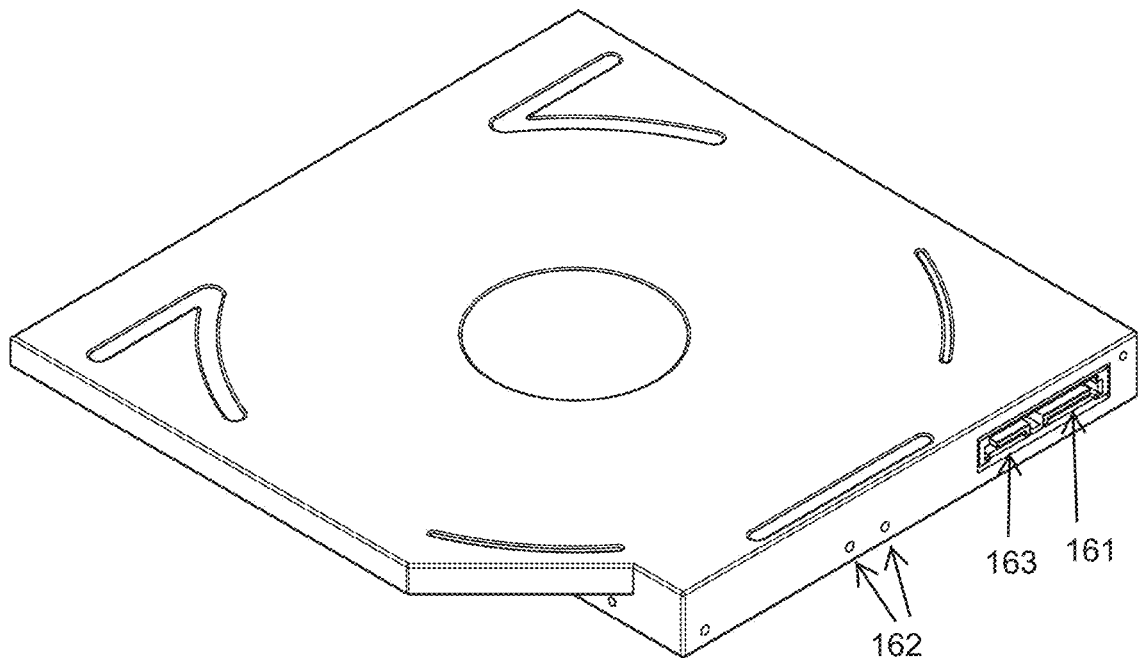
FIG. 11A is a rear facing top view of the optical drive according to the embodiment of FIG. 1A.
Figure 11B:
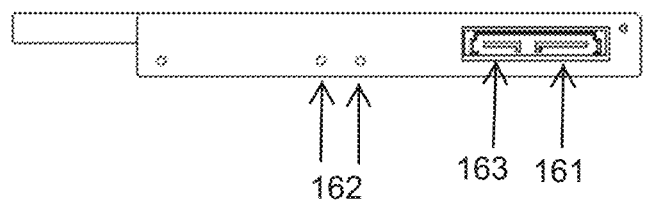
FIG. 11B is a rear view of the optical drive according to the embodiment of FIG. 1A.

FIGS. 11A and 11B show views of the optical drive 160. On the back of the optical drive 160, there are two connectors, the male slimline SATA data connector 161 and male slimline SATA power connector 163. The male slimline SATA data connector 161 is identical to the regular male SATA data connector, while the male slimline SATA power connector 163 has 6 pins in comparison to the male SATA power connector that has 15 pins. On the back of the optical drive 160, there are also two female threaded holes 162 for fixing a bracket 255 (shown in FIG. 13).

Figure 12:
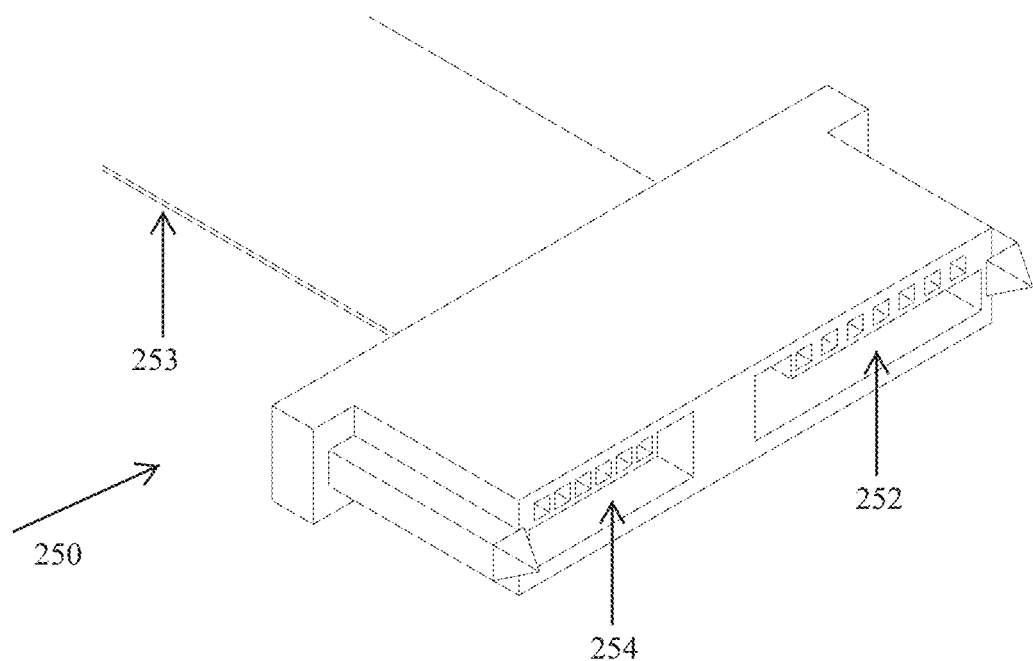
FIG. 12 is a view of the optical drive adapter according to the embodiment of FIG. 1A.

In this embodiment, the optical drive 160 is connected to the motherboard 180 through an adapter 250 (shown in FIG. 12). As shown in FIG. 12, one end of the adapter 250 includes a female slimline SATA data connector 252 and a female slimline SATA power connector 254, the other end of the adapter is a flat ribbon cable 253. Once the connectors 252 and 254 are inserted into the connectors 161 and 163 on the back of the optical drive 160, the other end of the flat ribbon cable 253 can be connected to the optical drive connector 625 on the motherboard 180.

Figure 13:
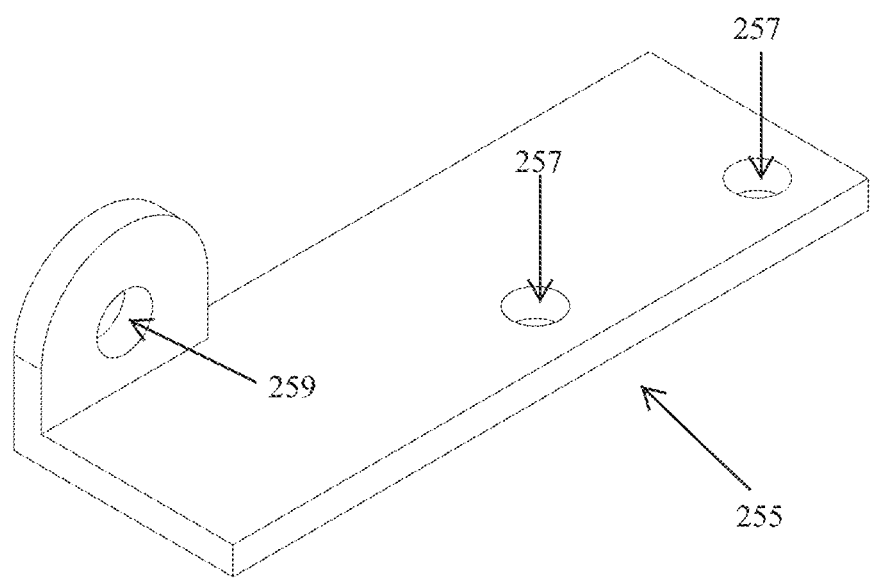
FIG. 13 is a view of the optical drive bracket according to the embodiment of FIG. 1A.

FIG. 13 shows the bracket 255 for the optical drive 160. In this embodiment, the bracket 255 is L-shaped with two branches. On one branch of the bracket 255, there are two mounting holes 257. The other branch of the bracket 255 has one mounting hole 259. After the mounting holes 257 are aligned with the mounting holes 162, screws can be screwed to mount the bracket 255 to the back of the optical drive 160.

Figure 14A:
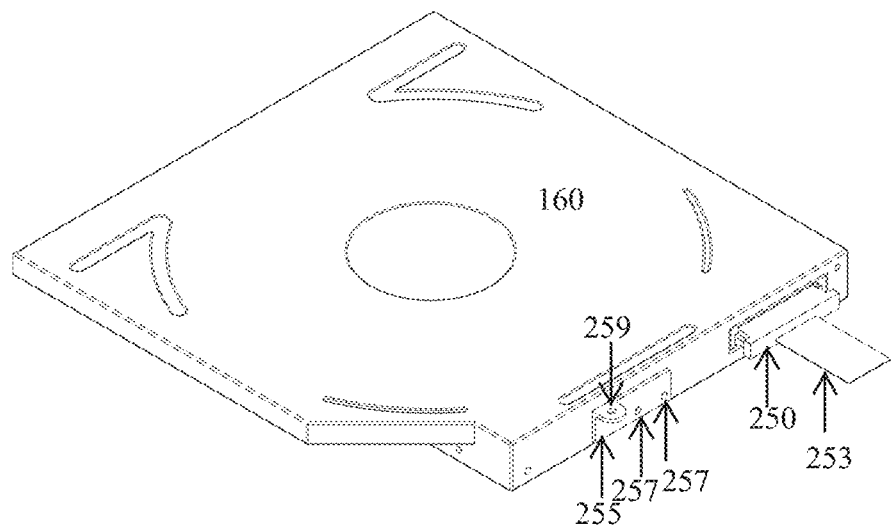
FIG. 14A is a rear facing top view of the optical drive with the adapter and the bracket according to the embodiment of FIG. 1A.
Figure 14B:
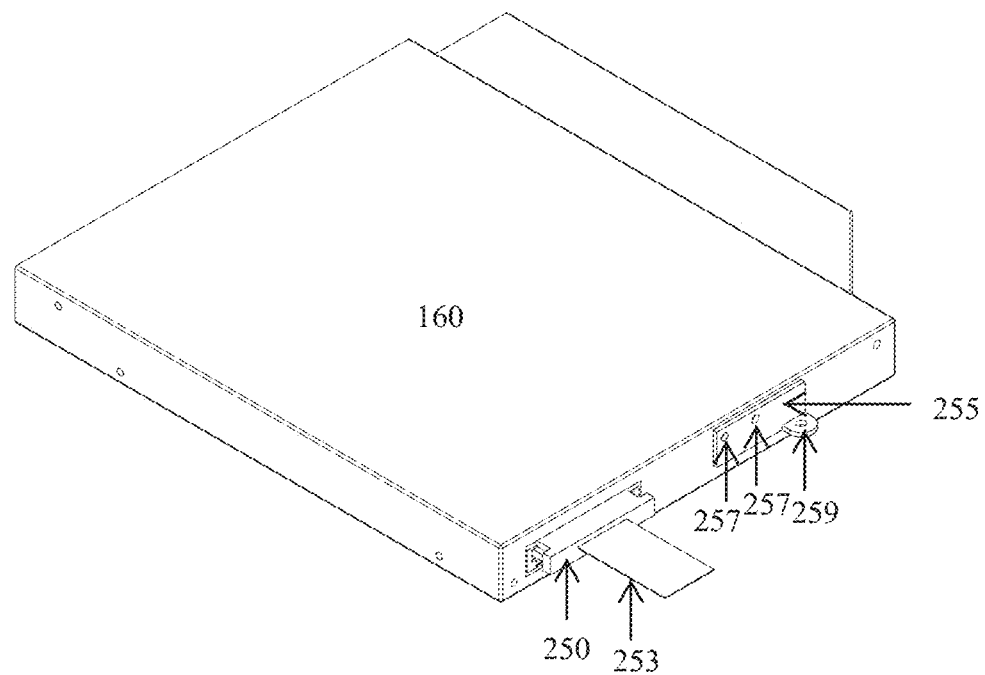
FIG. 14B is a rear facing bottom view of the optical drive with the adapter and the bracket according to the embodiment of FIG. 1A.

FIGS. 14A and 14B show rear facing top and bottom views of the optical drive 160 with the adapter 250 and bracket 255 installed. After the adapter 250 and the bracket 255 are installed, the optical drive 160 can be placed in the chassis 150 with the mounting hole 259 aligned with the stand 385g. A screw is screwed through the mounting hole 259 into the stand 385g to mount the optical drive 160 in the chassis 150. After the flat ribbon cable 253 is connected to the optical drive connector 625 on the motherboard 180, the optical drive 160 will be recognized and registered as a disc drive of the portable computer 100. The optical drive 160 can be a variety of types that can read and/or write CDs, DVDs and Blu-ray discs.

Figure 15A:
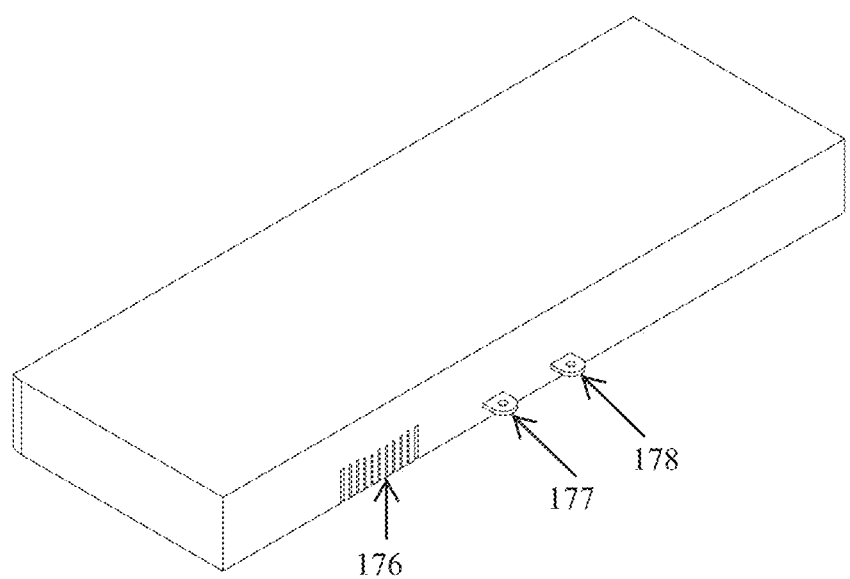
FIG. 15A is a rear facing view of the battery according to the embodiment of FIG. 1A.
Figure 15B:
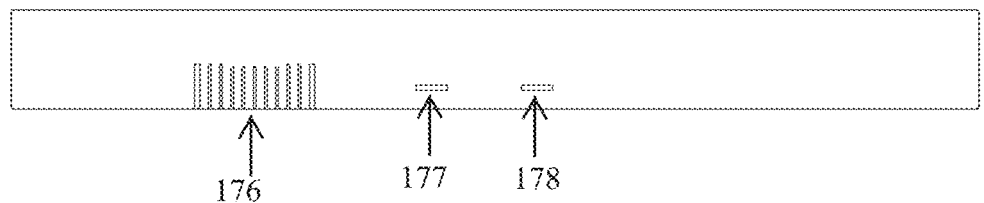
FIG. 15B is a rear view of the battery according to the embodiment of FIG. 1A.
Figure 15C:
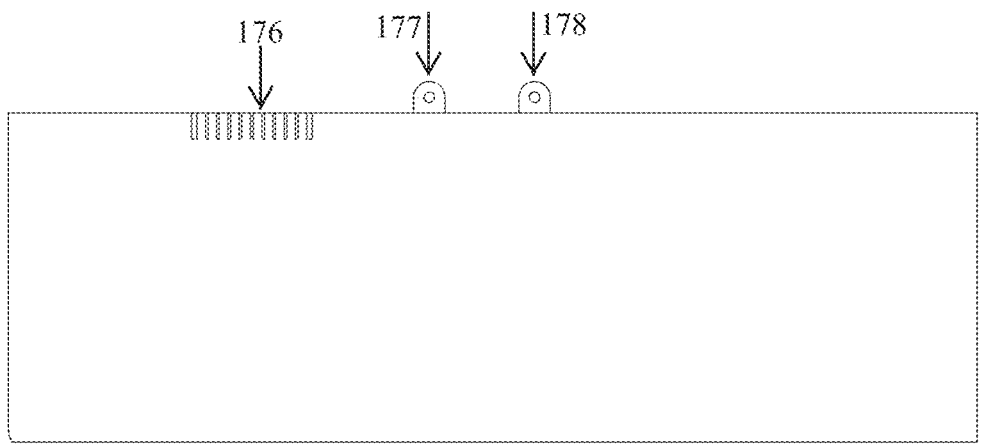
FIG. 15C is a bottom view of the battery according to the embodiment of FIG. 1A.

FIGS. 15A through 15C show views of the battery 175. The power connector 176 of the battery 175 is slot-shaped, with each slot having a sheet-shaped conductor. In this embodiment, the battery 175 is located at the front of the chassis 150. There may be a sticky substance on the bottom of the battery 175 to adhere the battery 175 to the interior side 370 of the upper part 300. FIGS. 15A through 15C also show two mounting holes 177 and 178 for mounting the battery 175 in the chassis 150. To connect the battery 175 to the motherboard 180, the battery connector 605 is inserted into the power connector 176, which will connect the sheet-shaped conductors in the power connector 176 to the battery connector 605 on the motherboard 180. Once the battery 175 is connected to the motherboard 180, the two mounting holes 177 and 178 will be aligned with the two stands 385d and 385e. Screws can then be screwed in to fix the battery 175 to the chassis 150. After the battery 175 is connected to the motherboard 180, the battery 175 can be charged by an external power source, and provide power to the portable computer 100 in the absence of an external power source. The charged battery 175 can supply power directly to the motherboard 180 and indirectly to other components through the motherboard 180. The battery 175 can contain a plurality of standard battery cells, which are made of a high-charge rate material such as lithium ion. When the portable computer 100 does not have an external power source, the battery 175 is the only source of power for the portable computer 100. To get a longer battery runtime, the capacity of the battery 175 must be increased. In a following embodiment, a method aimed at increasing the battery capacity is proposed.

Figure 16A:
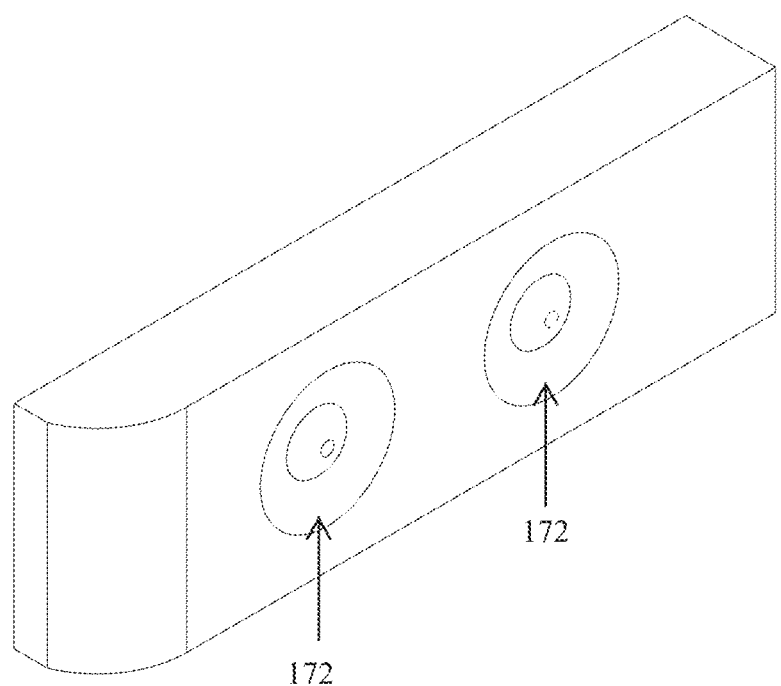
FIG. 16A is a front facing view of a speaker according to the embodiment of FIG. 1A.
Figure 16B:
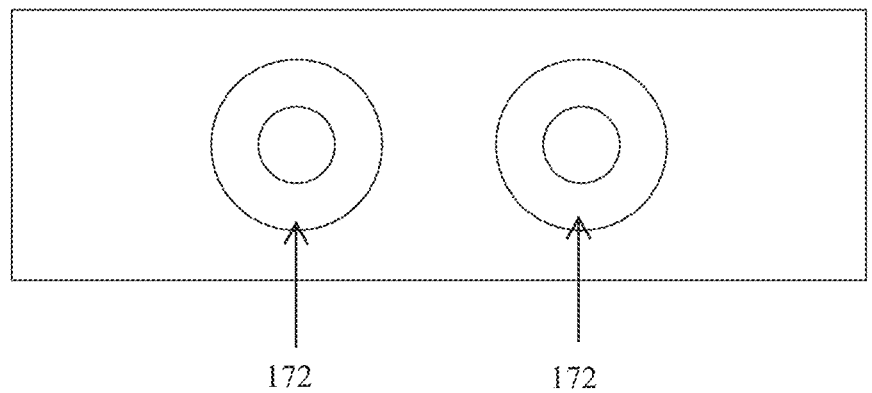
FIG. 16B is a front view of a speaker according to the embodiment of FIG. 1A.

In this embodiment, the two speakers 170 are identical and are mounted on the left and right ends of the front interior wall of the chassis 150. FIG. 16A shows a front facing view of a speaker 170. On each speaker, there are two dust covers 172 to protect the speaker cones (not shown in the figure). One edge of the speakers is rounded, matching the rounded edge of the chassis 150. FIG. 16B shows a front view of a speaker 170. On the front side of the speakers 170, there is a sticky substance that adheres the speakers 170 to the front interior wall of the chassis 150. The speakers 170 have wires that can be connected to the speaker connector 615 on the motherboard 180.

Figure 17A:
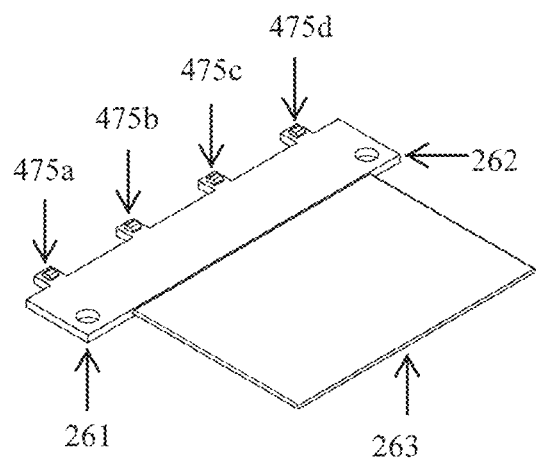
FIG. 17A is a front facing view of the LED board according to the embodiment of FIG. 1A.
Figure 17B:
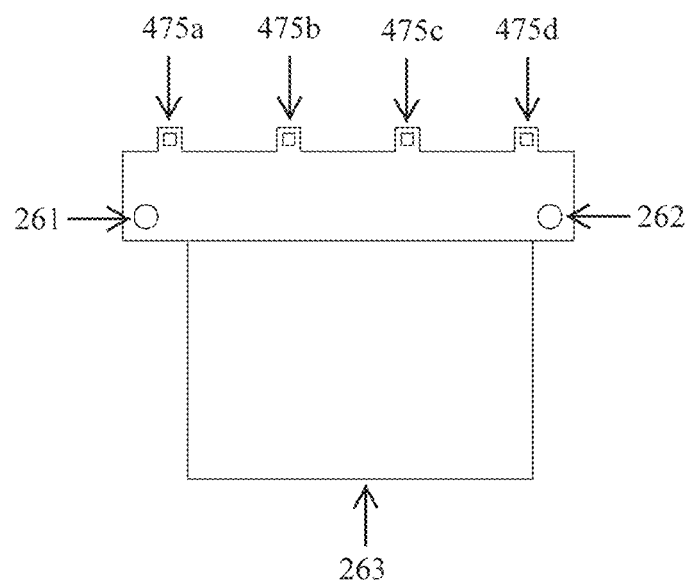
FIG. 17B is a front view of the LED board according to the embodiment of FIG. 1A.

FIGS. 17A and 17B show views of the LED board 260. On the LED board 260, there are a number of LEDs and a flat ribbon cable 263. The LEDs include a battery charging LED 475a, power LED 475b, hard drive LED 475c and wireless operating status LED 475d, which are not limited herein. Screws can mount the LED board 260 to the front interior wall of the chassis 150 through the mounting holes 261 and 262. After the flat ribbon cable 263 is connected to the LED connector 635, the LED board 260 can obtain information from the motherboard 180. The LEDs generate light with color and pattern changes to show the operating statuses of the components in the portable computer 100.

There are other components such as a keyboard 305, touchpad 310 and fingerprint reader 325. These components are mounted on the upper part 300 with cables connected to the keyboard connector 645, touchpad connector 630, and fingerprint reader connector 640. When the touchpad 310 is installed, it is placed into the touchpad opening 345 from the exterior side of the upper part 300. The bottom of the touchpad 310 is placed on and supported by the touchpad mounting ridge 348. The top of the touchpad 310 has three mounting holes. Once the mounting holes are aligned with the touchpad mounting holes 346 on the upper part 300, screws can fix the touchpad 310 to the upper part 300. Once the touchpad 310 is connected to the touchpad connector 630 by a flat ribbon cable, the installation of the touchpad 310 is complete. The fingerprint reader 325 is a PCB board with a screw hole and a flat ribbon cable for connecting to the motherboard 180. A screw needs to be screwed in through the screw hole and the mounting hole 329 to fix the fingerprint reader 325 to the upper part 300. The flat ribbon cable connects the fingerprint reader 325 to the motherboard 180 through the fingerprint reader connector 640.

Figure 18A:
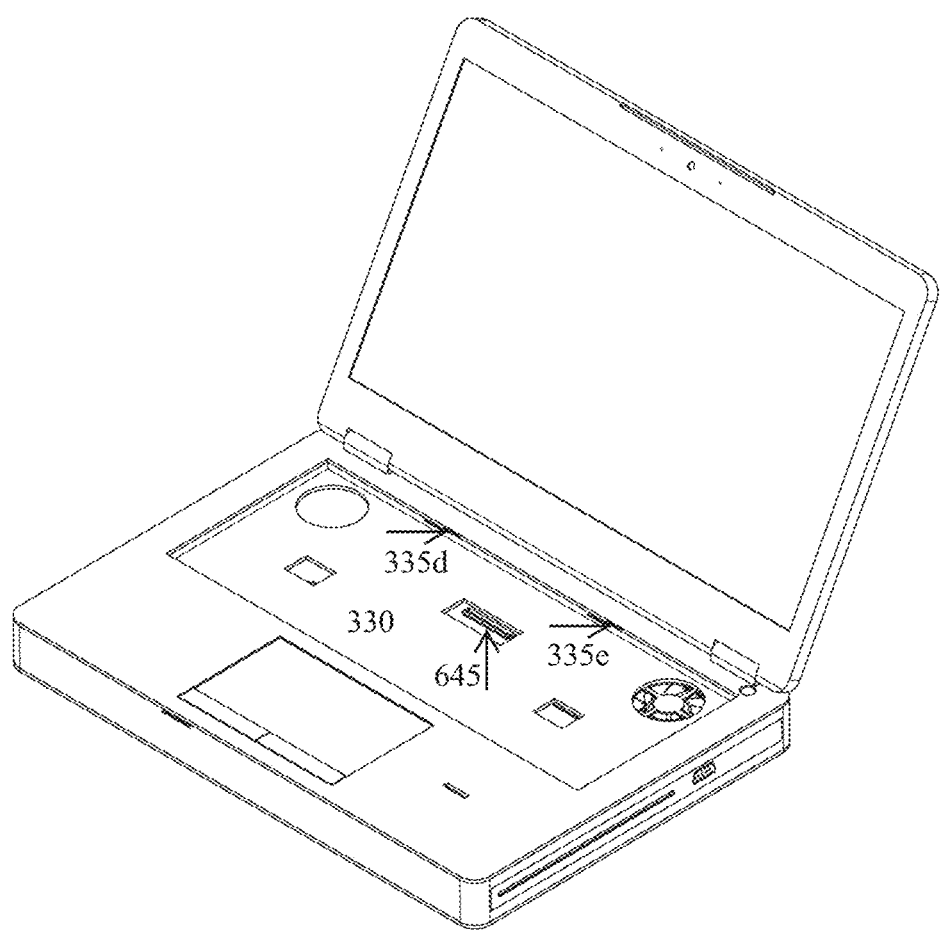
FIG. 18A is a front facing view of the portable computer without a keyboard according to the embodiment of FIG. 1A.
Figure 18B:
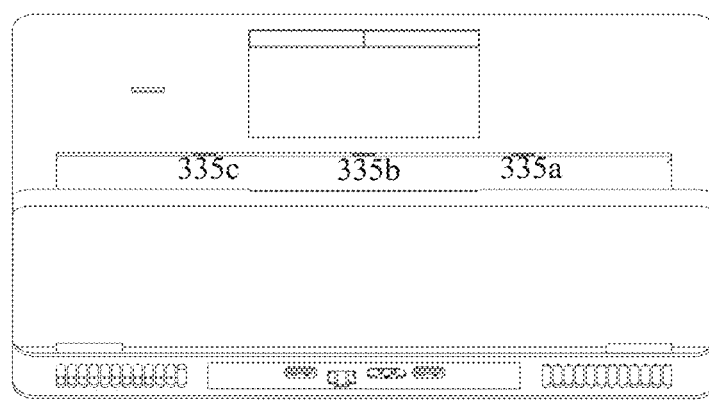
FIG. 18B is a top facing view of the portable computer without a keyboard according to the embodiment of FIG. 1A.

FIGS. 18A and 18B show views of the portable computer 100 without a keyboard 305 according to the embodiment of FIG. 1A. In FIG. 18A, the keyboard connector 645 is exposed in the opening 355. The keyboard 305 has a flat ribbon cable and a few protruding areas on the bottom. When installing the keyboard 305, first connect the flat ribbon cable on the keyboard 305 to the keyboard connector 645 on the motherboard, then slide the protruding areas on the bottom of the keyboard 305 into the keyboard slots 335a to 335c, finally, push the top of the keyboard 305 down until the top edge of the keyboard 305 locks into the keyboard slots 335d and 335e.

In this embodiment, components such as the motherboard U 155, speakers 170, optical drive 160, 2.5 inch hard drive 165, and battery 175 have a specific size. Note that certain components can also be replaced by smaller ones, as long as the component mounting holes are in the same positions, the smaller components can still be installed into the chassis 150. This will provide more flexibility when designing motherboards and other components.

The performance of the portable computer depends on the performance of the processor, graphics card, chipset, buses, memory, and storage. The chipset and buses are part of the motherboard. The processor, graphics card, memory and SSD are installed or soldered on the motherboard. A larger motherboard can accommodate more powerful components, more complex buses, more advanced chipsets, more I/O ports, etc. Therefore, the performance of the portable computer largely depends on the complexity and the dimensions of the motherboard. In addition, it is important to increase the battery capacity to improve the performance and operating time of the portable computer while using battery power. When optional components such as an optical drive and/or a 2.5 inch hard drive are omitted, a larger motherboard (or motherboard U) and/or battery can be mounted into the chassis to increase performance. Therefore, a different number is allocated to the motherboard, motherboard U and battery to indicate variations of these components with different dimensions. Although variations of these components have different dimensions, they all work in the same way. Therefore, when dealing with variations of these components in the subsequent embodiments we can accurately assume that they operate the same way.

Figure 19:
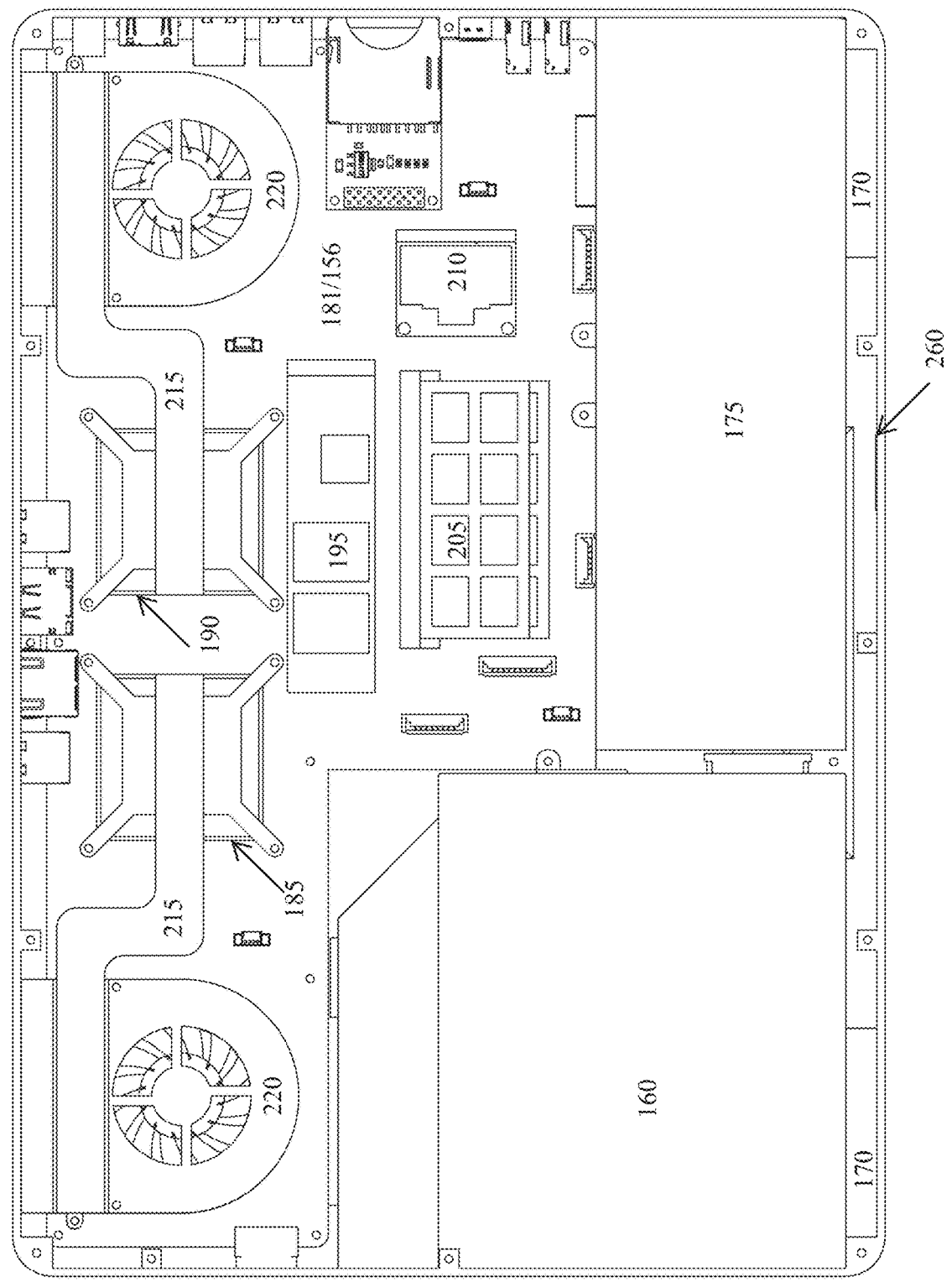
FIG. 19 is a view of the internal components and structures from the bottom of a portable computer with the lower part of the chassis removed, according to another embodiment.

Turning now to FIG. 19, a view of the internal components and structures from the bottom of the portable computer 101 with the lower part 500 of the chassis 150 removed, according to another embodiment, is shown. Unlike the embodiment of FIG. 1A, there is no 2.5 inch hard drive 165 in this embodiment. As shown in FIG. 19, in this embodiment, the components include a motherboard U 156, an optical drive 160, two speakers 170, a battery 175, an LED board 260, etc. Since the motherboard 181 and motherboard U 156 have different dimensions compared to the former embodiment, a different number is used to identify them.

In this embodiment, unlike the embodiment of FIG. 1A, the enlarged motherboard 181 occupies the area allocated for the 2.5 inch hard drive 165 in the embodiment of FIG. 1A. To simplify the description, only the differences between this embodiment and the previous embodiment are illustrated here. With the exception of the motherboard U 156, all other components including the optical drive 160, speakers 170, battery 175, LED board 260, etc., remain unchanged. The major difference between this embodiment and the embodiment of FIG. 1A lies in the motherboard U 156 and the mounting arrangements, which will be described below.

Figure 20A:
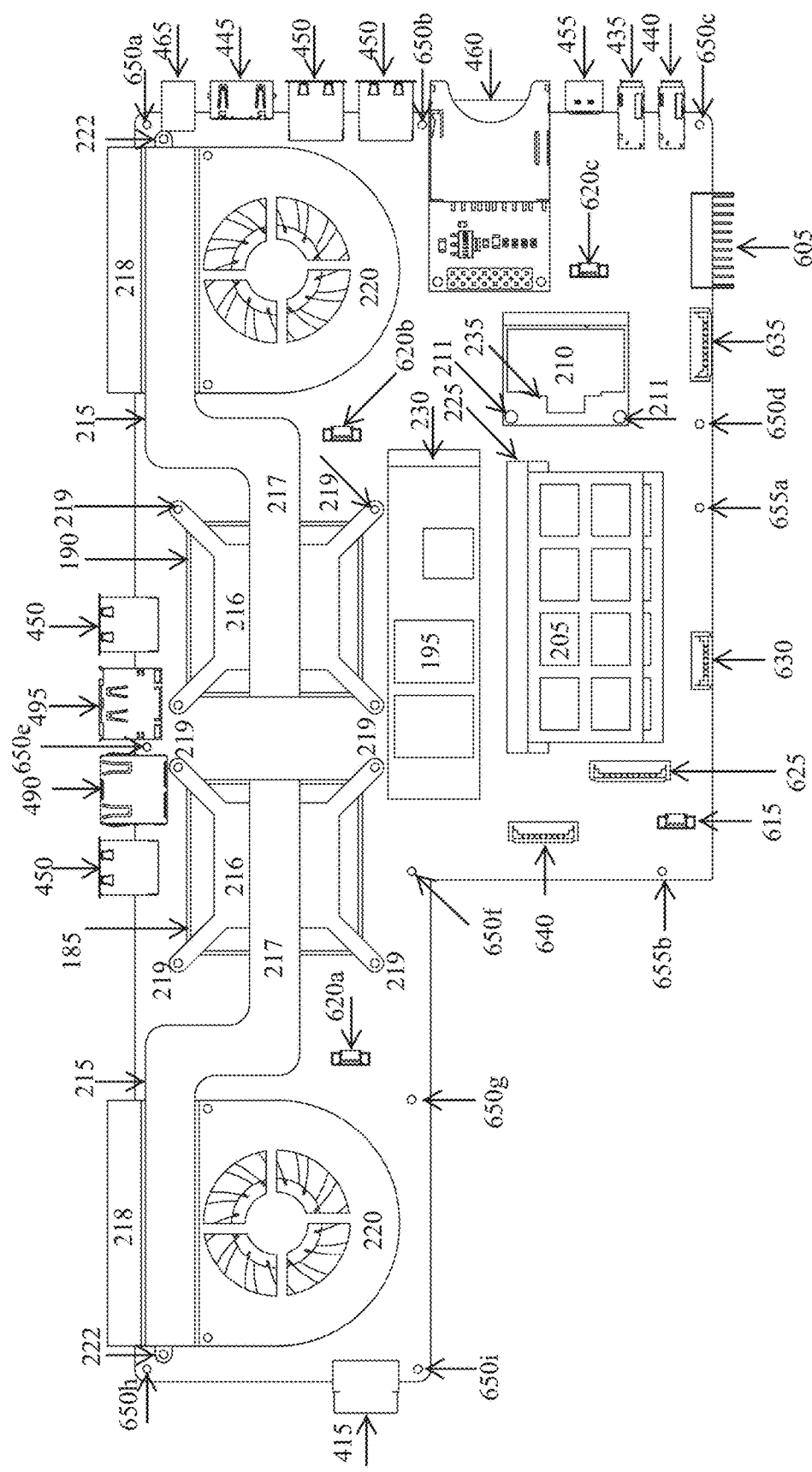
FIG. 20A is a top view of the motherboard U according to the embodiment of FIG. 19.

Turning now to FIGS. 20A through 20F, views of the motherboard U 156 according to the embodiment of FIG. 19 are shown. More specifically, FIG. 20A shows a top view of the motherboard U 156. Compared to the motherboard U 155 shown in FIGS. 7A through 7F, both the processor 185 and graphics card 190 of the motherboard U 156 have their own heatsink module 215 and cooling fan 220, which will make this embodiment suitable for more powerful graphics processing. In this embodiment, there are three 4-pin fan connectors 620. The fan connectors 620a and 620b are used to connect the cooling fans 220 to the motherboard 181. The fan connector 620c can serve as the backup for the connectors 620a and 620b or it can be used to connect an auxiliary cooling system. The locations of components such as the SSD 195, wireless card 210, and memory 205 have changed. Since the 2.5 inch hard drive 165 is not included in this embodiment, the female SATA connectors 610 are not on the motherboard 181. In addition, the positions of certain connectors may also change. As mentioned earlier, when discussing the layout and installation of components in the chassis, the motherboard U is considered as a whole. Therefore, the locations of components and connectors on the motherboard U are irrelevant to the layout and installation of the motherboard U in the chassis, which provides more flexibility when designing motherboards. For this reason, the dimension of the motherboard U as well as the number of mounting holes and their locations are specifications that need to be considered during the layout and installation of the motherboard U in the chassis.

In this embodiment, besides the mounting holes 650, there are two additional mounting holes 655a and 655b on the motherboard U 156. In this embodiment, because there is an optical drive 160, the interior side 370 of the upper part 300 is the same as the embodiment of FIGS. 1A and 1s shown in FIGS. 3C and 3D. The mounting holes 650a to 650d are screwed to the stands 385a to 385d, respectively. The mounting hole 650e is screwed to the stand 385f. The mounting holes 650f and 650g are screwed to the stands 380a and 380b, respectively. The mounting holes 650h and 650i are screwed to the stands 380h and 385i, respectively. The mounting holes 655a and 655b are screwed to the stands 385e and 385g, respectively. Each mounting hole 650 or 655 is screwed to a stand. Please note that a stand can be shared by multiple components. For example, stands 385d and 385e are also used to mount the battery 175.

Figure 20B:
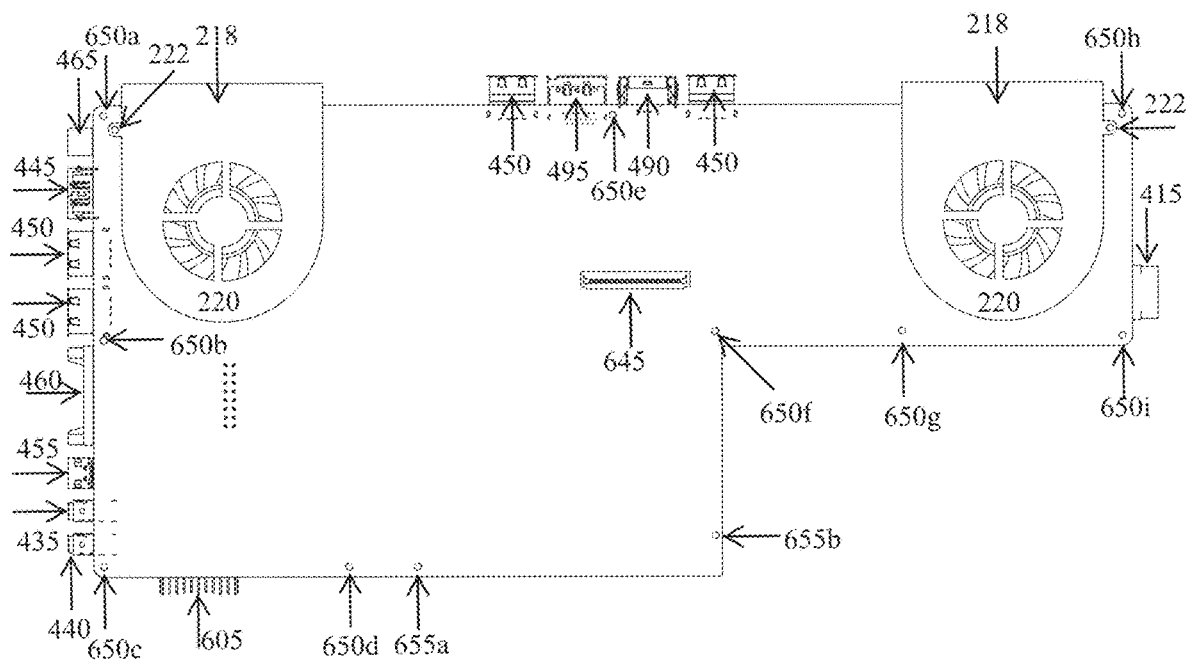
FIG. 20B is a bottom view of the motherboard U according to the embodiment of FIG. 19.
Figure 20C:
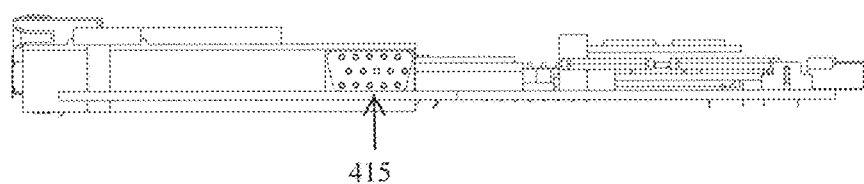
FIG. 20C is a left side view of the motherboard U according to the embodiment of FIG. 19.
Figure 20D:
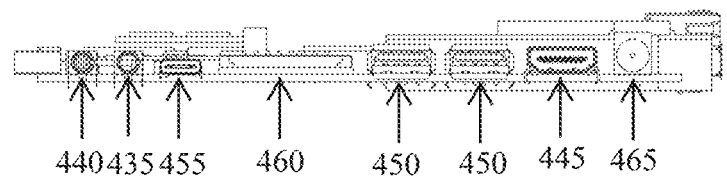
FIG. 20D is a right side view of the motherboard U according to the embodiment of FIG. 19.
Figure 20E:
Figure 20F:
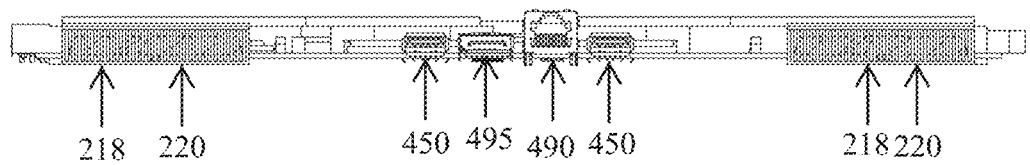
FIG. 20F is a rear view of the motherboard U according to the embodiment of FIG. 19.

FIG. 20B shows a bottom view of the motherboard U 156 according to embodiment of FIG. 19. FIG. 20B shows the I/O ports, keyboard connector 645 and battery connector 605. FIG. 20B also shows the mounting holes 650 and 655. The cooling fans 220, mounting holes 222 and microfin heatsinks 218 are also shown in FIG. 20B. FIGS. 20C through 20F show left, right, front, and rear side views of the motherboard U 156. FIG. 20C shows the VGA port 415. FIG. 20D shows I/O ports on the right side of the motherboard U 156. FIG. 20F shows some I/O ports, two microfin heatsinks 218 and two cooling fans 220. All I/O ports are also shown in FIG. 20A and are described in the description of FIG. 7A.

Figure 21A:
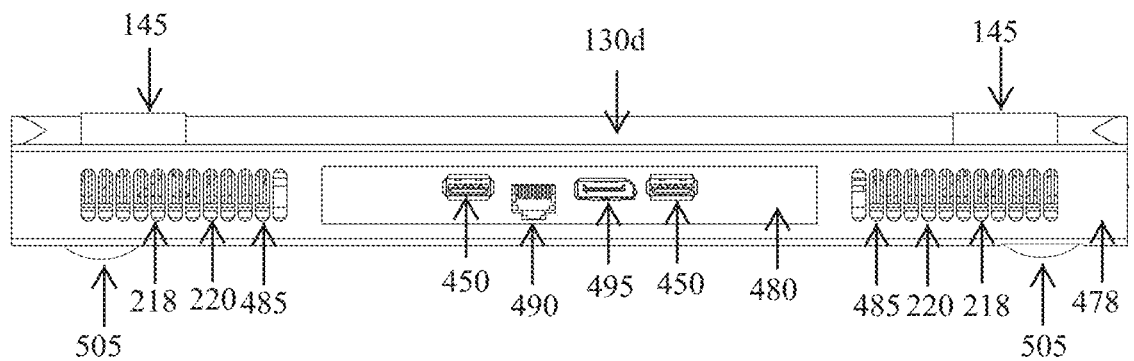
FIG. 21A is a rear view of the portable computer according to the embodiment of FIG. 19 in a close cover position.
Figure 21B:
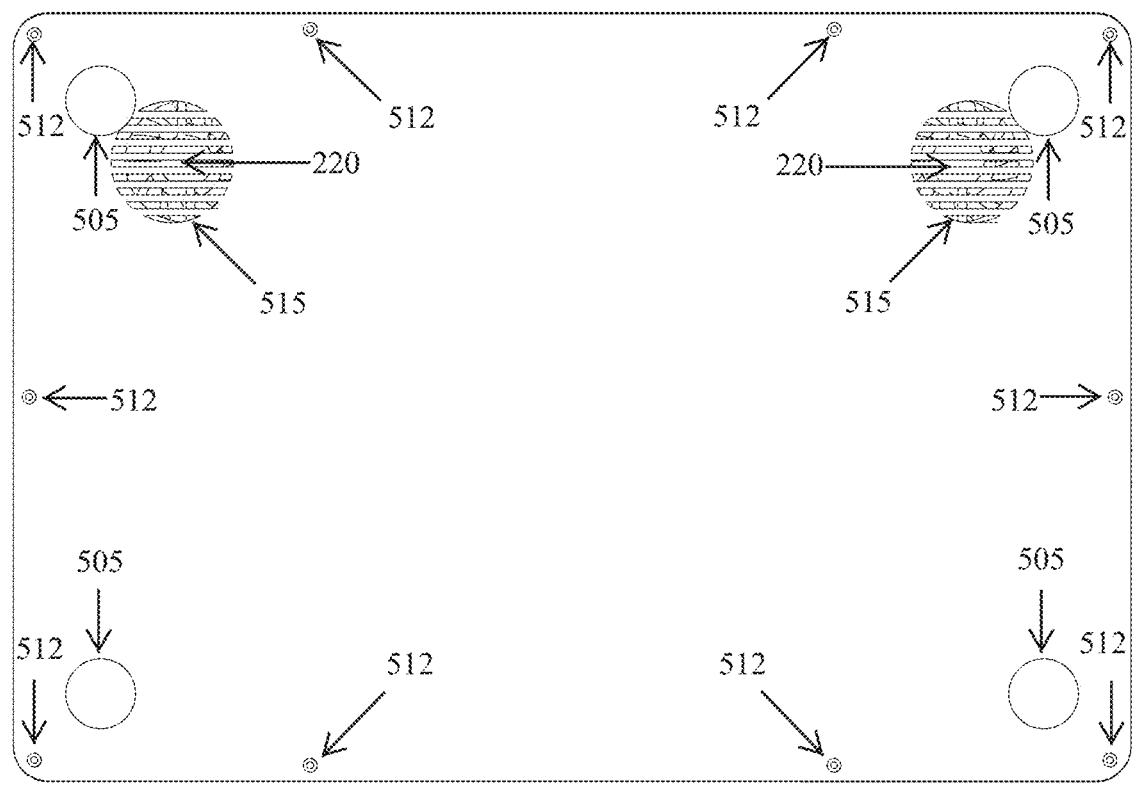
FIG. 21B is a bottom view of the portable computer according to the embodiment of FIG. 19 in a close cover position.

Please note that there are two heatsink modules 215 and two cooling fans 220 in this embodiment. Therefore, compared to the embodiment of FIG. 1A, the appearance of the rear and bottom views of the portable computer 101 in this embodiment will differ. Because the I/O ports remain the same, the top, right, left, and front views of the portable computer 101 in this embodiment are the same as the embodiment of FIG. 1A. More specifically, the top, right, left, and front views of the portable computer 101 according to the embodiment of FIG. 19 in a close cover position, are shown in FIGS. 1B through 1E, respectively. The rear and bottom views of the portable computer 101 according to the embodiment of FIG. 19 in a close cover position are shown in FIGS. 21A and 21B, respectively. FIG. 21A shows the rear side wall 478, the bottom side 130d of the display back cover 130, the hinge covers 145 and the support feet 505. The rear removable I/O plate 480 includes openings for accommodating two USB ports 450, a DisplayPort 495 and a network port 490. In the rear side wall 478, there are also air duct holes 485. FIG. 21A also shows two microfin heatsinks 218 and two cooling fans 220 through the air duct holes 485 located on left and right ends of the rear side wall 478. FIG. 21B shows the mounting holes 512, the bottom air duct holes 515, and the support feet 505. The bottom air duct holes 515 are directly below the cooling fans 220 inside the chassis. Depending on the orientation of the cooling fans 220, the bottom air duct holes 515 may be used to draw in cold air or expel hot air. In this embodiment, the bottom air duct holes 515 are used to draw in cold air. FIG. 21B also shows two cooling fans 220 through the left and right bottom air duct holes 515. In the case where the portable computer 101 requires additional cooling, there are also mounting holes 510 (covered by the support feet 505, clearly shown in FIG. 5B) to install an auxiliary cooling system.

Figure 22:
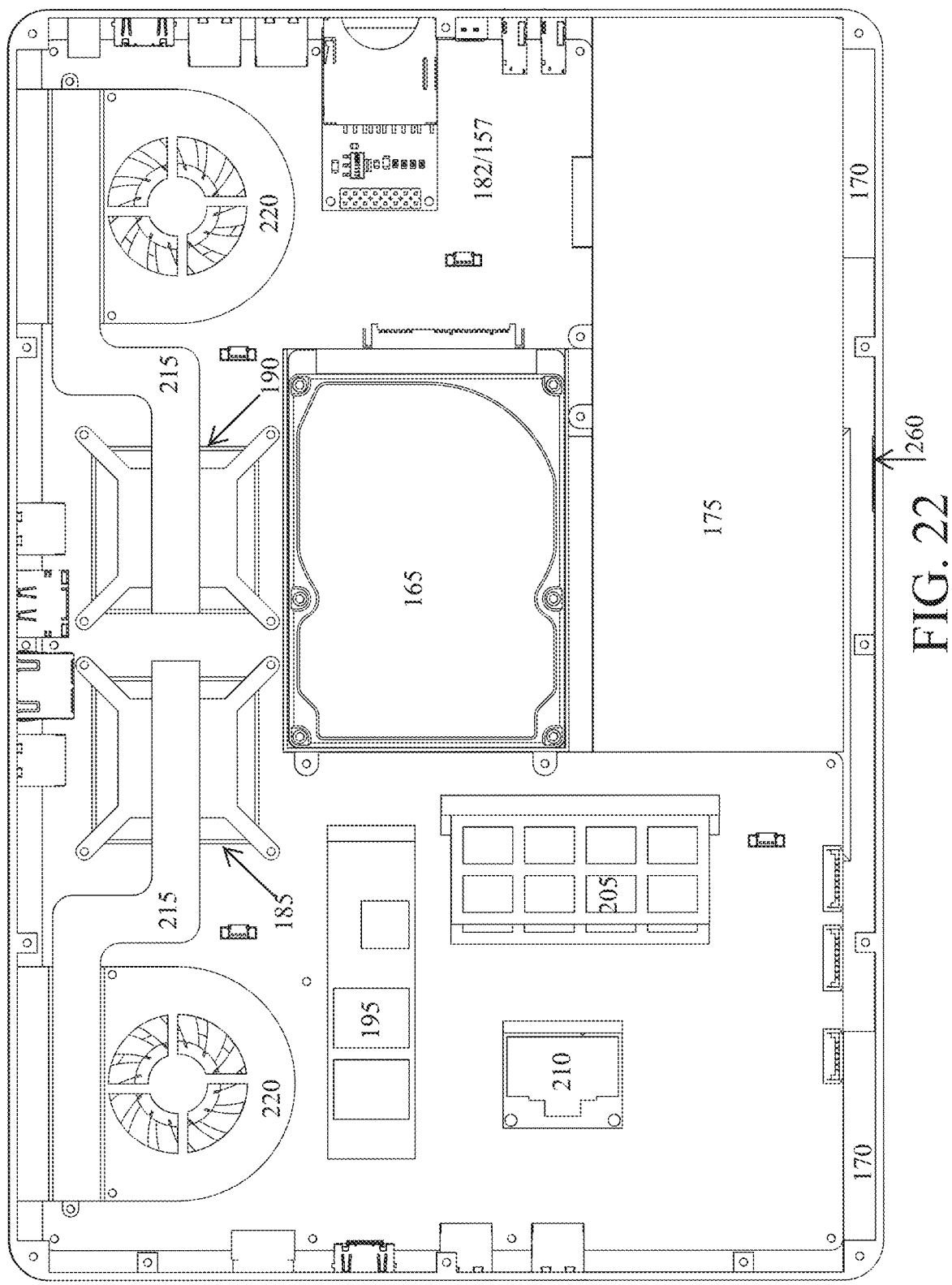
FIG. 22 is a view of the internal components and structures from the bottom of a portable computer with the lower part of the chassis removed, according to yet another embodiment.

Turning now to FIG. 22, a view of the internal components and structures from the bottom of the portable computer 102 with the lower part 500 of the chassis 150 removed, according to yet another embodiment, is shown. Unlike the embodiment of FIG. 1A, there is no optical drive 160 in this embodiment. As shown in FIG. 22, in this embodiment, the components include a motherboard U 157, a 2.5 inch hard drive 165, two speakers 170, a battery 175, an LED board 260, etc.

In this embodiment, unlike the embodiment of FIG. 1A, the enlarged motherboard 182 also occupies the area allocated for the optical drive 160 in the embodiment of FIG. 1A. With the exception of the motherboard U 157, all other components including the 2.5 inch hard drive 165, speakers 170, battery 175, LED board 260, etc., remain unchanged. Since the motherboard 182 and motherboard U 157 have different dimensions compared to the former embodiments, a different number is used to identify them.

Figure 23A:
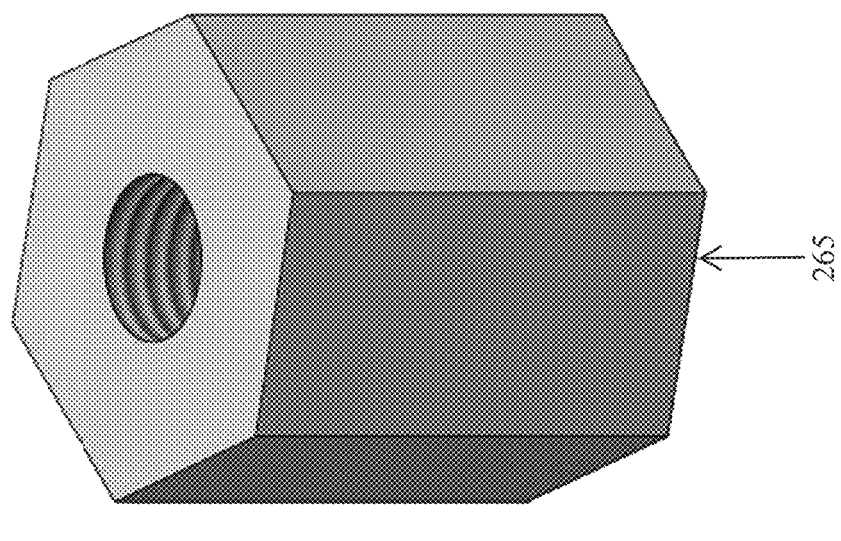
FIG. 23A shows multiple views of a tall standoff.
Figure 23A:
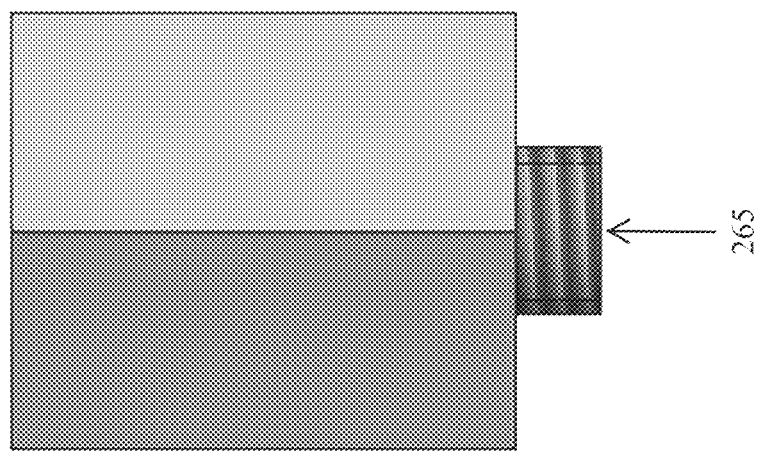
Figure 23B:
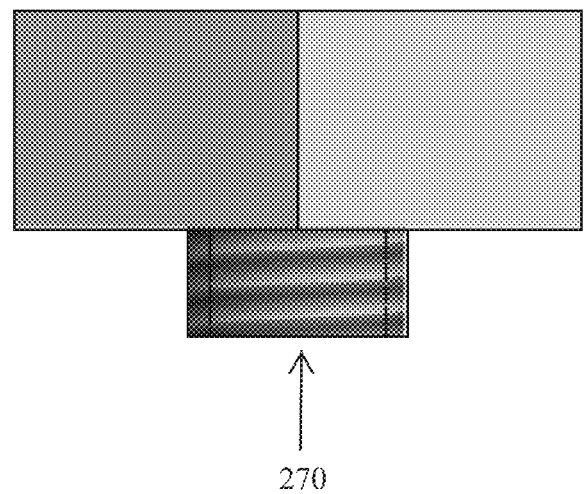
FIG. 23B shows multiple views of a short standoff.
Figure 23B:
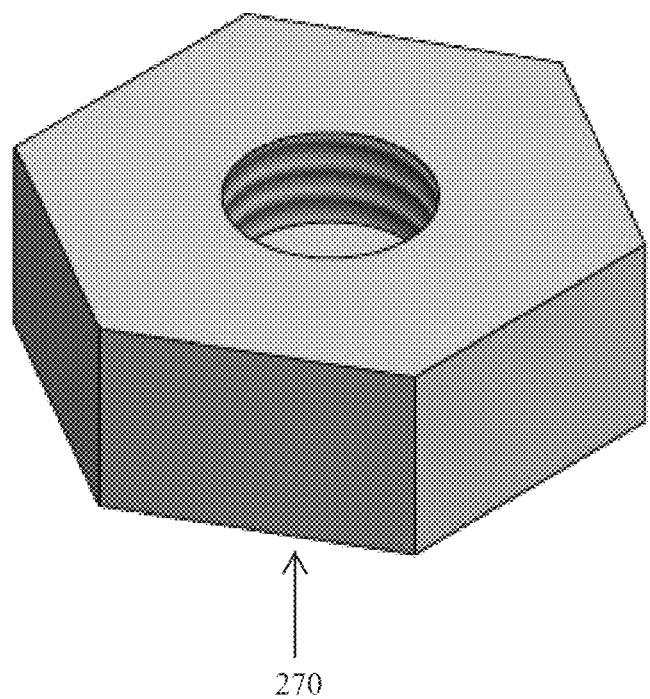
Figure 24A:
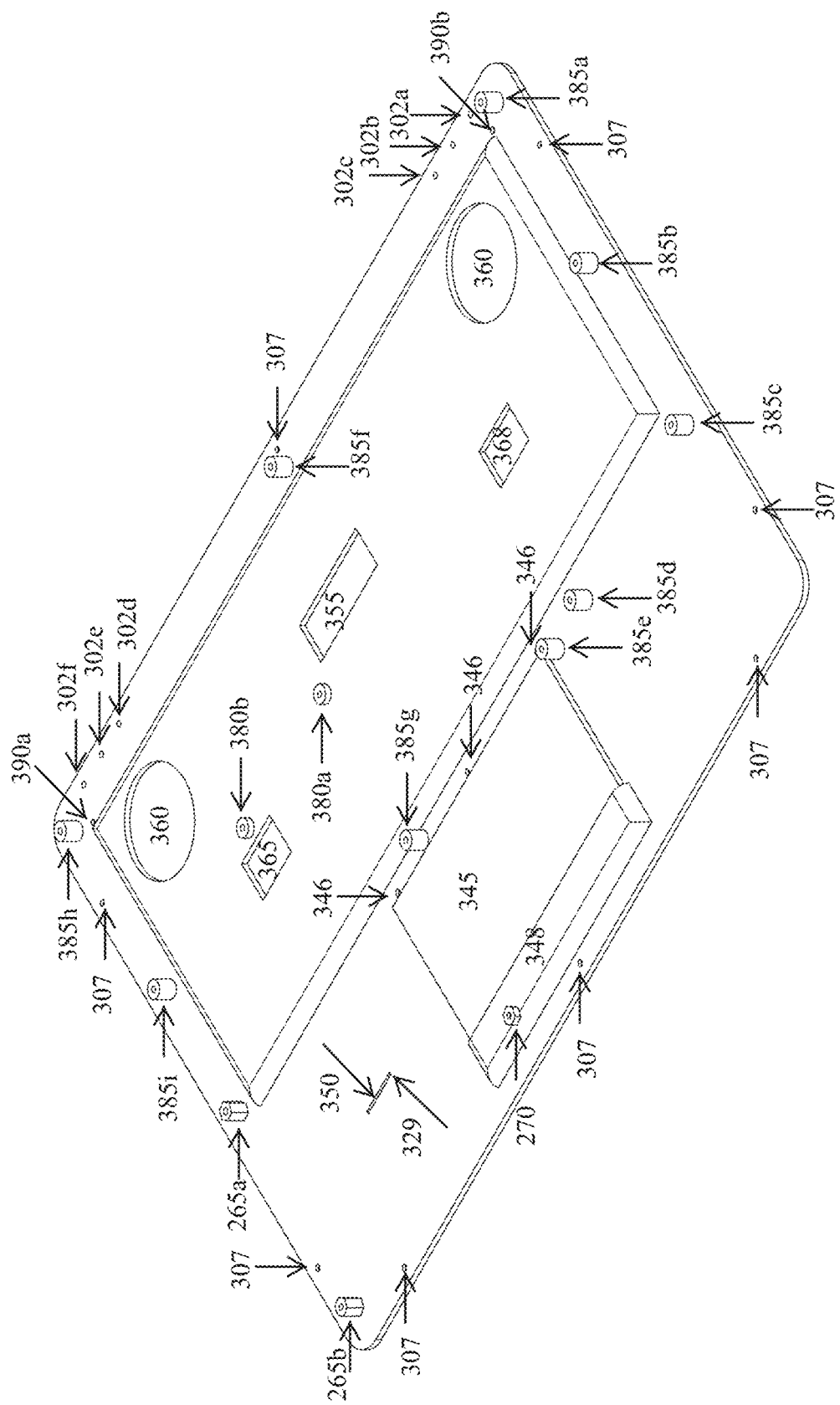
FIG. 24A is an interior view of the upper part with the standoffs installed according to the embodiment of FIG. 22.
Figure 24B:
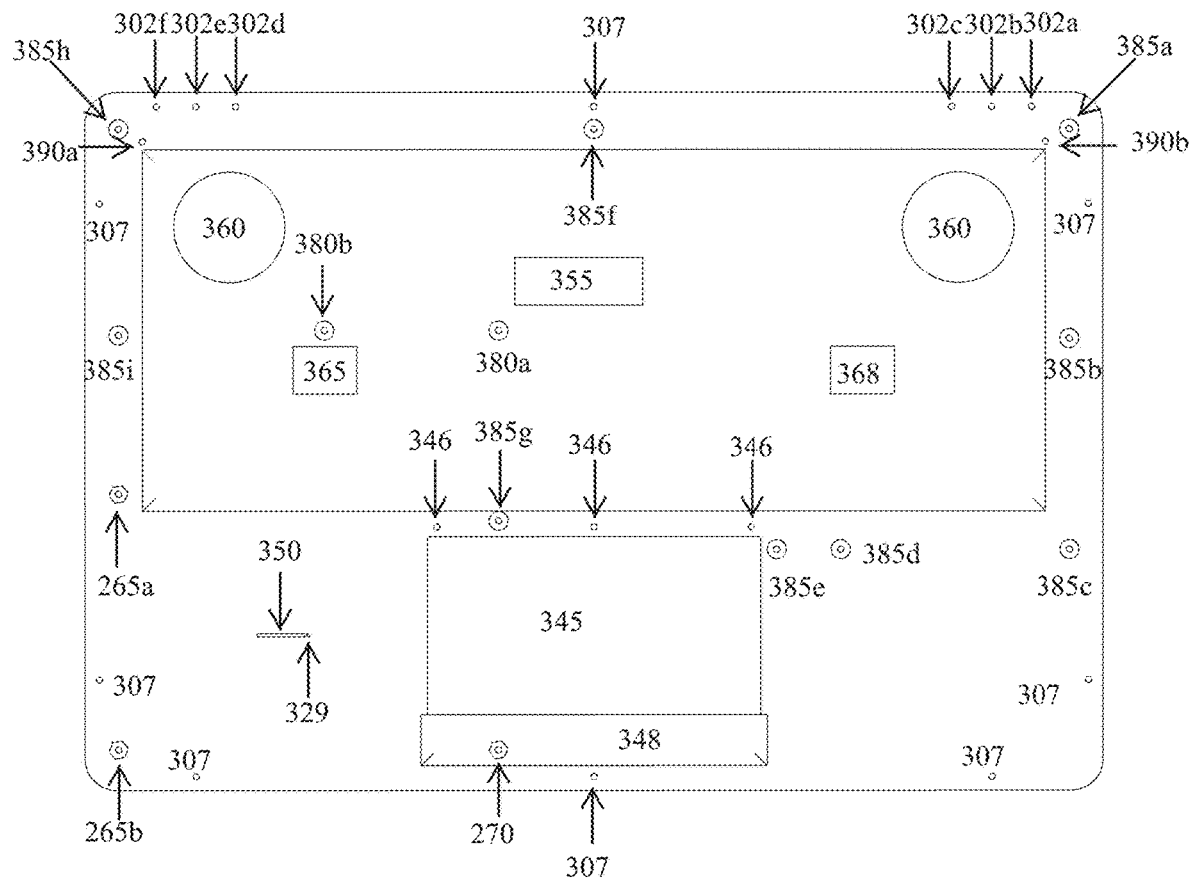
FIG. 24B is an interior top view of the upper part with the standoffs installed according to the embodiment of FIG. 22.
Figure 24C:
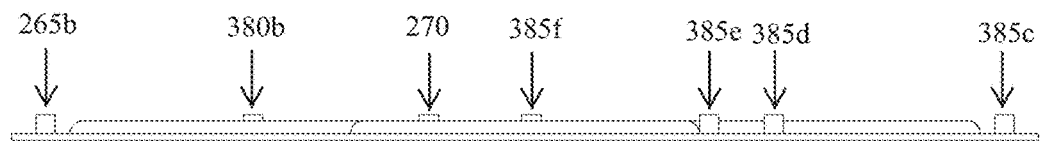
FIG. 24C is a front view of the upper part with the standoffs installed according to the embodiment of FIG. 22.

Since the motherboard U 157 occupies the area allocated for the optical drive 160 in the embodiment of FIG. 1A, the motherboard U 157 requires additional mounting points. FIGS. 23A and 23B show two types of standoffs with different heights. More specifically, FIG. 23A shows a tall standoff 265 and FIG. 23B shows a short standoff 270. The standoffs 265 and 270 are flat on both ends with a male threaded screw extending out of one end and a female threaded hole in the center of the other end. All standoffs are hexagonal, so they can be easily installed or removed. The interior side 370 of the upper part 300 without any standoffs is shown in FIGS. 3C through 3E. Two tall standoffs 265 (marked as 265*a* and 265*b*) are screwed into the female threaded mounting holes 395 and one short standoff 270 is screwed into the female threaded mounting hole 397. Because the short standoff 270 is located on the touchpad mounting ridge 348 with a higher horizontal base level, the tops of the short standoff 270 and tall standoffs 265 are level. Views of the interior side 370 of the upper part 300 with the standoffs installed are shown in FIG. 24A through FIG. 24C. As shown in FIGS. 24A and 24B, in addition to the stands 380 and 385, there are two tall standoffs 265 and one short standoff 270 fixed in the mounting holes 395 and 397, respectively. FIG. 24C shows a front view of the interior side 370 of the upper part 300. The tops of all standoffs 265 and 270 are level with all of the stands 380 and 385. After the standoffs are installed, the interior side 370 of the upper part 300 is ready to mount the motherboard U 157 and other components.

Figure 25A:
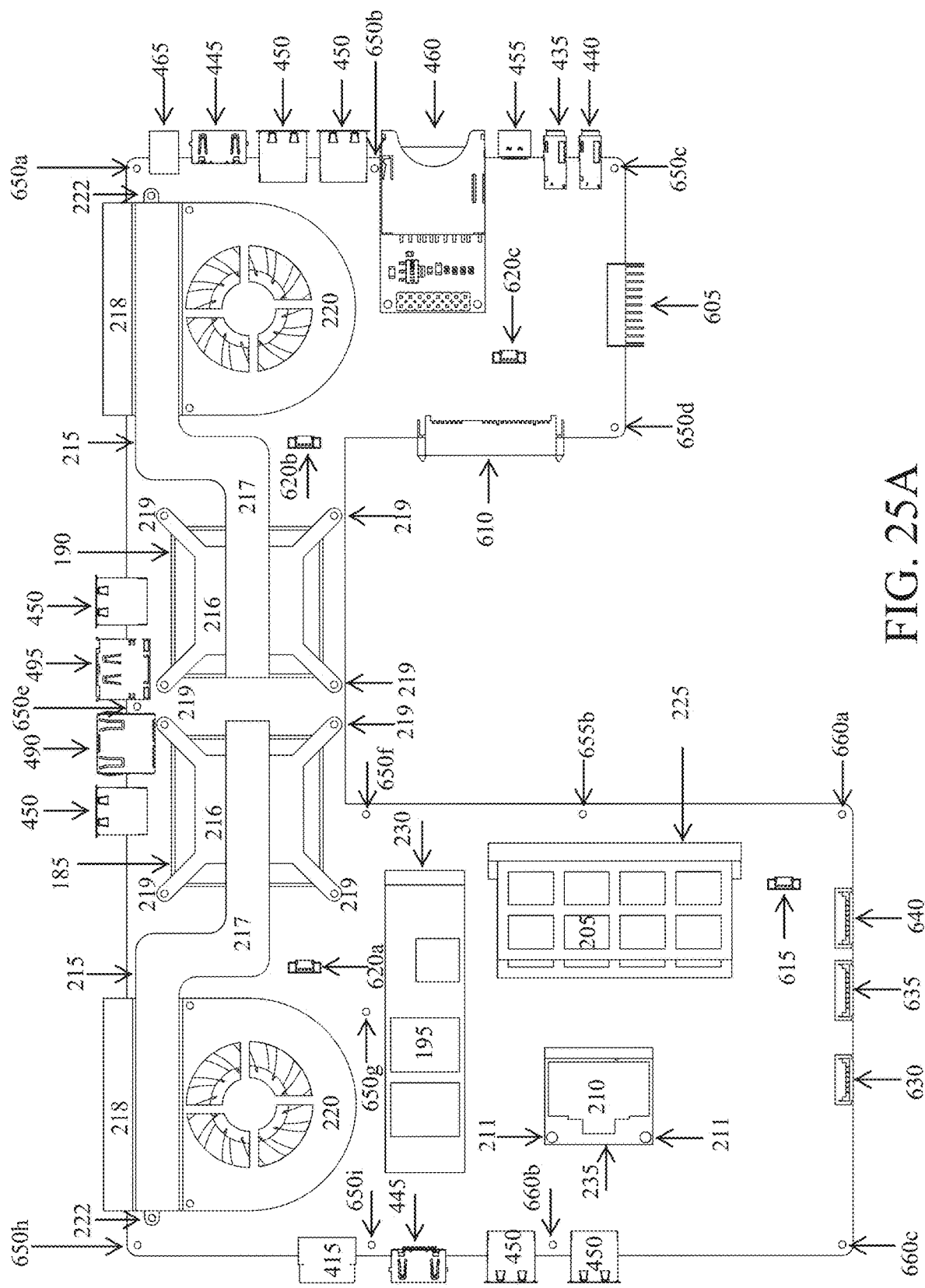
FIG. 25A is a top view of the motherboard U according to the embodiment of FIG. 22.

Turning now to FIGS. 25A through 25F, views of the motherboard U 157 according to the embodiment of FIG. 22 are shown. More specifically, FIG. 25A shows a top view of the motherboard U 157. To simplify the description, only the differences between the embodiment of FIG. 22 and the previous embodiment of FIG. 1A are illustrated. In this embodiment, there are additional ports including an HDMI port 445 and two USB ports 450 on the left side of the motherboard U 157. The motherboard U 157 has a total of six USB ports 450, two HDMI ports 445, a DisplayPort 495, VGA port 415, network port 490, USB C port 455, power port 465, headphone port 435, microphone port 440 and card reader 460. In this embodiment, because the I/O ports on the left side of the motherboard U 157 are different from previous embodiments, a different right removable I/O plate 411 (shown in FIG. 26B) is installed. Please note that the chassis 150 can accommodate a motherboard with different I/O ports by simply replacing one or more of the removable I/O plates.

Like the motherboard U 156, there are two heatsink modules 215 and two cooling fans 220 on the motherboard U 157. The locations of components such as the SSD 195, wireless card 210, and memory 205 have changed. In addition, the locations of some connectors may also change. Since there is no optical drive 160 in this embodiment, there is no optical drive connector 625 on the motherboard U 157. Since the motherboard U 157 is larger than the motherboard U 155 and motherboard U 156 in the previous embodiments, the motherboard U 157 may also be more complex. This complexity lies not only in the fact that the motherboard U 157 can support more powerful components, but also in the use of more advanced chipsets and faster buses. As mentioned earlier, the dimensions of the motherboard U as well as the number of mounting holes and their locations are specifications that need to be considered during the layout and installation of the motherboard U in the chassis.

In this embodiment, besides the mounting holes 650, there are four additional mounting holes 655*b* and 660*a* through 660*c* on the motherboard U 157. The mounting holes 650*a* through 650*d* are screwed to the stands 385*a* through 385*d*, respectively. The mounting hole 650*e* is screwed to the stand 385*f*. The mounting holes 650*f* and 650*g* are screwed to the stands 380*a* and 380*b*, respectively. The mounting holes 650*h* and 650*i* are screwed to the stands 380*h* and 385*i*, respectively. The mounting hole 655*b* is screwed to the stand 385*g*. The mounting holes 660*a*, 660*b* and 660*c* are screwed to the standoffs 270, 265*a* and 265*b*, respectively. Each of the mounting holes 650, 655 and 660 is screwed to a stand or a standoff. Like previous embodiments, a stand or standoff can be shared by multiple components. For example, stands 385*d* and 385*e* are also used to mount the battery 175.

Figure 25B:
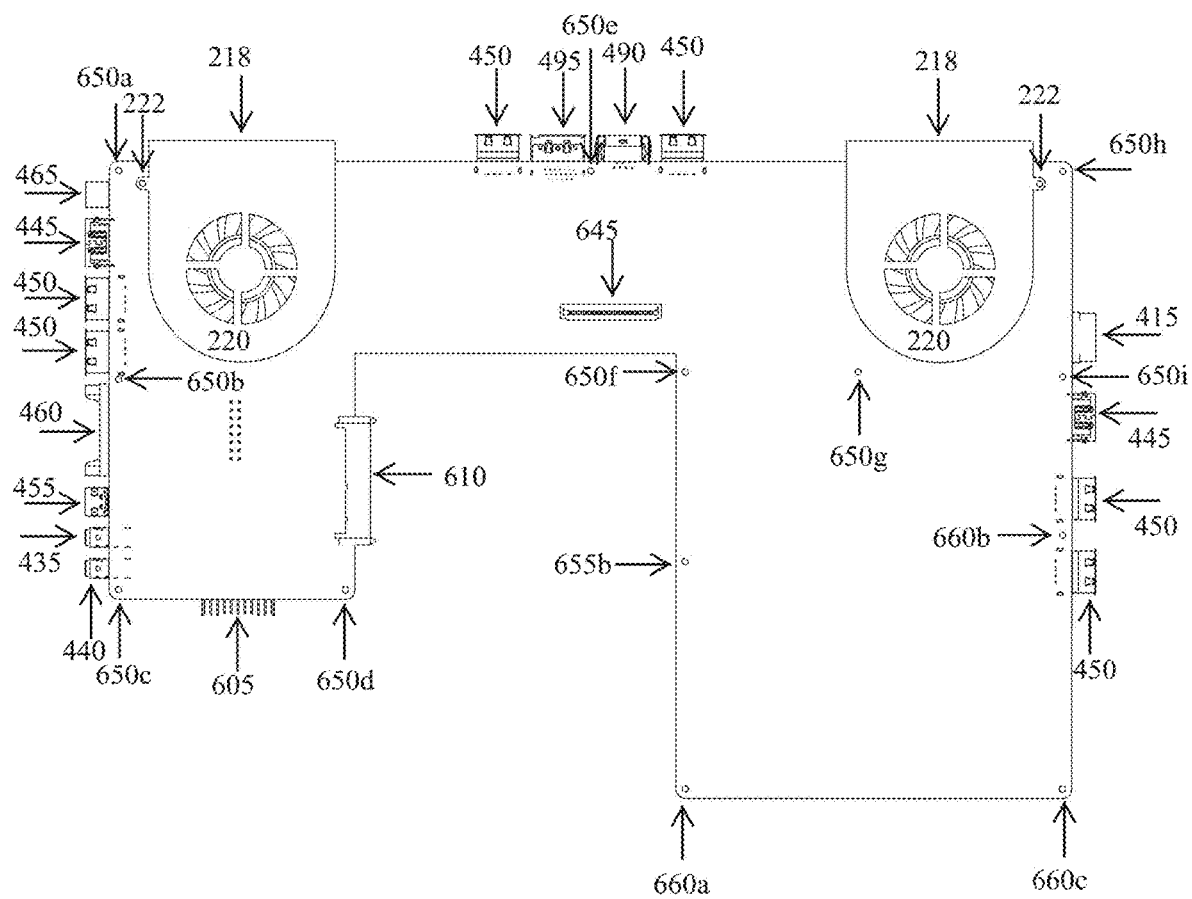
FIG. 25B is a bottom view of the motherboard U according to the embodiment of FIG. 22.
Figure 25C:
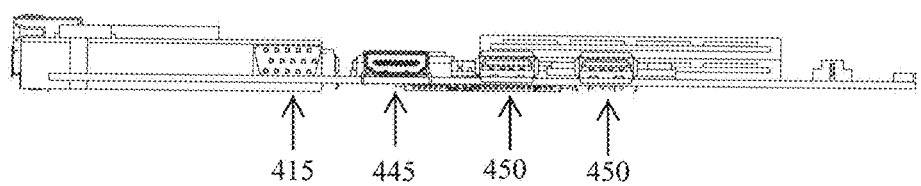
FIG. 25C is a left side view of the motherboard U according to the embodiment of FIG. 22.
Figure 25D:
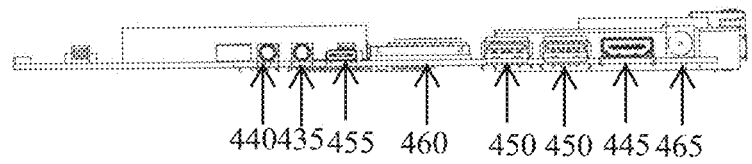
FIG. 25D is a right side view of the motherboard U according to the embodiment of FIG. 22.
Figure 25E:
FIG. 25E is a front view of the motherboard U according to the embodiment of FIG. 22.
Figure 25F:
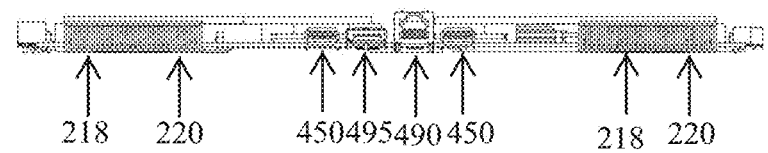
FIG. 25F is a rear view of the motherboard U according to the embodiment of FIG. 22.

FIG. 25B shows a bottom view of the motherboard U 157 according to embodiment of FIG. 22. FIG. 25B shows the I/O ports, female SATA connectors 610, keyboard connector 645 and battery connector 605. FIG. 25B also shows mounting holes 650, 660 and 655*b*. The cooling fans 220, mounting holes 222 and microfin heatsinks 218 are also shown in FIG. 25B. FIGS. 25C through 25F show left side, right side, front, and rear views of the motherboard U 157. FIGS. 25C and 25D show I/O ports on the left and right sides of the motherboard U 157. FIG. 25F shows some I/O ports, two microfin heatsinks 218 and two cooling fans 220. All I/O ports have been described in the description of FIG. 25A.

Figure 26A:
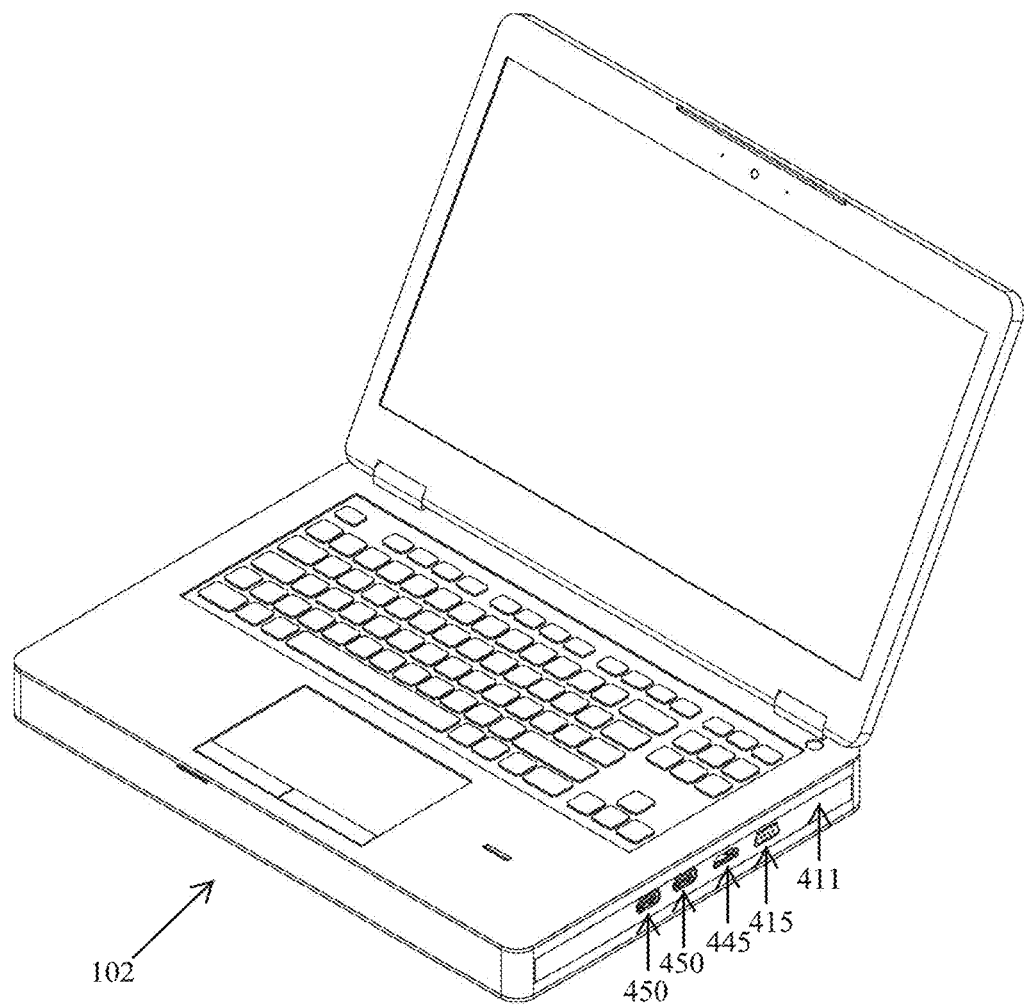
FIG. 26A is a front facing view of the portable computer according to the embodiment of FIG. 22 in a close cover position.
Figure 26B:
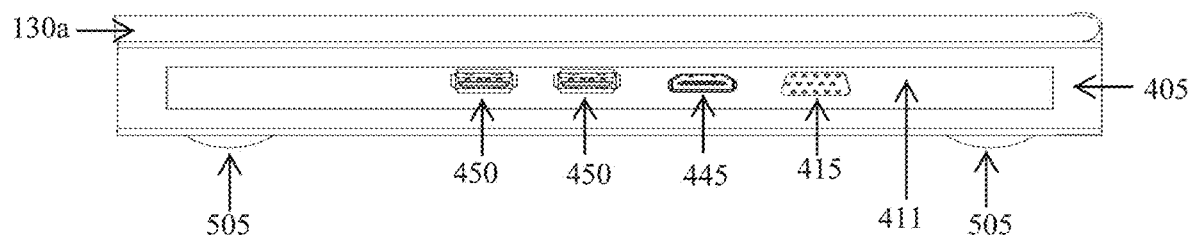
FIG. 26B is a right side view of the portable computer according to the embodiment of FIG. 22 in a close cover position.

As for the appearance of the portable computer 102, the top, left and front views are the same as the embodiment of FIG. 1A. Because there are two heatsink modules 215 and two cooling fans 220 in this embodiment, the rear and bottom views of the portable computer 102 are the same as the embodiment of FIG. 19. More specifically, the top, left, front, rear and bottom views of the portable computer 102 according to the embodiment of FIG. 22 in a close cover position are shown in FIGS. 1B, 1D, 1E, 21A and 21B, respectively. As there are more I/O ports on the left side of the motherboard U 157, FIG. 26A shows a front facing view of the portable computer 102 according to the embodiment of FIG. 22 in an open cover position. FIG. 26B shows right side view of the portable computer 102 according to the embodiment of FIG. 22 in a close cover position. FIG. 26B shows the right side wall 405, the right side 130*a* of the display back cover 130 and the support feet 505. The right side wall 405 of the base portion 200 is equipped with the right removable I/O plate 411, which has various openings for the inputs and outputs (I/Os) of the portable computer 102. Since the right removable I/O plate 411 is different from the right removable I/O plate 410 of the previous embodiments, it is represented by a different number. In this embodiment, a VGA port 415, an HDMI port 445 and two USB ports 450 are shown in FIG. 26B.

Figure 27:
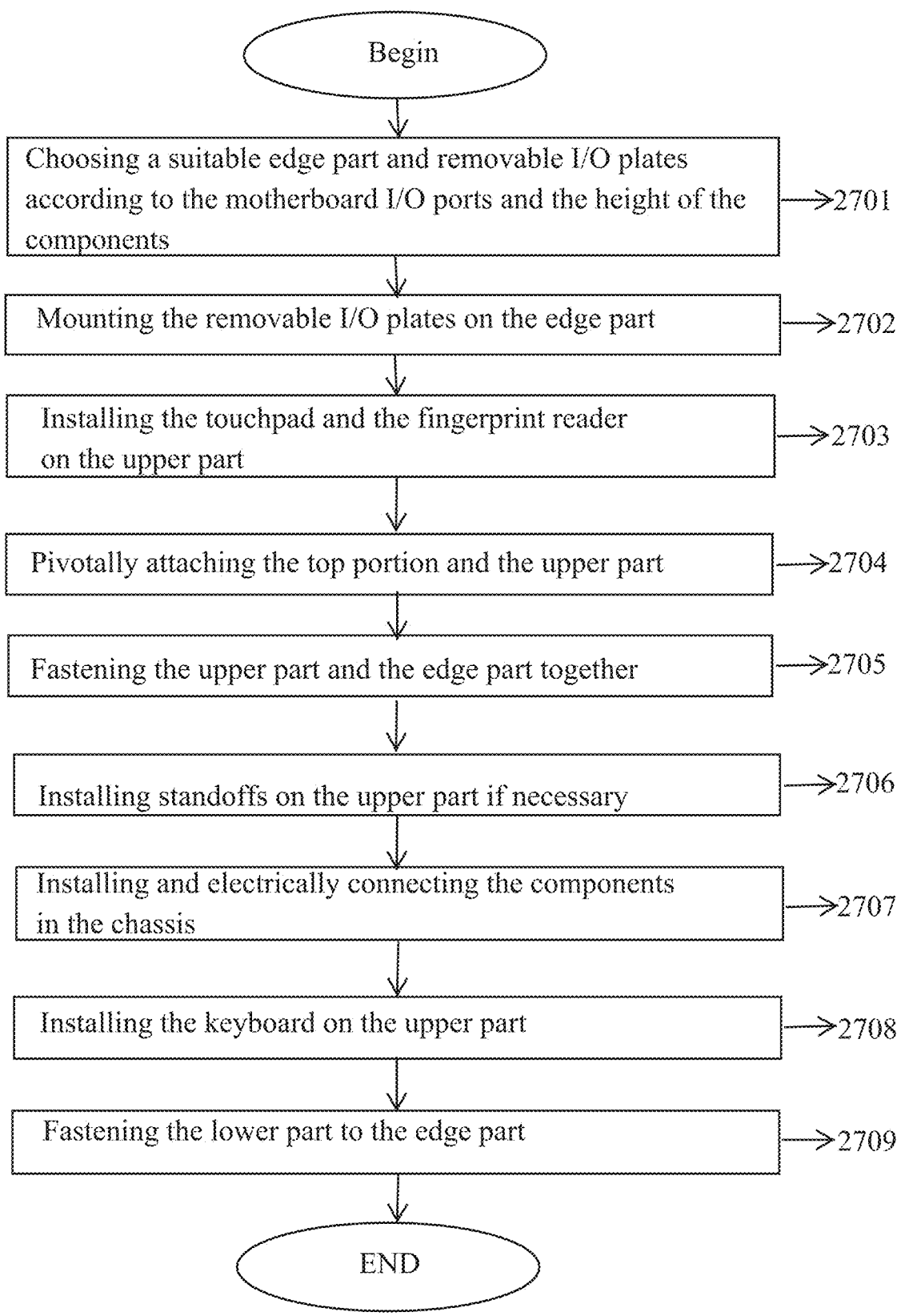
FIG. 27 is a flowchart detailing the methodology and process to assemble the portable computer.

Turning now to FIG. 27, a flowchart is shown detailing the methodology and process 2700 to assemble the portable computer is shown. More specifically, the flowchart shows how to assemble the portable computer from scratch based on the chassis and all the components.

Because the invention relates to base portion of the portable computer, the focus of the flowchart is on this portion. In order to assemble the portable computer, the components, upper part, edge part, lower part, removable I/O plates, standoffs, etc., must be collected. The assembling process 2700 starts at 2701 in which a suitable edge part that is tall enough to accommodate all components is chosen. All components, such as the motherboard U, battery, 2.5 inch hard drive, optical drive and speakers, should have a height and size suitable for installation in the edge part. Depending on whether there is an optical drive or a 2.5 inch hard drive, the motherboard can be a variety of sizes. At 2701, removable I/O plates are also chosen based on the I/O ports of the motherboard. The side walls of the edge part have openings to accommodate removable I/O plates. If one side of the motherboard has I/O ports, a suitable I/O plate is chosen to accommodate that side of the motherboard. Otherwise, a dummy I/O plate or air duct I/O plate can be installed instead. At 2702, removable I/O plates are mounted on the appropriate side walls of the edge part. Three removable I/O plates can be installed on the right, left and rear side walls of the edge part. At 2703, all mounting holes on the touchpad are aligned with the touchpad mounting holes on the upper part, then screws are fastened to fix the touchpad to the upper part. At 2703, the fingerprint reader is mounted in the same manner. At 2704, the top portion and the upper part of the base portion are pivotally attached. To fasten the top portion to the upper part of the base portion, align the hinges with the mounting holes of the top portion and the upper part, and then fasten screws into the threads of the mounting holes. Then, the hinge covers are placed, covering the hinges, screws and the hinge mounting holes. At 2705, the upper part and the edge part are fastened together by tightening screws into the threads of the mounting holes. Please note that at 2704, the screws are screwed into the mounting holes from the exterior side of the upper part, while at 2705, the screws are screwed into the mounting holes from the interior side of the edge part. At 2706, depending on the dimensions of motherboard, battery and other components, standoffs are installed on the upper part if necessary. For example, depending on the dimensions of the motherboard U as well as the number of mounting holes and their locations, standoffs can be installed in the chassis if necessary. After 2706, the chassis is ready to mount the internal components. At 2707, the components are installed and electrically connected in the chassis. The motherboard U is prepared first. After the processor and the graphics card are installed in their designated sockets on the motherboard, a thin layer of thermal compound or thermal pad is then applied to the surface of the processor and the graphics card. After the heatsink modules and the cooling fans are fixed to the motherboard, the SSD, wireless card, and memory are inserted into the SSD slot, the wireless card slot, and the memory slots, respectively. After preparing the motherboard U, align the motherboard U with the mounting stands on the interior side of the upper part, and then tighten screws into the stands and standoffs (if necessary) to fix the motherboard U in the chassis. Please note not to screw the screws into mounting stands and standoffs shared by other components. Then other components such as the 2.5 inch hard drive, optical drive, LED board and battery are installed. Please note that depending on the specifications and application of the portable computer, the portable computer may omit some or all of the optional components, such as the optical drive and the 2.5 inch hard drive. At 2707, the cables of all the components are connected to the respective connectors on the motherboard. For example, the cooling fan cable is connected to a fan connector on the motherboard. The speaker wires, touchpad cable, and fingerprint reader cable are all connected to the corresponding connectors on the motherboard. The antenna cables are connected to connectors on the wireless card. At 2708, the keyboard is connected to the motherboard through a keyboard connector on the bottom side of the motherboard. The keyboard is then placed in the keyboard holder, and is locked into place through the keyboard slots on the upper part. At 2709, the assembly process 2700 is completed by fastening the lower part to the edge part.

Figure 28:
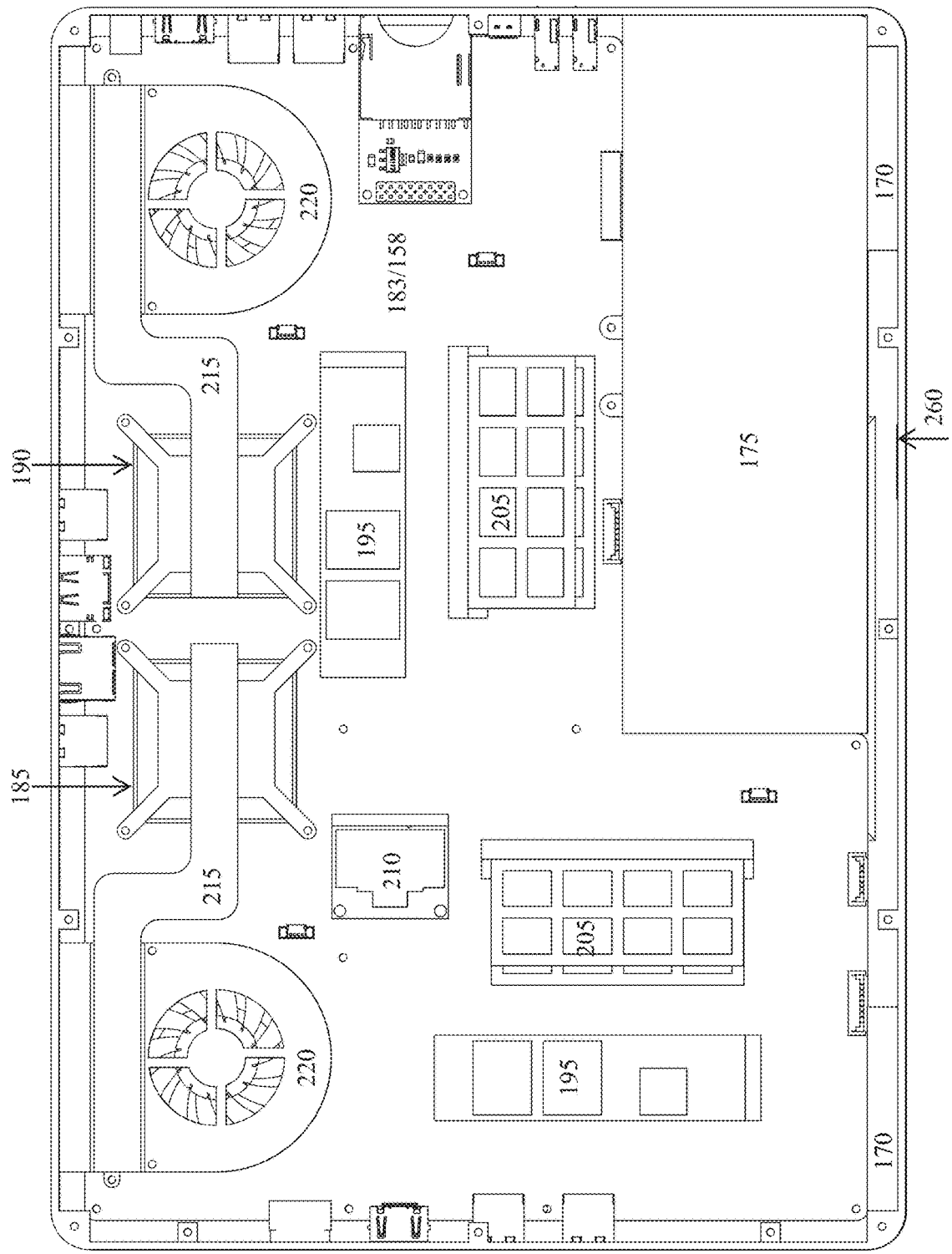
FIG. 28 is a view of the internal components and structures from the bottom of a portable computer with the lower part of the chassis removed, according to yet another embodiment.

Turning now to FIG. 28, a view of the internal components and structures from the bottom of the portable computer 103 with the lower part 500 of the chassis 150 removed, according to yet another embodiment, is shown. There is no optical drive 160 and 2.5 inch hard drive 165 in this embodiment. As shown in FIG. 28, in this embodiment, the components include a motherboard U 158, two speakers 170, a battery 175, an LED board 260, etc. In contrast to the motherboard U 155 in FIGS. 7A through 7F, the enlarged motherboard U 158 also occupies the area allocated for the optical drive 160 and 2.5 inch hard drive 165 in the embodiment of FIG. 1A. Since the motherboard 183 and motherboard U 158 have different dimensions compared to the former embodiments, a different number is used to identify them.

In order to accommodate the enlarged motherboard U 158 in this embodiment, three additional standoffs 265a, 265b and 270 are installed on the interior side 370 of the upper part 300. The interior side 370 of the upper part 300 with the three standoffs 265a, 265b and 270 installed is shown in FIGS. 24A through 24C. As shown in FIGS. 24A through 24C, in addition to the stands 380 and 385, there are standoffs 265 and 270.

Figure 29A:
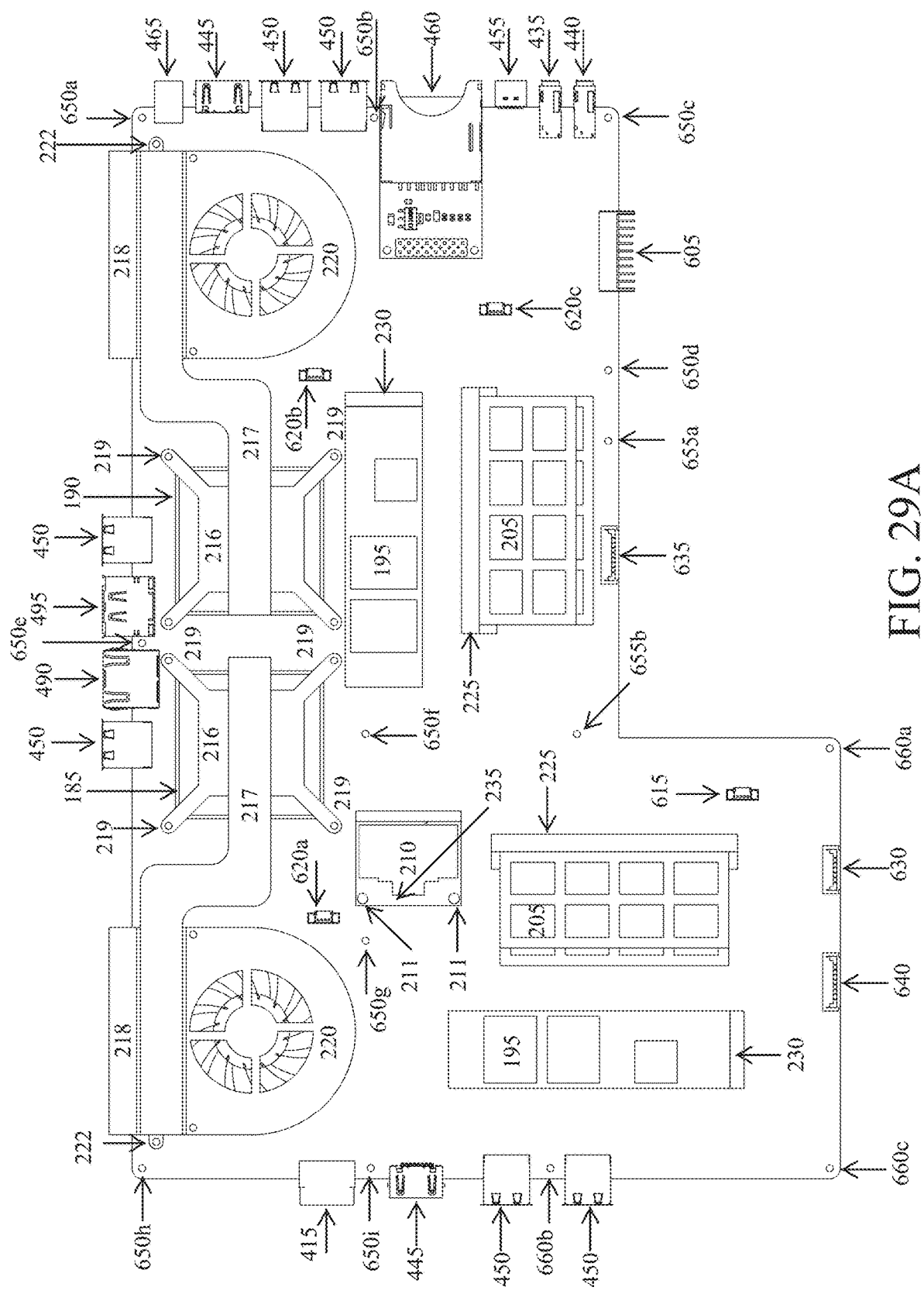
FIG. 29A is a top view of the motherboard U according to the embodiment of FIG. 28.

FIGS. 29A through 29F show views of the motherboard U 158 according to the embodiment of FIG. 28. More specifically, FIG. 29A shows a top view of the motherboard U 158. As shown in FIG. 29A, the locations of some components and connectors has changed. Also, because there is no optical drive 160 and 2.5 inch hard drive 165, the optical drive connector 625 and female SATA connectors 610 are not on the motherboard U 158. Compared to the previous embodiments, the motherboard U 158 has two SSDs 195 and two sets of memory 205.

The motherboard U 158 has one more mounting hole 655a than the motherboard U 157. In this embodiment, the mounting holes 650a through 650d are screwed to the stands 385a through 385d, respectively. The mounting hole 650e is screwed to the stand 385f. The mounting holes 650f and 650g are screwed to the stands 380a and 380b, respectively. The mounting holes 650h and 650i are screwed to the stands 385h and 385i, respectively. The mounting holes 655a and 655b are screwed to the stands 385e and 385g, respectively. The mounting holes 660a, 660b and 660c are screwed to the standoffs 270, 265a and 265b, respectively. Each of mounting holes 650, 655 and 660 is screwed to a stand or a standoff. Like previous embodiments, a stand or standoff can be shared by multiple components. For example, stands 385d and 385e are also used to mount the battery 175.

Figure 29B:
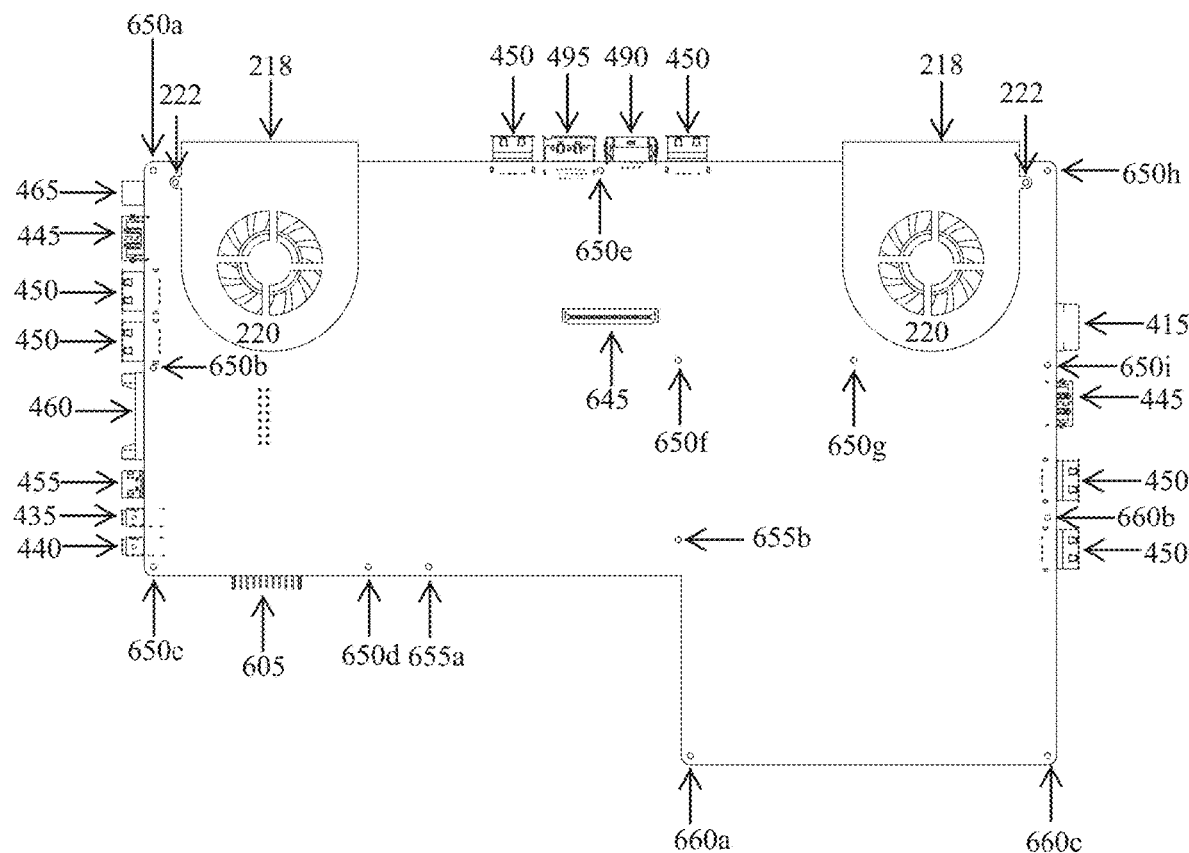
FIG. 29B is a bottom view of the motherboard U according to the embodiment of FIG. 28.
Figure 29C:
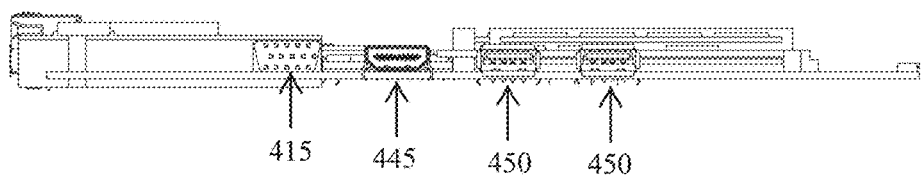
Figure 29D:
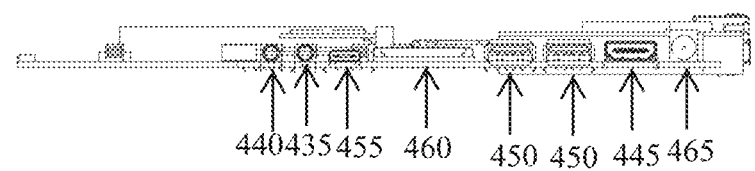
FIG. 29D is a right side view of the motherboard U according to the embodiment of FIG. 28.
Figure 29E:
FIG. 29E is a front view of the motherboard U according to the embodiment of FIG. 28.
Figure 29F:
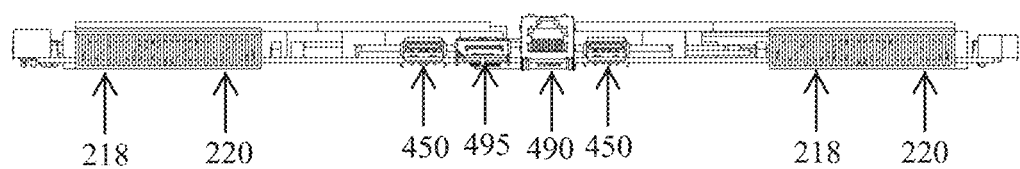
FIG. 29F is a rear view of the motherboard U according to the embodiment of FIG. 28.

FIG. 29B shows a bottom view of the motherboard U 158 according to embodiment of FIG. 28. FIG. 29B shows the I/O ports, keyboard connector 645 and battery connector 605. FIG. 29B also shows mounting holes 650, 655 and 660. The cooling fans 220, mounting holes 222 and microfin heatsinks 218 are also shown in FIG. 29B. FIGS. 29C through 29F show left, right, front, and rear side views of the motherboard U 158. FIGS. 29C and 29D show I/O ports on the left and right sides of the motherboard U 158. FIG. 29F shows some I/O ports, two microfin heatsinks 218 and two cooling fans 220. Because the I/O ports of the motherboard U 158 are exactly the same with those of the motherboard U 157, refer to the description section of FIG. 25A, for the description of motherboard U 158.

The appearance of the portable computer 103 is exactly the same as the embodiment of FIG. 22. More specifically, FIG. 26A shows a front facing view of the portable computer 103 according to the embodiment of FIG. 28 in an open cover position. The top, right, left, front, rear and bottom views of the portable computer 103 according to the embodiment of FIG. 28 in a close cover position are shown in FIGS. 1B, 26B, 1D, 1E, 21A and 21B, respectively.

Figure 30:
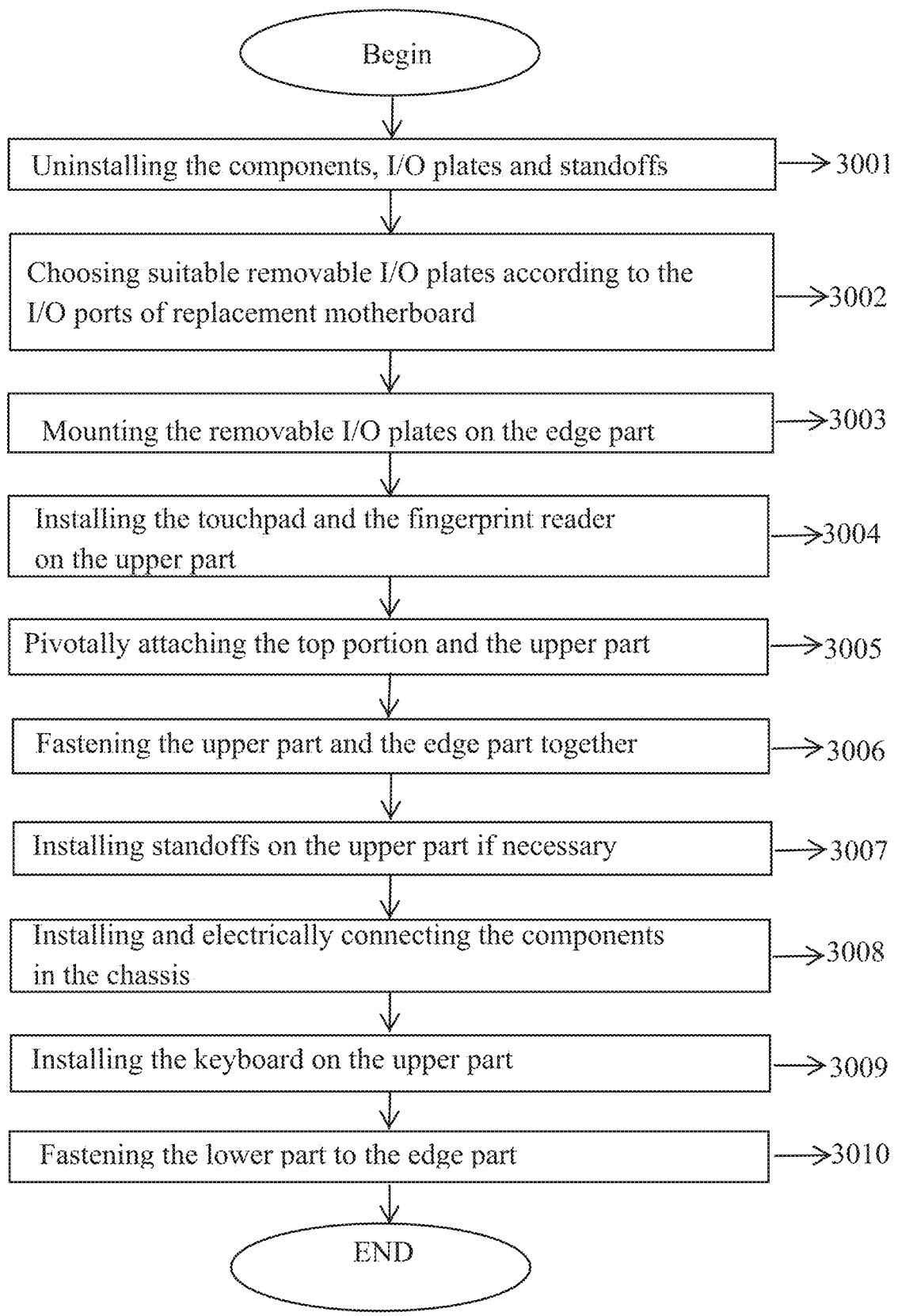
FIG. 30 shows a flowchart detailing a methodology and process to reconfigure the portable computer that already has all the components installed.

Turning now to FIG. 30, a flowchart is shown detailing a methodology and process 3000 to reconfigure the portable computer that already has all the components installed. More specifically, the flowchart details how to reassemble the portable computer based on the current chassis and a new motherboard. The new motherboard can have different I/O ports and/or dimensions than the original motherboard. For example, the original motherboard mounted in the chassis can be the motherboard U of the embodiment of FIG. 1A, which is being replaced by the motherboard U of the embodiment of FIG. 28. Please note that the two motherboards differ in that they have different I/O ports and dimensions. However, the height of the replacement motherboard U allows it to be installed in the original chassis. The methodology and process 3000 detailed in this flowchart is applicable to many situations. One situation is that the original motherboard is damaged, and the same motherboard is no longer available. Another situation is that the user is not satisfied with the performance of the original motherboard and wants to replace it with a different motherboard. Sometimes the height of the replacement motherboard U prevents it from being installed in the original chassis. In this case, the edge part of the chassis needs to be replaced, which will be described later.

The reconfiguration process 3000 can begin once all the components have been collected. The process starts at 3001. At 3001, the portable computer is disassembled. All the components that are being replaced must be uninstalled from the chassis. The removable I/O plates and the standoffs must also be uninstalled from the edge part and upper part, respectively. At 3002, removable I/O plates are selected based on the I/O ports of the replacement motherboard. At 3003, the removable I/O plates are mounted on the appropriate side walls of the edge part. At 3004, all mounting holes on the touchpad are aligned with the touchpad mounting holes on the upper part, then screws are fastened to fix the touchpad to the upper part. At 3004, the fingerprint reader is mounted in the same manner. At 3005, the top portion and the upper part of the base portion are pivotally attached. Then, the hinge covers are placed, covering the hinges, screws and the hinge mounting holes. At 3006, the upper part and the edge part are fastened together. At 3007, depending on the dimensions of the motherboard, battery and other components, standoffs are installed on the upper part if necessary. After 3007, the chassis is ready to mount the internal components. At 3008, the components are installed and electrically connected in the chassis. After the relevant components are installed on the motherboard U, the motherboard U is ready and further installed in the chassis. Then other components such as the 2.5 inch hard drive, optical drive, LED board and battery are installed. At 3008, the cables of all the components are also connected to their respective connectors. For example, the cooling fan cable is connected to a fan connector on the motherboard. The speaker wires, touchpad cable, and fingerprint reader cable are all connected to the corresponding connectors on the motherboard. The antenna cables are connected to connectors on the wireless card. At 3009, the keyboard is connected to the motherboard through a keyboard connector on the bottom side of the motherboard. The keyboard is then placed in the keyboard holder, and is locked into place through the keyboard slots on the upper part. At 3010, the reconfiguration process 3000 is completed by fastening the lower part to the edge part.

Figure 31:
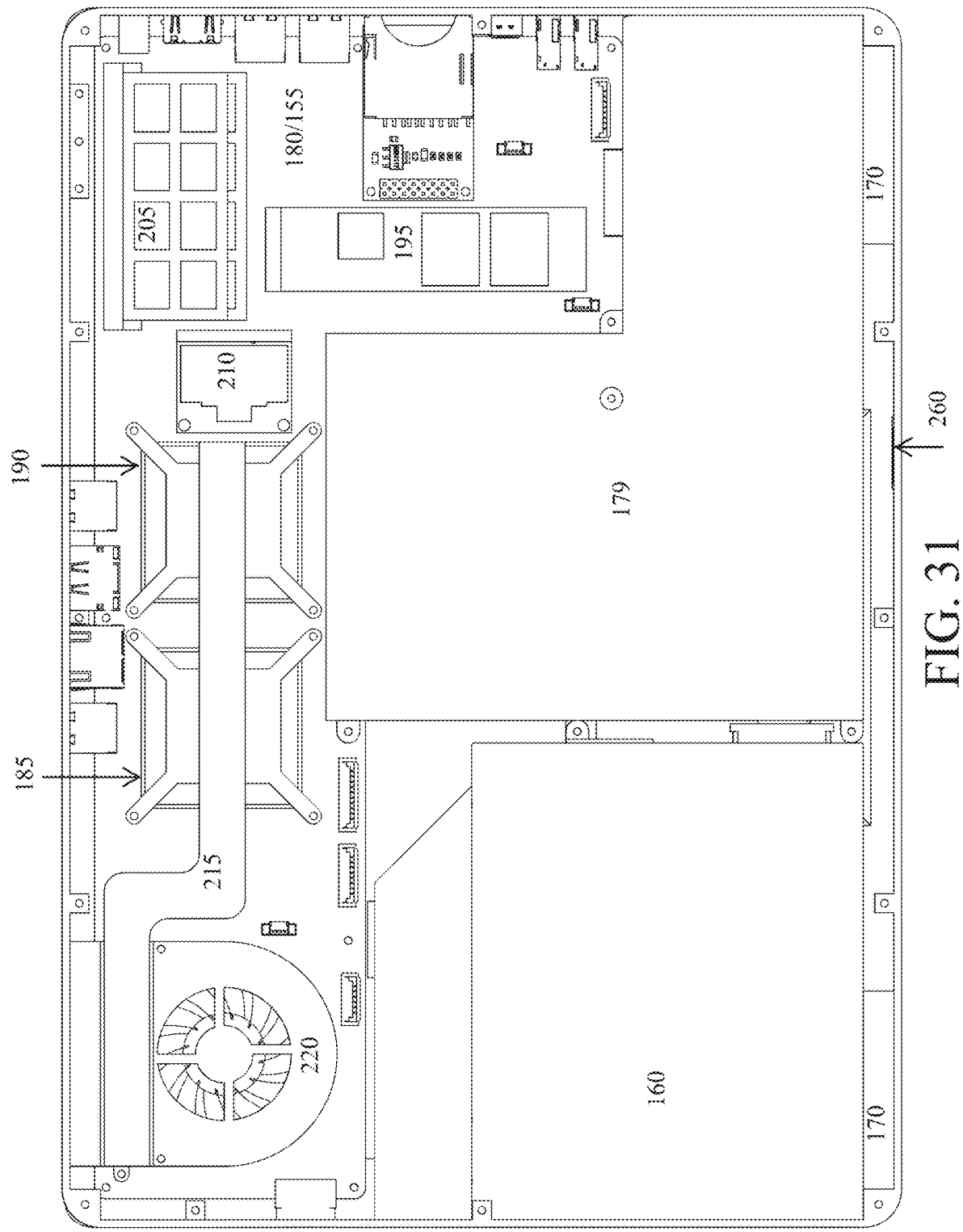
FIG. 31 is a view of the internal components and structures from the bottom of a portable computer with the lower part of the chassis removed, according to yet another embodiment.

Turning now to FIG. 31, a view of the internal components and structures from the bottom of the portable computer 104 with the lower part 500 of the chassis 150 removed, according to yet another embodiment, is shown. Unlike the embodiment of FIG. 1A, there is no 2.5 inch hard drive 165 in this embodiment. As shown in FIG. 31, in this embodiment, the components include a motherboard U 155, an optical drive 160, two speakers 170, a battery 179, an LED board 260, etc.

In this embodiment, the enlarged battery 179 occupies the area allocated for the 2.5 inch hard drive 165 in the embodiment of FIG. 1A. Larger batteries usually have a larger power capacity, which will allow the portable computer 104 to operate for a longer period of time without an external power source.

The motherboard U 155 of this embodiment is exactly the same as the motherboard U 155 in the embodiment of FIG. 1A. The motherboard U 155 is shown in FIGS. 7A through 7F. Since the battery 179 is different from the batteries of the previous embodiments, a different number is used to identify it.

In this embodiment, the mounting arrangement for the motherboard U 155 is exactly the same as the embodiment of FIG. 1A. The mounting holes 650a through 650d are screwed to the stands 385a through 385d, respectively. The mounting hole 650e is screwed to the stand 385f. The mounting holes 650f and 650g are screwed to the stands 380a and 380b, respectively. The mounting holes 650h and 650i are screwed to the stands 380h and 385i, respectively. Each mounting hole 650 is screwed to a stand. Same as previous embodiments, a stand or standoff can be shared by multiple components. For example, stands 385d and 385e are also used to mount the battery 179.

Figure 32A:
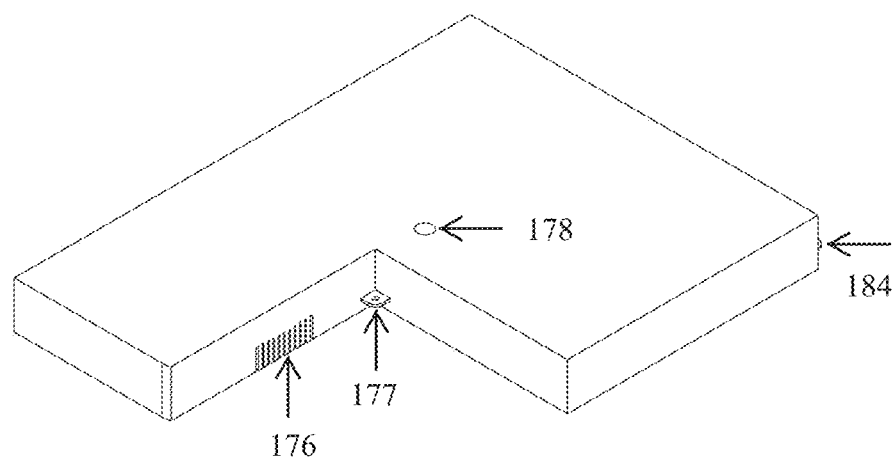
FIG. 32A is a rear facing view of the enlarged battery according to the embodiment of FIG. 31.
Figure 32B:
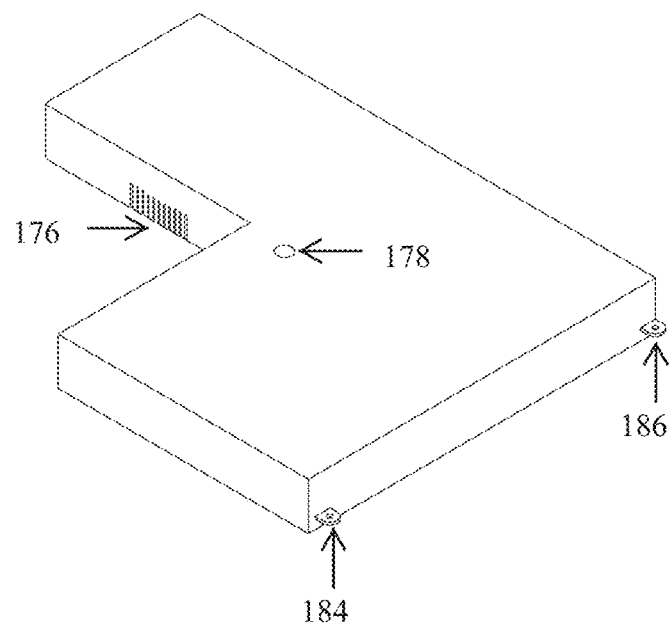
FIG. 32B is another rear facing view of the enlarged battery according to the embodiment of FIG. 31.
Figure 32C:
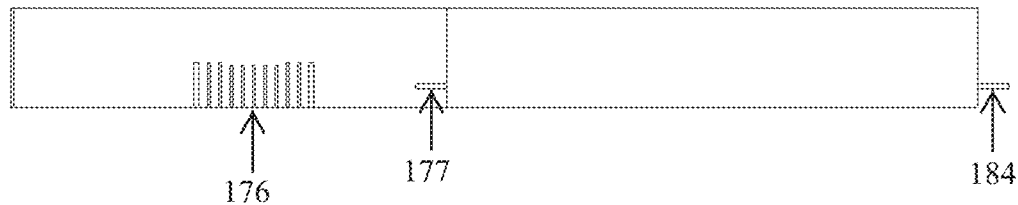
FIG. 32C is a rear view of the enlarged battery according to the embodiment of FIG. 31.
Figure 32D:
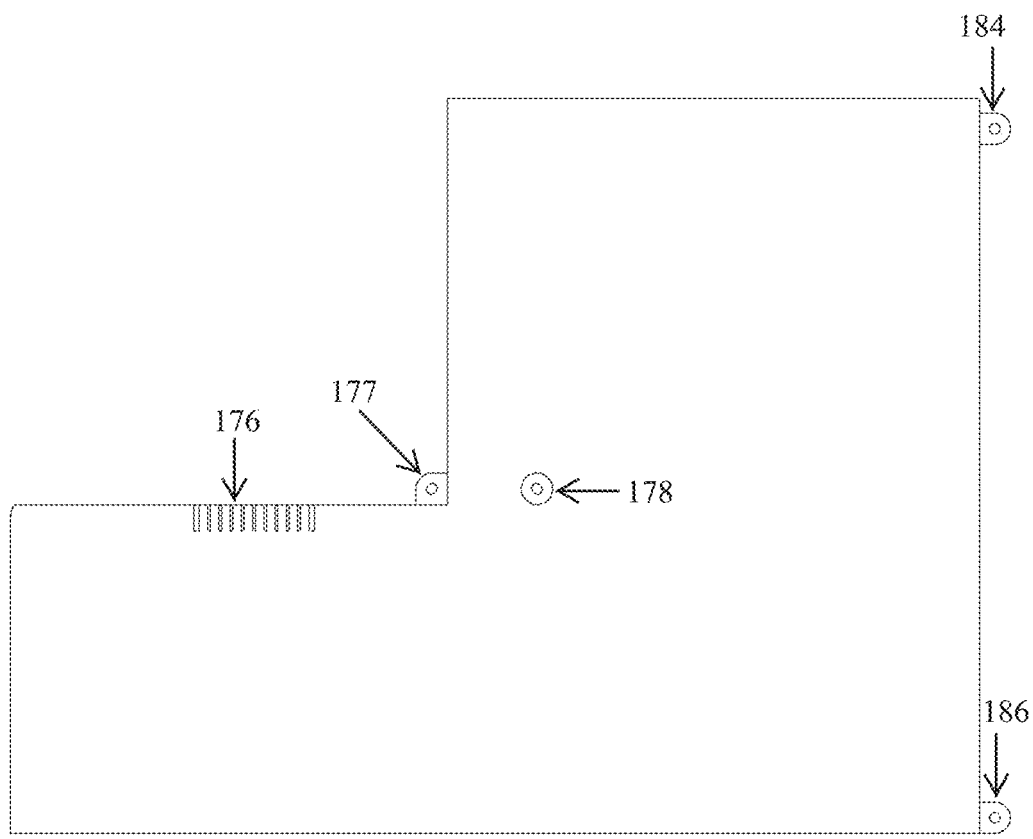
FIG. 32D is a bottom view of the enlarged battery according to the embodiment of FIG. 31.

FIGS. 32A through 32D show views of the battery 179 of the embodiment of FIG. 31. More specifically, FIGS. 32A and 32B show rear facing views of the enlarged battery 179. The enlarged battery 179 has the same power connector 176 as the battery 175. Besides the two mounting holes 177 and 178, the battery 179 has two additional mounting holes 184 and 186. Because the battery 179 is larger, the mounting hole 178 is actually located in the middle of battery pack. The interior side 370 of the upper part 300 without any standoffs is shown in FIGS. 3C and 3D. The standoff 270 can be mounted in the female threaded mounting hole 397 on the interior side 370 of the upper part 300 to provide an additional mounting position for the enlarged battery 179. The mounting holes 177 and 178 are screwed to the stands 385d and 385e, respectively. The mounting holes 184 and 186 are screwed to the stand 380a and the standoff 270, respectively. FIG. 32C is a rear view of the enlarged battery 179 according to the embodiment of FIG. 31. FIG. 32D is a bottom view of the enlarged battery 179 according to the embodiment of FIG. 31.

In this embodiment, the appearance of the portable computer 104 is exactly the same as the embodiment of FIG. 1A. Views of the portable computer 104 are shown in FIG. 1A through FIG. 1G.

Please note that the battery can be replaced by an even larger one to cover the space that the optical drive occupies to further increase the battery capacity of the portable computer.

In the above embodiments, the ability to mount removable standoffs and I/O plates allows motherboards and batteries of a plurality dimensions to be installed in the three-part chassis. Since the edge part of the chassis is removable, it can be replaced by another edge part with a different height. When a chassis has a taller edge part, a taller motherboard U, battery and other components can be installed. A chassis can have a tall enough edge part that leaves adequate space between the lower part and the tallest component in the chassis to install an auxiliary cooling system. The auxiliary cooling system can be a cooling fan or another type of cooling mechanism that can dissipate heat. On the motherboard, there is an extra fan connector that can be used to connect an auxiliary cooling system if needed. The auxiliary cooling system can be mounted on the lower part of the chassis through the mounting holes. The auxiliary cooling system will provide additional cooling for the portable computer.

Figure 33A:
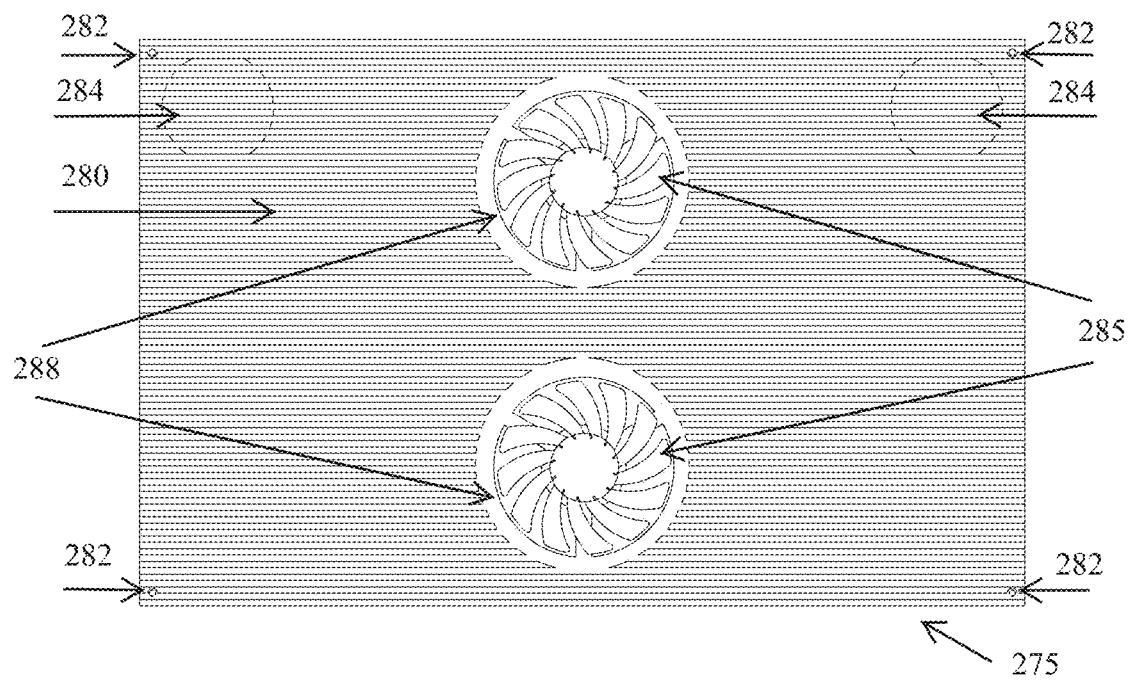
FIG. 33A is a top view of an auxiliary cooling system according to an embodiment.
Figure 33B:
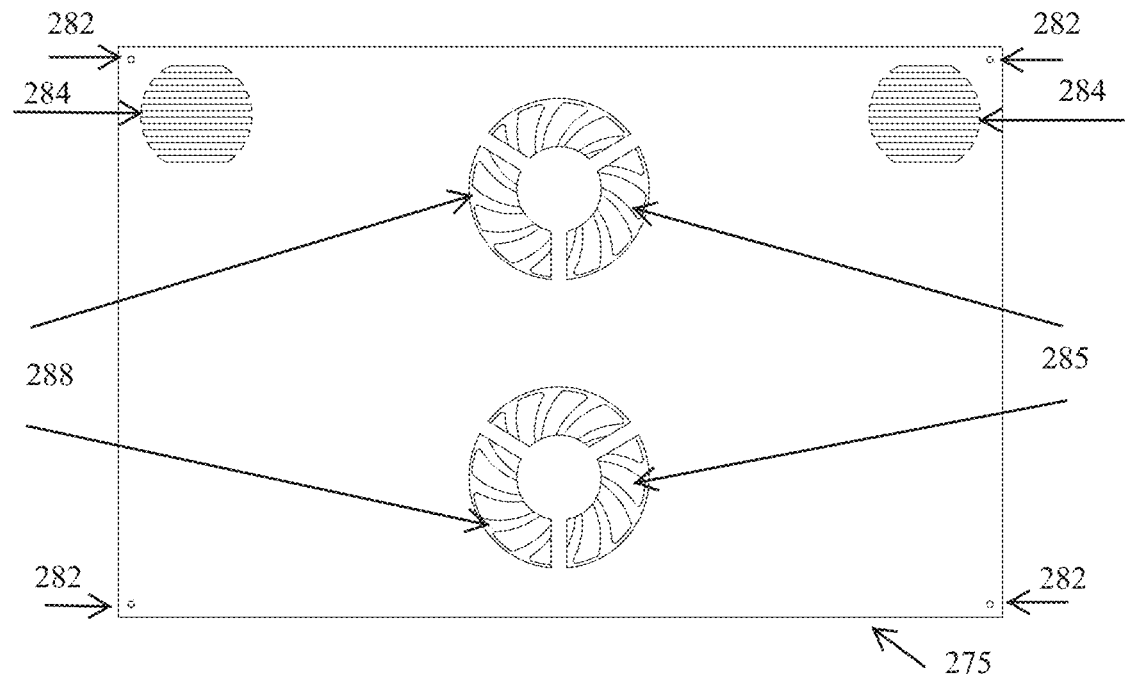
FIG. 33B is a bottom view of the auxiliary cooling system according to the embodiment of FIG. 33A.
Figure 33C:
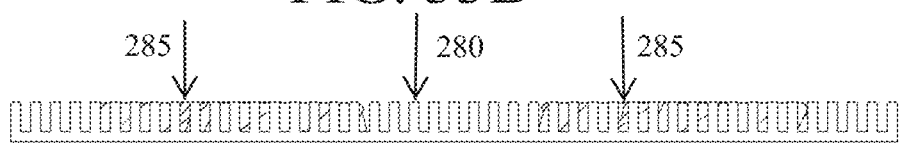
FIG. 33C is a side view of the auxiliary cooling system according to the embodiment of FIG. 33A.

Turning now to FIGS. 33A through 33C, views of an auxiliary cooling system 275 according to an embodiment are shown. More specifically, FIG. 33A is a top view of the auxiliary cooling system 275. As shown, the auxiliary cooling system 275 includes a microfin heatsink 280 and two cooling fans 285. The two cooling fans 285 are fixed on and surrounded by the microfin heatsink 280. There are air duct holes 288 in the microfin heatsink 280 that are positioned directly below the cooling fans 285. There are also air duct holes 284 that are positioned directly below the cooling fans 220 inside the chassis. On the four corners of the microfin heatsink 280, there are female threaded mounting holes 282. FIG. 33B is a bottom view of the auxiliary cooling system 275. On the bottom side of the auxiliary cooling system 275, there are mounting holes 282 and air duct holes 284 and 288. The cooling fans 285 can be seen through the air duct holes 288. FIG. 33C is a side view of the auxiliary cooling system 275. Screws can be screwed into the mounting holes 510 and 282 to fix the auxiliary cooling system 275 to the lower part 500. The cooling fans 285 can be connected to one of the fan connectors 620 on the motherboard.

Figure 33D:
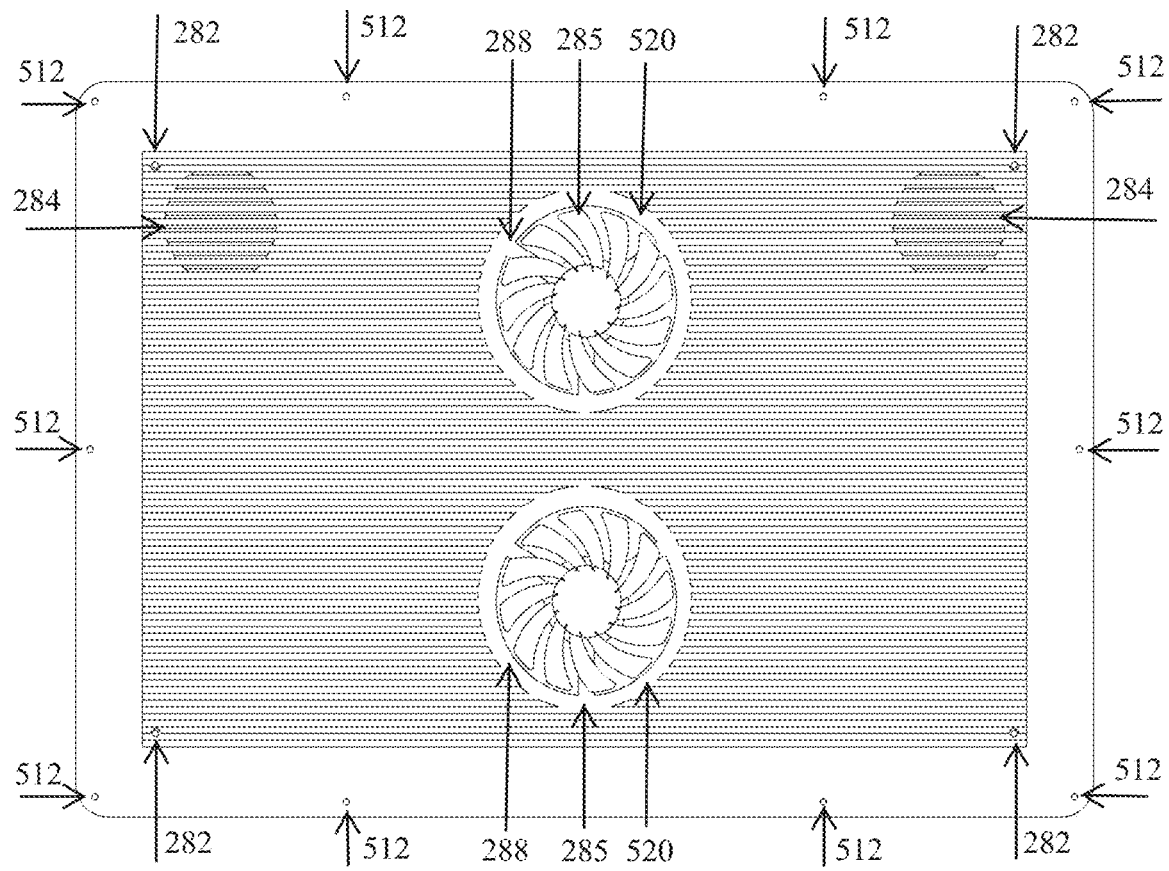
FIG. 33D is an interior view of the lower part with the auxiliary cooling system according to the embodiment of FIG. 33A installed.
Figure 33E:
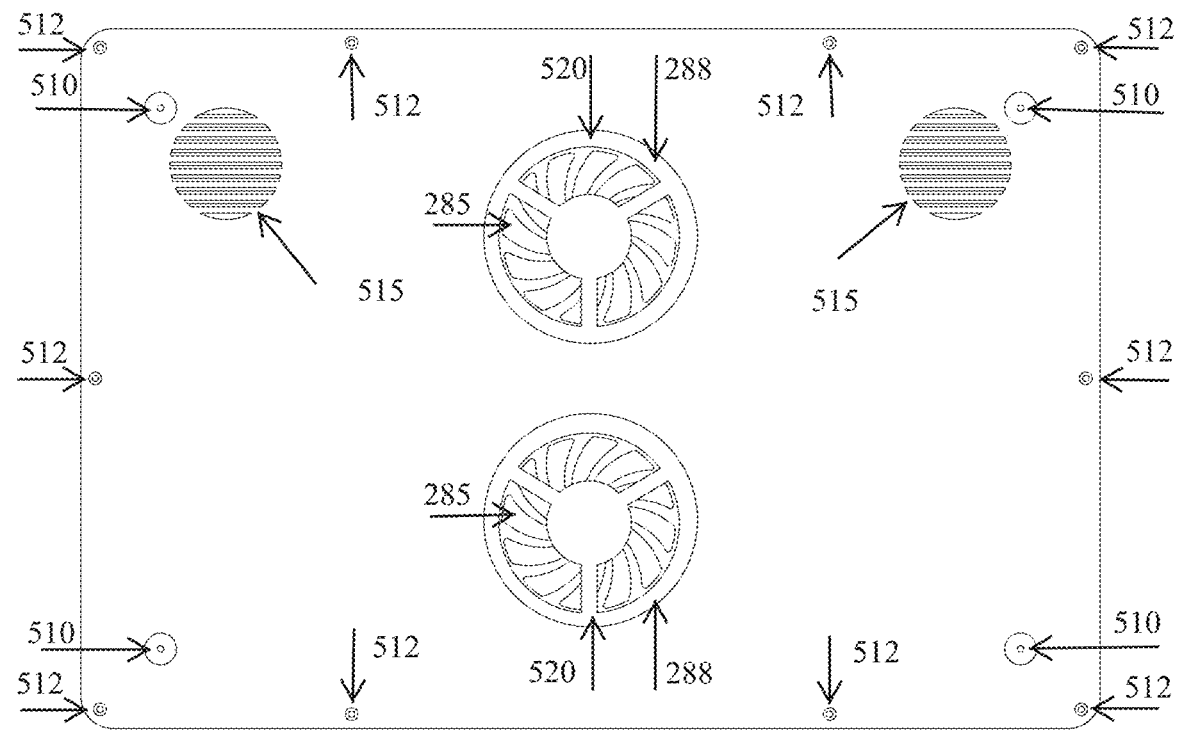
FIG. 33E is an exterior view of the lower part with the auxiliary cooling system according to the embodiment of FIG. 33A installed.

FIGS. 33D and 33E show interior and exterior views of the lower part 500 with the auxiliary cooling system 275 installed. The lower part 500 with the auxiliary cooling system 275 can be fixed to the edge part 400 by fastening screws through mounting holes 512 and 412. In FIG. 33D there are air duct holes 288 in the microfin heatsink 280 and air duct holes 520 in the lower part 500 that are both positioned directly below the cooling fans 285. In FIG. 33E the cooling fans 285 can be seen through air duct holes 288 and 520.

Figure 34A:
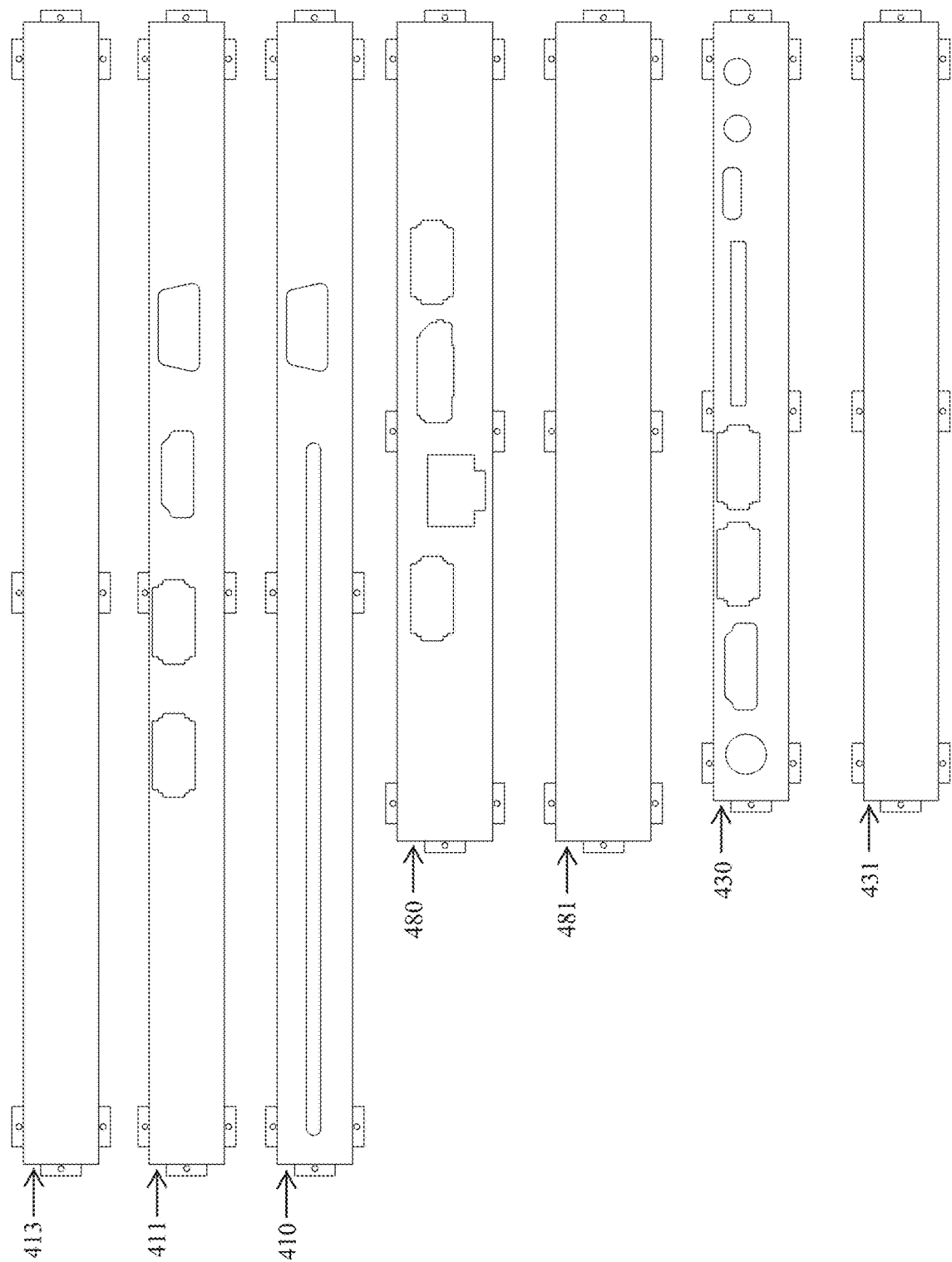
FIG. 34A is a front view of the removable I/O plates.
Figure 34B:
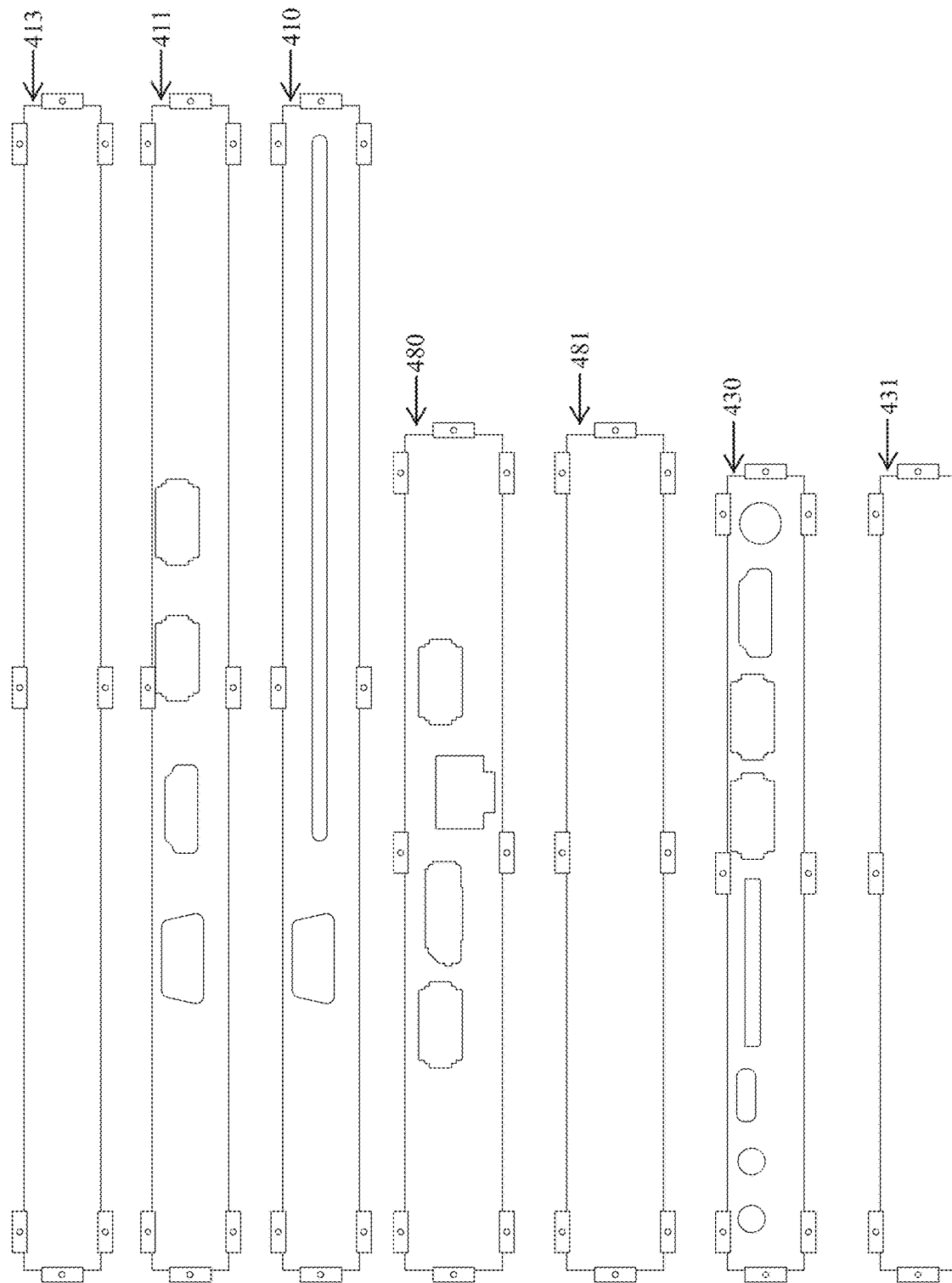
FIG. 34B is a rear view of the removable I/O plates. 0119

Turning now to FIGS. 34A and 34B, views of the removable I/O plates are shown. More specifically, FIG. 34A shows a front view of the removable I/O plates. FIG. 34B shows a rear view of the removable I/O plates. The right removable I/O plate 410 is used in the above embodiments that include an optical drive 160. The right removable I/O plate 411 is used in the above embodiments that do not include an optical drive 160. The rear removable I/O plate 480 and the left removable I/O plate 430 are used in all of the above embodiments. As said, removable I/O plates need to be replaced if a motherboard with different I/O ports is going to be installed. FIGS. 34A and 34B also show a dummy right removable I/O plate 413, dummy left removable I/O plate 431 and dummy rear removable I/O plate 481. When there are no I/O ports on a side of the motherboard U, a dummy I/O plate can be mounted on the corresponding side wall of the chassis.

In the above embodiments, many components are mounted into the chassis through stands or standoffs. The same stand or standoff is sometimes used to mount different components in different embodiments. In addition, multiple components can be mounted to the same stand or standoff in the same embodiment.

The following table lists five embodiments, which include the embodiment of FIG. 1A, the embodiment of FIG. 19, the embodiment of FIG. 22, the embodiment of FIG. 28 and the embodiment of FIG. 31. The components are mounted on the stands 380, 385 and standoffs 265, 270. More specifically, the table shows the component mounting arrangements for each of the embodiments. The components in the table include the motherboard, battery, optical drive and 2.5 inch hard drive; their abbreviations are MB, BA, OD and HD, respectively. The table also includes component mounting holes, which are in parentheses after the component abbreviations. In the table, it shows that in some embodiments, multiple components share a stand or standoff. For example, in the embodiment of FIG. 1A, the stand 385$d$ is used to mount the motherboard and the battery through the mounting holes 650$d$ and 177, respectively.

|      | FIG. 1A   | FIG. 19   | FIG. 22   | FIG. 28   | FIG. 31   |
|------|-----------|-----------|-----------|-----------|-----------|
| 385a | MB(650a)  | MB(650a)  | MB(650a)  | MB(650a)  | MB(650a)  |
| 385b | MB(650b)  | MB(650b)  | MB(650b)  | MB(650b)  | MB(650b)  |
| 385c | MB(650c)  | MB(650c)  | MB(650c)  | MB(650c)  | MB(650c)  |
| 385d | MB(650d)  | MB(650d)  | MB(650d)  | MB(650d)  | MB(650d)  |
|      | BA(177)   | BA(177)   | BA(177)   | BA(177)   | BA(177)   |
| 385e | BA(178)   | MB(655a)  | BA(178)   | MB(655a)  | BA(178)   |
|      |           | BA(178)   |           | BA(178)   |           |
| 385f | MB(650e)  | MB(650e)  | MB(650e)  | MB(650e)  | MB(650e)  |
| 385g | OD(259)   | MB(655b)  | MB(655b)  | MB(655b)  | OD(259)   |
|      | HD(249b)  | OD(259)   | HD(249b)  |           |           |
| 385h | MB(650h)  | MB(650h)  | MB(650h)  | MB(650h)  | MB(650h)  |
| 385i | MB(650i)  | MB(650i)  | MB(650i)  | MB(650i)  | MB(650i)  |
| 380a | MB(650f)  | MB(650f)  | MB(650f)  | MB(650f)  | MB(650f)  |
|      | HD(249a)  |           | HD(249a)  |           | BA(184)   |
| 380b | MB(650g)  | MB(650g)  | MB(650g)  | MB(650g)  | MB(650g)  |
| 270  |           |           | MB(660a)  | MB(660a)  | BA(186)   |
| 265a |           |           | MB(660b)  | MB(660b)  |           |
| 265b |           |           | MB(660c)  | MB(660c)  |           |

Figure 35:
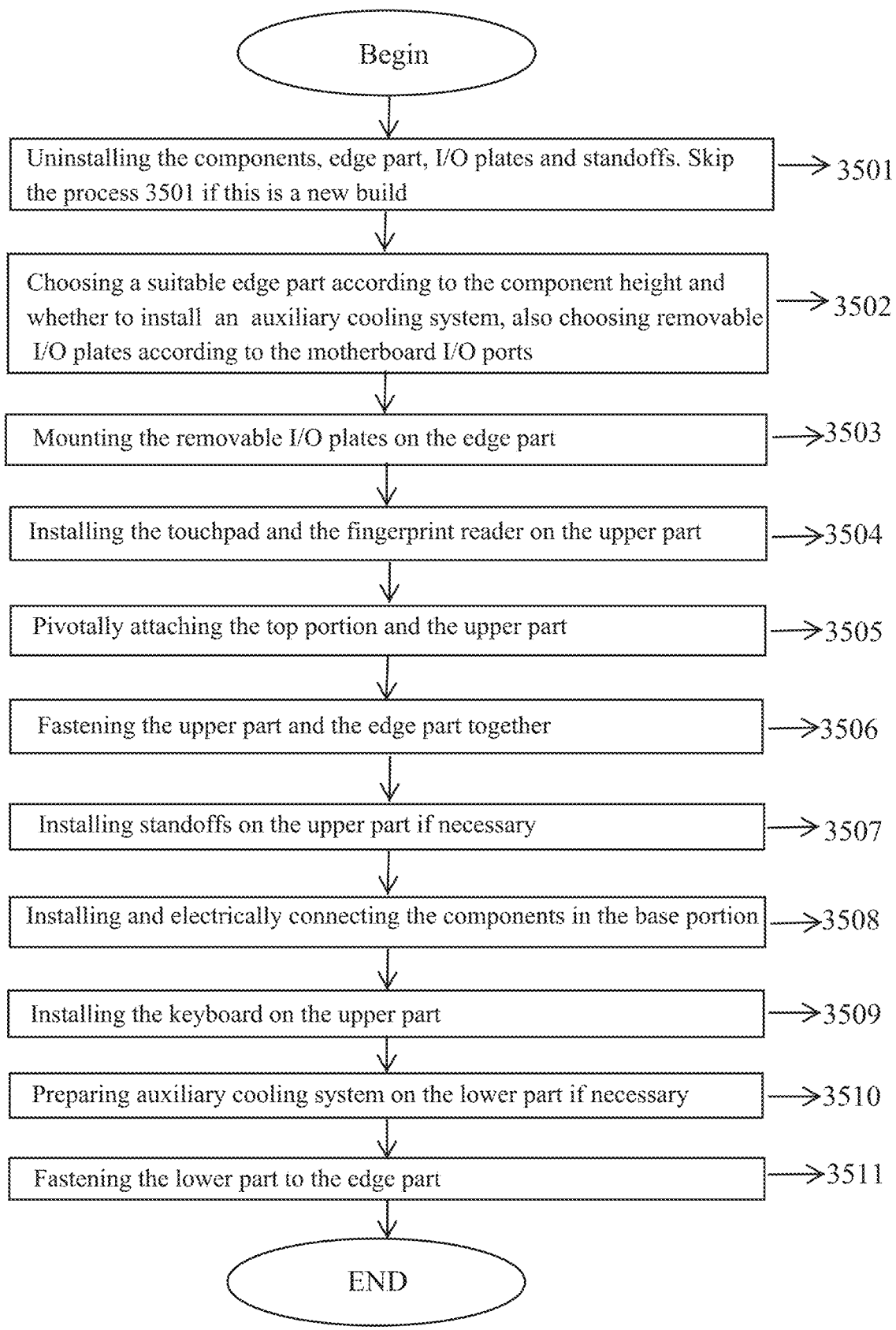
FIG. 35 shows another flowchart detailing the methodology and process to reconfigure the portable computer that already has all the components installed.

Turning now to FIG. 35, another flowchart is shown detailing the methodology and process 3500 to reconfigure the portable computer that already has all components installed. More specifically, the flowchart details how to reassemble the portable computer based on the current chassis and a new motherboard U that can have different height. The new motherboard may also have different I/O ports and dimensions than the original motherboard. Please note that the flowchart can also include the methodology and process to configure the portable computer from scratch. When configuring the portable computer from scratch, skip 3501. The process 3500 has a wider application than the process 3000. Through the innovation of the replaceable edge part, the portable computer can accommodate any set of motherboard and components as long as they are within the confines of the horizontal dimensions of the chassis.

After all the components have been collected, the reconfiguration process 3500 starts at 3501. If a portable computer is being built from scratch, skip 3501 and continue with 3502. All the components that are being replaced must be uninstalled from the chassis. The removable I/O plates, edge part and the standoffs must also be uninstalled. At 3502, an edge part with a suitable height is selected based on factors such as component height and the presence or absence of an auxiliary cooling system. Also at 3502, removable I/O plates are selected based on the I/O ports of the motherboard that are being installed. At 3503, the removable I/O plates are mounted on the appropriate side walls of the edge part. At 3504, all mounting holes on the touchpad are aligned with the touchpad mounting holes on the upper part, then screws are fastened to fix the touchpad to the upper part. At 3504, the fingerprint reader is mounted in the same manner. At 3505, the top portion and the upper part of the base portion are pivotally attached. Then, the hinge covers are placed, covering the hinges, screws and the hinge mounting holes. At 3506, the upper part and the edge part are fastened together. At 3507, depending on the dimensions of the motherboard, battery and other components, standoffs are installed on the upper part if necessary. After 3507, the chassis is ready to mount the internal components. At 3508, the components are installed and electrically connected in the chassis. After the relevant components are installed on the motherboard U, the motherboard U is ready and further installed in the chassis. Then other components such as the 2.5 inch hard drive, optical drive, LED board and battery are installed. At 3508, the cables of all the components are also connected to their respective connectors. For example, the cooling fan cable is connected to a fan connector on the motherboard. The speaker wires, touchpad cable, and fingerprint reader cable are all connected to the corresponding connectors on the motherboard. The antenna cables are connected to connectors on the wireless card. At 3509, the keyboard is connected to the motherboard through a keyboard connector on the bottom side of the motherboard. The keyboard is then placed in the keyboard holder, and is locked into place through the keyboard slots on the upper part. At 3510, if there is an auxiliary cooling system being installed for the process 3500, the auxiliary cooling system can be mounted on the lower part to prepare for installation. At 3511, if necessary, connect the cooling fans of the auxiliary cooling system to a fan connector on the motherboard. Then the reconfiguration process 3500 is completed by fastening the lower part to the edge part.

In the above description, specific details are given to provide a thorough understanding of the embodiments of the invention. However, the above descriptions of the illustrated embodiments of the invention are not intended to limit the invention. One skilled in the art will recognize the invention would not be limited to specific details. The scope of the invention should not be limited by specific drawings and will be reflected in the following claims section.

REFERENCES

1. U.S. Pat. No. 7,924,563 Electronic device, Kobayashi, et al. Apr. 12, 2011
2. U.S. Pat. No. 9,823,718 Device cooling, Platt, et al. Nov. 21, 2017
3. U.S. Pat. No. 8,363,398 Electronic device with heat dissipation casing, Tan, Jan. 29, 2013
4. U.S. Pat. No. 7,242,585 Electronic device, Fukuma, et al. Jul. 10, 2007
5. U.S. Pat. No. 7,744,172 Computer enclosure with interchangeable I/O plate, Chen, et al. Jun. 29, 2010
6. U.S. Pat. No. 5,379,183 Combination I/O plate/lid hinge structure for a notebook computer, Okonsky, et al. Jan. 3, 1995
7. U.S. Pat. No. 8,238,100 Centrifugal fan and electronic apparatus, Fujiwara, Aug. 7, 2012
8. CN210005951/209514467 Portable computer structure, Liu Huiqiu, et al. Jan. 31, 2020/Oct. 18, 2019
9. CN209690813U—Portable notebook computer heat dissipation pad with pressurization function, Li Xiang, Nov. 26, 2019
10. CN208796187 Portable computer radiator, Chen Xieji, Tang Liang, Apr. 26, 2019

We claim:
1. A portable computer comprising:
a three-part chassis comprising:
an upper part formed of a wall having an exterior surface and an interior surface, the exterior surface comprising a first surface region and a second surface region recessed relative to the first surface region and configured to hold a keyboard, the interior surface comprising a third surface region opposite the first surface region and a fourth surface region raised relative to the third surface region and opposite the second surface region;
an edge part defined by a unitary structure and formed of four side walls, the side walls having openings, a top of the edge part fastened to the upper part; and a lower part formed of a second wall and fastened to a bottom of the edge part;
a motherboard, a battery, and other components, wherein the other components are comprised of mounted motherboard components and optional components, and wherein a motherboard U is comprised of the motherboard and the mounted motherboard components; the interior surface of the upper part having a plurality of mounting stands to mount the motherboard, the battery and the other components; the motherboard, the battery and most of the other components being contained and electrically interconnected in the three-part chassis; the motherboard and the battery having mounting holes; the motherboard, the battery and the other components being mounted to the plurality of mounting stands and/or removable mounting standoffs, wherein the removable mounting standoffs are screwed through a plurality of fastening holes on the interior surface of the upper part;
the plurality of mounting stands including at least one mounting stand that is a different height from another mounting stand to keep a plurality of mounting points flush; the motherboard having input/output (I/O) ports located on sides of the motherboard; and
the openings in the side walls of the edge part being able to accommodate removable I/O plates, each of the removable I/O plates having a plurality of openings for accommodating the I/O ports of the motherboard.
2. The portable computer as recited in claim 1, further comprising: a display portion pivotally attached to the three-part chassis.
3. The portable computer as recited in claim 1, further comprising: a display exposed through or on the upper part of the three-part chassis.
4. The portable computer as cited in claim 1, wherein at least one of the removable mounting standoffs is a different mounting height from another removable mounting standoff to keep the plurality of mounting points flush.
5. The portable computer as cited in claim 1, where at least one of the plurality of mounting stands is used to mount multiple components.
6. The portable computer as cited in claim 1, where at least one of the removable mounting standoffs is used to mount multiple components.
7. A method of configuring the portable computer of claim 1 comprising:
dismounting the motherboard and/or the battery; choosing to install or uninstall the optional components to increase or decrease available space in the portable computer, wherein the optional components are components that do not affect main functions of the portable computer
configuring a three-part chassis with different removable I/O plates, adding/removing removable mounting standoffs to allow for mounting of a different motherboard and/or a different battery;

mounting the different motherboard and/or the different battery to the mounting stands and removable mounting standoffs on the upper part of the chassis, wherein the different motherboard and/or the different battery are disposed in the portable computer to occupy the available space.

8. The method as cited in claim 7, wherein the different motherboard has a different surface size and has different mounting holes.

9. The method as cited in claim 7, wherein the different motherboard has different I/O ports.

10. The method as cited in claim 7, wherein the different battery is a different size and has different mounting holes.

11. A method of configuring the portable computer of claim 1 comprising:

dismounting the motherboard U and/or the battery; configuring the three-part chassis with a different edge part having a height greater than a thickness of a different motherboard U, wherein the different motherboard U comprises a different motherboard and different mounted motherboard components, and the thickness is defined as the distance between the highest and lowest points of the different motherboard U in the direction orthogonal to mounting surfaces of the different motherboard mounting the different motherboard U and/or a different battery to the mounting stands and removable mounting standoffs on the upper part of the three-part chassis.

12. The method as cited in claim 11, wherein the different edge part has a different edge height.

13. The method as cited in claim 11, wherein the thickness of the different motherboard U is different from a corresponding thickness of the motherboard U.

14. The method as cited in claim 11, wherein the different battery has a different battery height, and a battery height of the battery is a vertical distance from a lowest battery point to a highest battery point when mounted in the three-part chassis.

15. The method as cited in claim 11, further comprising:

choosing to install or uninstall the optional components to increase or decrease available space in the portable computer, adding/removing the removable mounting standoffs to allow for mounting of the optional components, wherein the optional components are components that do not affect main functions of the portable computer;

configuring the three-part chassis with different removable I/O plates, adding/removing the removable mounting standoffs to allow for mounting of the different motherboard and/or the different battery;

mounting the different motherboard and/or the different battery to the mounting stands and the removable mounting standoffs on the upper part of the chassis, wherein the different motherboard and/or the different battery are disposed in the portable computer to occupy the available space; and the openings in the side walls of the edge part being able to accommodate removable I/O plates, each of the removable I/O plates having a plurality of openings for accommodating the I/O ports of the motherboard.

16. The method as cited in claim 15, wherein the different motherboard has a different surface size and has different mounting holes.

17. The method as cited in claim 15, wherein the different motherboard has different I/O ports.

18. The method as cited in claim 15; wherein the different battery is a different size and has different mounting holes.

19. The method as cited in claim 11, further comprising:

mounting a cooling system on the lower part of the three-part chassis; and fastening the lower part with the cooling system to the bottom of the edge part.

20. The method as cited in claim 19, wherein the cooling system comprises one or more heatsinks and/or one or more cooling fans.

* * * * *